US011704984B1

(12) United States Patent
ElHattab et al.

(10) Patent No.: US 11,704,984 B1
(45) Date of Patent: *Jul. 18, 2023

(54) VIDEO STREAMING USER INTERFACE WITH DATA FROM MULTIPLE SOURCES

(71) Applicant: Samsara Inc., San Francisco, CA (US)

(72) Inventors: Saleh ElHattab, San Francisco, CA (US); Kathryn Siegel, San Francisco, CA (US); Noah Paul Gonzales, Sebastopol, CA (US); Etienne Jean-Claude Dejoie, San Francisco, CA (US); Maxwell Coleman Goldberg, San Francisco, CA (US); Joyce Tian Chen, San Francisco, CA (US); Kelsey Michelle Lam, Fremont, CA (US); Adam Eric Funkenbusch, Saint Paul, MN (US); Karthikram Rajadurai, San Leandro, CA (US); Rhea Lin, San Francisco, CA (US); Sebastian Richard Sangervasi, San Anselmo, CA (US); Aidan Siobhan Madigan-Curtis, Las Vegas, NV (US); William Arthur Hughes, San Francisco, CA (US)

(73) Assignee: Samsara Inc., San Francisco, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 17/445,776

(22) Filed: Aug. 24, 2021

Related U.S. Application Data

(63) Continuation of application No. 17/175,522, filed on Feb. 12, 2021, now Pat. No. 11,158,177.
(Continued)

(51) Int. Cl.
*G08B 13/196* (2006.01)
*G06V 20/40* (2022.01)

(52) U.S. Cl.
CPC ....... *G08B 13/19682* (2013.01); *G06V 20/41* (2022.01); *G08B 13/19641* (2013.01);
(Continued)

(58) Field of Classification Search
CPC .................................. G08B 13/19682
See application file for complete search history.

(56) References Cited

U.S. PATENT DOCUMENTS

| 6,157,864 A | 12/2000 | Schwenke et al. |
| 6,801,920 B1 | 10/2004 | Wischinski |
(Continued)

OTHER PUBLICATIONS

U.S. Appl. No. 17/175,527, Determining Alerts Based on Video Content and Sensor Data, filed Feb. 12, 2021.
(Continued)

*Primary Examiner* — Daniel T Tekle
(74) *Attorney, Agent, or Firm* — Knobbe Martens Olson & Bear LLP

(57) ABSTRACT

A management server receives a request to view video content; access a stream of video content corresponding to the request; access and store, in one or more databases, metadata associated with the video content, wherein the metadata includes a plurality of detections and was generated by the video gateway device based on an analysis of the video content and previously uploaded to a remote computing device; generating and causing display of a user interface that includes: the stream of the video content, a seek bar configured to be manipulated by a user so that the user can navigate through the video content, and the metadata overlaid on the seek bar such that the plurality of detections are overlaid at locations on the seek bar corresponding to when the plurality of detections were detected.

20 Claims, 21 Drawing Sheets

Related U.S. Application Data

(60) Provisional application No. 63/109,257, filed on Nov. 3, 2020, provisional application No. 63/109,272, filed on Nov. 3, 2020.

(52) U.S. Cl.
CPC . *G08B 13/19669* (2013.01); *G08B 13/19691* (2013.01); *G06V 20/44* (2022.01)

(56) References Cited

U.S. PATENT DOCUMENTS

| | | | |
|---|---|---|---|
| 7,596,417 | B2 | 9/2009 | Fister et al. |
| 7,957,936 | B2 | 6/2011 | Eryurek et al. |
| 9,230,250 | B1 | 1/2016 | Parker et al. |
| 9,445,270 | B1 | 9/2016 | Bicket et al. |
| 10,033,706 | B2 | 7/2018 | Bicket et al. |
| 10,085,149 | B2 | 9/2018 | Bicket et al. |
| 10,102,495 | B1 | 10/2018 | Zhang et al. |
| 10,173,486 | B1 | 1/2019 | Lee et al. |
| 10,196,071 | B1 | 2/2019 | Rowson et al. |
| 10,206,107 | B2 | 2/2019 | Bicket et al. |
| 10,388,075 | B2 | 8/2019 | Schmirler et al. |
| 10,390,227 | B2 | 8/2019 | Bicket et al. |
| 10,444,949 | B2 | 10/2019 | Scott et al. |
| 10,579,123 | B2 | 3/2020 | Tuan et al. |
| 10,609,114 | B1 | 3/2020 | Bicket et al. |
| 10,827,324 | B1 | 11/2020 | Hajimiri et al. |
| 10,843,659 | B1 | 11/2020 | Innocenzi et al. |
| 11,046,205 | B1 | 6/2021 | Govan et al. |
| 11,122,488 | B1 | 9/2021 | Lloyd et al. |
| 11,126,910 | B1 | 9/2021 | Akhtar et al. |
| 11,127,130 | B1 | 9/2021 | Jain et al. |
| 11,128,130 | B2 | 9/2021 | Jain et al. |
| 11,131,986 | B1 | 9/2021 | Gal et al. |
| 11,132,853 | B1 | 9/2021 | Akhtar et al. |
| 11,137,744 | B1 | 10/2021 | Heddleston et al. |
| 11,157,177 | B2 | 10/2021 | Gazit et al. |
| 11,158,177 | B1 | 10/2021 | ElHattab et al. |
| 11,184,422 | B1 | 11/2021 | Bicket et al. |
| 11,188,046 | B1 | 11/2021 | Elhattab et al. |
| 11,190,373 | B1 | 11/2021 | Stevenson et al. |
| 11,341,786 | B1 | 5/2022 | Calmer et al. |
| 11,349,901 | B1 | 5/2022 | Duffield et al. |
| 11,352,013 | B1 | 6/2022 | Srinivasan et al. |
| 11,352,014 | B1 | 6/2022 | Srinivasan et al. |
| 11,356,605 | B1 | 6/2022 | Shemet et al. |
| 11,356,909 | B1 | 6/2022 | Lloyd |
| 11,365,980 | B1 | 6/2022 | Akhtar et al. |
| 11,386,325 | B1 | 7/2022 | Srinivasan et al. |
| 11,451,610 | B1 | 9/2022 | Saunders et al. |
| 11,451,611 | B1 | 9/2022 | Saunders et al. |
| 11,479,142 | B1 | 10/2022 | Govan et al. |
| 11,522,857 | B1 | 12/2022 | Symons et al. |
| 11,558,449 | B1 | 1/2023 | Bicket et al. |
| 2002/0169850 | A1 | 11/2002 | Batke et al. |
| 2009/0322874 | A1* | 12/2009 | Knutson ............. G08B 25/009 348/143 |
| 2013/0211559 | A1 | 8/2013 | Lawson et al. |
| 2014/0328517 | A1 | 11/2014 | Gluncic |
| 2014/0337429 | A1 | 11/2014 | Asenjo et al. |
| 2016/0275801 | A1 | 9/2016 | Kopardekar |
| 2017/0060726 | A1 | 3/2017 | Glistvain |
| 2017/0123397 | A1 | 5/2017 | Billi et al. |
| 2017/0195265 | A1 | 7/2017 | Billi et al. |
| 2017/0278004 | A1 | 9/2017 | McElhinney et al. |
| 2018/0234514 | A1 | 8/2018 | Rajiv et al. |
| 2018/0356800 | A1 | 12/2018 | Chao et al. |
| 2018/0364686 | A1 | 12/2018 | Naidoo et al. |
| 2019/0228155 | A1 | 7/2019 | Basak et al. |
| 2019/0289372 | A1* | 9/2019 | Merler ................ H04N 21/251 |
| 2019/0327613 | A1 | 10/2019 | Bicket et al. |
| 2020/0104779 | A1* | 4/2020 | Li ......................... G06Q 50/04 |
| 2020/0150739 | A1 | 5/2020 | Tuan et al. |
| 2020/0342230 | A1 | 10/2020 | Tsai et al. |
| 2020/0342235 | A1 | 10/2020 | Tsai et al. |
| 2020/0342274 | A1 | 10/2020 | ElHattab et al. |
| 2020/0342611 | A1 | 10/2020 | ElHattab et al. |
| 2020/0344301 | A1 | 10/2020 | ElHattab et al. |
| 2021/0006950 | A1 | 1/2021 | Hajimiri et al. |

OTHER PUBLICATIONS

U.S. Appl. No. 17/175,522, Video Streaming User Interface With Data From Multiple Sources, filed Feb. 12, 2021.

Elias N. Malamas et al. "A survey on industrial vision systems, applications and tools", Sep. 17, 2002, Image and Vision Computing 21, pp. 171-188.

U.S. Appl. No. 17/452,495, Determining Alerts Based on Video Content and Sensor Data, filed Oct. 27, 2021.

* cited by examiner

VIDEO STREAMING USER INTERFACE WITH DATA FROM MULTIPLE SOURCES

CROSS REFERENCE TO RELATED APPLICATION

This application is a continuation of U.S. patent application Ser. No. 17/175,522, filed Feb. 12, 2021, which claims the benefit of U.S. Provisional Patent Application No. 63/109,257, filed on Nov. 3, 2020, and titled "VIDEO STREAMING USER INTERFACE WITH DATA FROM MULTIPLE SOURCES", and also claims the benefit of U.S. Provisional Patent Application No. 63/109,272, filed on Nov. 3, 2020, and titled "DETERMINING ALERTS BASED ON VIDEO CONTENT AND SENSOR DATA", the disclosures of which are all hereby made part of this specification as if set forth fully herein and expressly incorporated by reference for all purposes, for all that is contained in entirety.

TECHNICAL FIELD

Embodiments of the present disclosure relate to industrial video gateway devices, industrial controller devices, sensors, systems, and methods that allow for system automation and data acquisition and processing. Embodiments of the present disclosure further relate to devices, systems, and methods that provide interactive graphical user interfaces for interfacing with and configuring industrial video gateway devices, industrial controller devices, sensors, and systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

An industrial gateway device, or industrial video gateway device, is a type of gateway specifically tuned and designed for industrial environments and/or Internet of Things (IoT) applications. Like any gateway that operates at the edge of the network, industrial gateways connect devices and resources in the local network environment with remote assets located on another network or in the cloud. And like these edge gateways, industrial gateways can link systems employing diverse network protocols, while often providing on-board processing to secure, filter and manage complex data flows. For example, an industrial gateway device can receive data flows from hundreds of individual sensors, cameras, and other devices—over network schemes like Ethernet, WiFi and Bluetooth—and funnel them to the network edge where the data can be processed or transmitted.

Where some industrial gateway devices differ is in their design, which is ruggedized for severe and remote environments, and designed for minimal physical maintenance and interaction. Shop and factory floors, vehicles and transport, and external locations like transmission towers and rail yards are all examples of environments that demand industrial-grade gateways. Also, fanless cooling and ventless chassis designs mitigate wear caused by exposure to dust and particles, while eliminating moving parts most prone to failure.

In general, configuration of industrial gateway devices can be time consuming, and unfriendly or impossible for non-technical users. For example, configuration of a specific industrial gateway device might include receiving and processing data from hundreds of sensors, cameras, machines, or the like, and programming how to receive, process, store, and/or transmit data based on particularities of an associated facility would be time consumer and difficult. Further, in general, gathering or manually reviewing data from individual sensors, cameras, or even gateway devices can be time-consuming and laborious, rendering impractical any real-time or near real-time analyses of such data, including any analyses of video content/data from multiple cameras. These limitations can make it particularly difficult to deal with situations of safety, productivity, or efficiency without an automated system in place.

Also, industrial controller systems, such as standard industrial control systems ("ICS") or programmable automation controllers ("PAC"), may include various types of control equipment used in industrial production, such as supervisory control and data acquisition ("SCADA") systems, distributed control systems ("DCS"), programmable logic controllers ("PLC"), and industrial safety systems. Such systems may be used in industries including electrical, water and wastewater, oil and gas production and refining, chemical, food, pharmaceuticals, robotics, and the like. Using information collected from various types of sensors to measure process variables, automated and/or operator-driven supervisory commands from the industrial controller system can be transmitted to various devices, e.g., actuator devices such as control valves, hydraulic actuators, magnetic actuators, electrical switches, motors, solenoids, and the like. These actuator devices collect data from sensors and sensor systems, open and close valves and breakers, regulate valves and motors, monitor the industrial process for alarm conditions, and so forth.

In general, configuration of industrial controller systems can be time consuming, and unfriendly or impossible for non-technical users. For example, configuration of individual controller devices may require manual interaction with the individual devices, updating firmware (e.g., by inserting memory devices or wired computer interfaces at the individual controller devices) or adjusting settings. Further, in general, gathering data from individual controller devices can be time-consuming and laborious, rendering impossible any real-time or near real-time analyses of such data, including any analyses of data from multiple controller devices. These limitations can make it particularly difficult (or impossible for non-technical users) to deal with situations where a controller device begins to fail, or needs to be updated in view of changes, e.g., to a manufacturing line or process.

SUMMARY

The systems, methods, and devices described herein each have several aspects, no single one of which is solely responsible for its desirable attributes. Without limiting the scope of this disclosure, several non-limiting features will now be described briefly.

Computer networks associated with manufacturing processes can record data associated with many different areas (e.g., with cameras and sensors) and machines (e.g., on/off states, speed, location). However, it is inefficient and can be costly to manually monitor each location and machine, to review prior recordings for particular events, and to adjust machinery based on the recordings/monitoring. Therefore, there is a need for a system that can automatically monitor areas and machines, and to generate metadata indicative of operational insights that can be used for alerts, more efficient searching, automatic controlling of machines based on certain conditions being satisfied (e.g., for safety, efficiency, and productivity), and other similar features. Also, each system of sensors, cameras, gateways, video gateways, and other components are based on the site or industry the system is being used in. For example, some sites may use one type of sensors, and other sites may use a different sensor. Also, some sites might use up to 10, 20, 30, 50, or more cameras and/or sensors. Other sites might use fewer or more cameras and/or sensors. Although reference is made to video gateway devices, or industrial video gateway devices, in this application, the gateway devices described may or may not include video functionality. For example, some of the gateway devices described might only include sensor data where insights are generated based solely on sensor data. In other examples, insights associated with the gateway devices can be based solely on video data and include no sensor data. Yet in other examples, insights associated with the gateway devices can be based on a combination of video data and sensor data.

One proposed solution involves an improved system and method for monitoring areas and machines associated with a manufacturing processes, and generating metadata that can be used for alerts, more efficient searching, and automatic controlling of machines based on certain conditions being satisfied. The improved system and method can include a local or on-site video gateway connected, directly or indirectly, to a plurality of cameras and sensors that is configured to collect video content and sensor data from multiple sources over time. The video gateway can also control machines that can be connected through a programmable logic controller, or similar device. By implementing an AI or machine learning algorithm, the video gateway can process the collected data locally to generate metadata that includes various programmable insights or detections such as motion, dynamics of motion (e.g., speed of motion, direction of motion, range of motion, acceleration, etc.), object detected (e.g., person or machine), object positioning data, object color, protective equipment associated with an object, object dimensions, safety-related detections (e.g., can be determined based on combination of other detections that can be used to indicate a level or safety risk), temperature (e.g., based on data gathered from thermal imaging cameras, sensors, etc.), various behaviors associated with people (e.g., how a person might be operating a machine), ambient information (e.g., outdoor or indoor information), identity (e.g., of persons based on facial analysis, license plate recognition, sensor location or ID data, or the like), or the like. The metadata can track the time ranges that each detection begins and ends for video content associated with each camera. Such metadata, and other optimized data, can then be transmitted to a cloud service.

Using a user interface, a user can program events, or alerts, to take place based on pre-configured criteria or conditions that are based on the collected video content and sensor data. Alert criteria can be programmed to specify video detections combined with particular sensor events to do one or more of: generating alerts (e.g., email, SMS, push notification associated with an installed application, or API for third party systems), adjusting one or more machines (e.g., by communicating instructions to a controller device from a video gateway), and the like.

In some implementations, events can also include the generation of a report upon satisfaction of associated criteria associated with the event. For example, the generated report can include relevant data associated with the event criteria.

Advantageously, aspects of the proposed solution shift the burden of video content review and machine controlling to the local video gateway so that actions and alerts can be automatically generated to maximize or enhance operational safety, security, productivity, and efficiency.

Also, the computer networks associated with manufacturing processes may also have slow or unreliable internet connections, or have a relatively limited bandwidth as compared to the quantity of data collected by cameras and sensors. It would be impractical or costly to transmit the vast collection of data to a remote server for processing or viewing. However, users of the system desire remote access to such collections of data, and even while the associated internet connection of a computer network might be offline. Therefore, there is a need for a system that can generate a user interface that allows for the streaming of captured or live video content along with metadata that includes event data based on the video content.

A user can access recorded or live video content via a user interface that can be accessed remotely or locally, where the user interface can be generated by a remote server. In some implementations, if the user accesses the video content from a remote server or cloud (i.e., not from the local network connected to the video gateway), the user can be presented with a user interface that displays video content that is streamed from the video gateway and routed through the remote server. In some implementations, video content and/or data collected by the video gateway can be processed locally by the video gateway to generate metadata. The generated metadata can then be transmitted to a remote server or cloud to be overlaid on video content that is viewed or streamed by a user. So, when a user accesses the remote server and requests to view particular video content, the remote server can pull the particular video content from the video gateway and combine the video content with metadata that is stored on the cloud in a user interface. In some implementations, metadata can include detections in a video feed, sensor data, and/or machine data. The metadata can also include a time component so that the particular detection can be overlaid on a video at the appropriate times associated with each detection.

In another implementation, if the user accesses the video content locally (i.e., from the local network connected to the video gateway), the user can be presented with the same user interface as the described with respect to the remote access, where the user interface can be generated by the remote server. However, the video content is transmitted or streamed directly from the video gateway to the user device over the local area network, and not through the cloud. So, when a user accesses the remote server locally on the same network, and requests to view particular video content, the remote server can facilitate the transmission of the video content directly to the user device from the video gateway (e.g., by using WebRTC, or the like), and combine the locally stored video content with remotely stored metadata. The video content and metadata can then be presented at the same time in a user interface displayed on the user device.

Advantageously, aspects of the proposed solution shift the burden of image processing and content or data storage to the on-site video gateway so that internet bandwidth use is optimized for only specific low-file size data, which can also be further influenced by data privacy concerns.

Also, industrial control systems may include multiple layers of technology, each of which may be a different physical piece of technology. These layers may include device level measurement sensors, telemetry and control devices (e.g., programmable logic controllers ("PLC") or remote terminal units ("RTU")), connectivity technology (e.g., video gateway devices and systems), "historian" devices (e.g., databases and other data management devices), visibility and management devices (e.g., human machine interface ("HMI") devices, manufacturing execution systems ("MES"), and/or supervisory control and data acquisition ("SCADA") systems), and the like. These multiple layers of different technology devices may create significant complexity to implementing, expanding, and updating such prior industrial control systems. For example, identification of and connection to one specific device may be challenging. Individual devices in such networks can be accessed and controlled by HMI devices, but it can be costly to individually pre-configure HMI devices to communicate with particular devices specific to the network being accessed.

Advantageously, various embodiments of the present disclosure may overcome various disadvantages of prior systems and methods. For example, aspects of the present disclosure include a system that grants network access to a wide range of possible devices, by various HMI devices, without each HMI device being uniquely pre-configured for the network. As further examples, embodiments of the present disclosure may include industrial controller devices (also referred to herein as "controller devices") that may include built-in wireless and/or wired communications capabilities, data storage and offloading capabilities, rapid configuration capabilities, and/or additional device control capabilities. The controller devices may automatically establish communication with a remote management server (e.g., remote server, cloud, or the like). The controller devices may be remotely and centrally monitored and configured via the management server, e.g., via an interactive graphical user interface accessible from a user computing device. The controller devices may include configuration execution capabilities such that they may operate autonomously based on a current configuration. However, the controller devices may further include automatic offloading of received data to a remote database (e.g., via the management server). Such received data may be useable by the management server for providing further analyses, insights, alerts, etc. to users via interactive graphical user interfaces. The controller devices may provide remote access to live operational data via a web-server operating on the controller devices. Human machine interface devices may communicate with the controller devices via wired or wireless, direct or networked communications. The controller devices may provide interactive graphical user interfaces to such human machine interface devices, enabling synchronization of controller device status at multiple human machine interface devices and/or other user devices. Thus, according to various embodiments of the present disclosure, the controller devices and the management server may replace and streamline the multiple layers of technology of prior systems, while also providing added benefits and functionality over prior systems, and maintaining options for interfacing with and working with prior systems (e.g., existing sensors, PLCs, etc.).

In some implementations, some or all functionality of the industrial control system or controller devices can be located on one or more video gateway devices. Also, in some implementations, some or all functionality of the video gateway devices can be located on one or more controller devices.

Advantageously, according to various embodiments, the present disclosure may provide a modern platform that may combine data collection, control, alerts, and analytics in an easy to deploy and easy to use system—from the plant floor to remote sites. Embodiments of the present disclosure may enable management of video gateway devices or controller devices from a secure cloud dashboard. Embodiments of the present disclosure may provide video gateway devices or controller devices that combine the local control and data collection capabilities of a programmable logic controller ("PLC") or remote terminal unit ("RTU"), with a cellular gateway into a single device designed to meet the harsh demands of various industrial environments, including water/wastewater, oil and gas, and the like. Embodiments of the present disclosure may enable out-of-the-box visibility of real-time and historical data, and simple alerting without the hassle of additional software or complexity that may be required in prior systems. Embodiments of the present disclosure may also provide for video gateway devices or controller devices that combine the local control, data collection capabilities (e.g., of video data, machine data (e.g., collected through a PLC), and/or sensor data), and local processing of data collected. Such local processing can result in generated user interfaces, alerts, and automated actions (e.g., based on pre-configured settings) with only transmitting a portion of data, or not data, to a management server or remote server.

According to various embodiments, the present disclosure includes one or more video gateway devices and/or one or more controller devices that include various configurable input and output ports (which may be configured based on one or more communications specifications and/or configurations of the controller devices), e.g., for interacting with and communicating with various additional systems and devices, e.g., associated with a manufacturing line or process. Data may be collected or received by the video gateway devices or controller devices, and may optionally be processed or analyzed by the video gateway device and/or controller device, based on configuration settings, e.g., to generate alerts, outputs, or controls related to various additional systems and devices, e.g., associated with a manufacturing line or process. The video gateway device or controller device may provide outputs in response to received data and/or analysis of the received data, e.g., to stop or adjust the manufacturing line or process, take actions, cause sending of alerts, etc. The video gateway device or controller device may include on-device memory for storing received data and analyses. The video gateway device or controller device may further include additional aspects, including one or more web-servers, for communicating with other devices/systems.

In various embodiments, the video gateway devices or controller devices may be configured to automatically connect to a remote management server (e.g., a "cloud"-based management server), and may offload received and analyzed data to the remote management server via wired or wireless communications. The video gateway devices or controller devices may further communicate with the management server, user computing devices, and/or human machine interface devices, e.g., to provide remote access to the gateway device or controller device, provide real-time information from the video gateway device or controller device, receive configurations/updates, provide interactive graphical user interfaces, and/or the like.

In various embodiments, the management server may aggregate received data and/or analysis data from one or more video gateway devices or one or more controller devices, and provide statuses, alerts, analyses, etc., including via interactive graphical user interfaces that may be accessed via user computing devices. The management server may provide interactive graphical user interfaces through which a user may configure one or more video gateway devices or one or more controller devices.

In various embodiments, human machine interface ("HMI") devices may communicate with the video gateway devices or controller devices, e.g., via accessing web-servers running on the video gateway devices or controller devices that provide interactive graphical user interfaces to the human machine interface devices. Users may thereby configure and/or monitor status of the video gateway devices or controller devices via the human machine interface devices. Typically, the human machine interface devices may communicate with the video gateway devices or controller devices via a local network (e.g., a network local to, or on-site at, a particular organization).

In various embodiments, the video gateway devices, controller devices, or backend/remote server/cloud infrastructure may communicate with various additional devices, e.g., various components of a manufacturing line or process, sensors, etc. Such communications may be accomplished via one or more application programming interfaces ("APIs").

Accordingly, in various embodiments, large amounts of data may be automatically and dynamically gathered and analyzed in response to user inputs and configurations, and the analyzed data may be efficiently presented to users. Thus, in some embodiments, the systems, devices, configuration capabilities, graphical user interfaces, and the like described herein are more efficient as compared to previous systems, etc.

Further, as described herein, according to various embodiments systems and/or devices may be configured and/or designed to generate graphical user interface data useable for rendering the various interactive graphical user interfaces described. The graphical user interface data may be used by various devices, systems, and/or software programs (for example, a browser program), to render the interactive graphical user interfaces. The interactive graphical user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic graphical user interfaces that are the result of significant development. This nontrivial development has resulted in the graphical user interfaces described herein which may provide significant cognitive and ergonomic efficiencies and advantages over previous systems. The interactive and dynamic graphical user interfaces include improved human-computer interactions that may provide reduced mental workloads, improved decision-making, improved capabilities, reduced work stress, and/or the like, for a user. For example, user interaction with the interactive graphical user interface via the inputs described herein may provide an optimized display of, and interaction with, video gateway devices or controller devices, and may enable a user to more quickly and accurately access, navigate, assess, and digest analyses, configurations, received/operational data, and/or the like, than previous systems.

Further, the interactive and dynamic graphical user interfaces described herein are enabled by innovations in efficient interactions between the user interfaces and underlying systems and components. For example, disclosed herein are improved methods of receiving user inputs (including methods of interacting with, and selecting, received data), translation and delivery of those inputs to various system components (e.g., video gateway devices or controller devices), automatic and dynamic execution of complex processes in response to the input delivery (e.g., execution of configurations on video gateway devices or controller devices), automatic interaction among various components and processes of the system, and automatic and dynamic updating of the user interfaces (to, for example, display the information related to video gateway devices or controller devices). The interactions and presentation of data via the interactive graphical user interfaces described herein may accordingly provide cognitive and ergonomic efficiencies and advantages over previous systems.

In some implementations, the video gateway device can compile metadata and other data based on analysis of collected data. For example, a video gateway device can be connected to, and collect video data from, a number of cameras configured to record areas of a manufacturing facility. The video gateway device can analyze the video and generate insights and metadata from the video data and transmit the reduced data to a management server for remote viewing and interaction by users. Such transmitted data can include various detections (e.g., machine on/off, location of one or more persons, movement of people, movement of machinery, temperature of an area, temperature of a machine, or the like). Such transmitted data can also include screenshots of captured video data. For example, during periods of low activity, or no activity (e.g., no motion detected, no people are detected, machinery is off, outside of operating/working hours, etc.), monitored in a video feed, screenshots can be generated and transmitted to the management server based on a pre-configured time interval (e.g., every 1, 5, 10, 20 minute mark, or the like). In another example, during periods of high activity (e.g., threshold motion detected, machinery is on, people are detected, during operating/working hours, etc.) monitored in a video, screenshots can be generated and transmitted to the management server based at the same or on a different pre-configured time interval (e.g., every 5, 10, 20 second mark, or the like).

In various embodiments, the HMI devices include minimal software applications that include a web browser and a network discovery service. Upon connection of a HMI device to a network, the HMI device detects any other devices on the network and connects with a randomly selected first device. In an implementation, the HMI device may specifically detect devices of a certain type, or provided by a particular manufacturer, on the network. Each of the detected devices on the network may be configured with a web server and a network discovery service. Thus, upon the HMI device connecting to a device on the network, the device can provide a web page to be rendered in the browser of the HMI device. The web page can include, for example, various controls and configurations associated with the device and, via the network discovery service of the device, indications of other devices on the network. A user of the HMI device may then control the device, or select a different device to connect to and control that different device. The various devices on the network, aside from the HMI devices, may further include functionality to associate particular HMI devices (e.g., based on the HMI device serial numbers or other unique identifications) with particular devices, such that upon re-connection of an HMI device to the network, an initially connected to device will automatically cause the HMI device to connect to the associated device on the network.

Advantageously, aspects of such an embodiment shift the burden of network device detection and configuration from the HMI device to the network devices (e.g., controller devices). Because the HMI device may not need special processing or configuration capabilities, virtually any user interface display device can be used as an HMI device to access the network and control or configure devices on the network.

Various embodiments of the present disclosure provide improvements to various technologies and technological fields, and practical applications of various technological features and advancements. For example, as described above, some existing systems are limited in various ways, and various embodiments of the present disclosure provide significant improvements over such systems, and practical applications of such improvements. Additionally, various embodiments of the present disclosure are inextricably tied to, and provide practical applications of, computer technology. In particular, various embodiments rely on detection of user inputs via graphical user interfaces, operation and configuration of controller devices, calculation of updates to displayed electronic data based on user inputs, automatic processing of received data, and presentation of updates to displayed data and analyses via interactive graphical user interfaces. Such features and others are intimately tied to, and enabled by, computer, industrial video gateway technology, and industrial controller technology, and would not exist except for computer, industrial video gateway technology, and industrial controller technology. For example, the industrial video gateway and industrial controller functionality and interactions with displayed data described below in reference to various embodiments cannot reasonably be performed by humans alone, without the computer and imaging technology upon which they are implemented. Further, the implementation of the various embodiments of the present disclosure via computer technology enables many of the advantages described herein, including more efficient interaction with, and presentation and analysis of, various types of electronic data, controller device operation and configuration, and the like.

In some embodiments, the system and/or method pertaining to a gateway device or video gateway device can comprise: receiving, from a user device, a request to view video content associated with an earlier point in time; accessing, from a video gateway device, a stream of video content corresponding to the request, wherein the video content was captured by cameras configured to capture video of areas of a manufacturing facility and stored on the video gateway device; accessing and storing, in one or more databases, metadata associated with the video content, wherein the metadata includes a plurality of detections and was generated by the video gateway device based on an analysis of the video content and previously uploaded to a remote computing device, and wherein the metadata includes, for each detection: a classification of the detection, a beginning time of the detection, and an ending time of the detection; and generating and causing display of a user interface that includes: the stream of the video content, an interactive seek bar configured to be manipulated by a user so that the user can navigate through the video content, and the metadata overlaid on the interactive seek bar such that the plurality of detections are overlaid at locations on the seek bar corresponding to when the plurality of detections were detected. The system and/or method can also comprise: wherein the stream of the video content is received from a video gateway device; wherein the stream of the video content is received from a management server; storing, in the one or more databases, the stream of the video content; receiving, from a second user device, a second request to view video content associated with the earlier point in time, and generating and causing display of a user interface that includes (1) the stream of the video content, wherein the stream of the video is pulled from the one or more databases, (2) the interactive seek bar, and (3) the metadata overlaid on the interactive seek bar; accessing pre-configured video recording criteria, wherein the video recording criteria are configured to be used to determine types of detection to monitor; wherein the video recording criteria includes information designating at least a portion of a camera feed, a particular machine, type of motion detected, or a combination; wherein each of the plurality of detections that are overlaid at locations on the seek bar also includes an indication of each respective detection's classification; wherein the metadata includes one or more screenshots associated with the stream of the video content; and/or receiving input data indicating a manipulation of the interactive seek bar by a user associated with the user device, and based on the received input data, causing display of one or more screenshots associated with the stream of the video content while the interactive seek bar is being manipulated by the user.

Various combinations of the above and below recited features, embodiments, and aspects are also disclosed and contemplated by the present disclosure.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above-and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Figure 1:
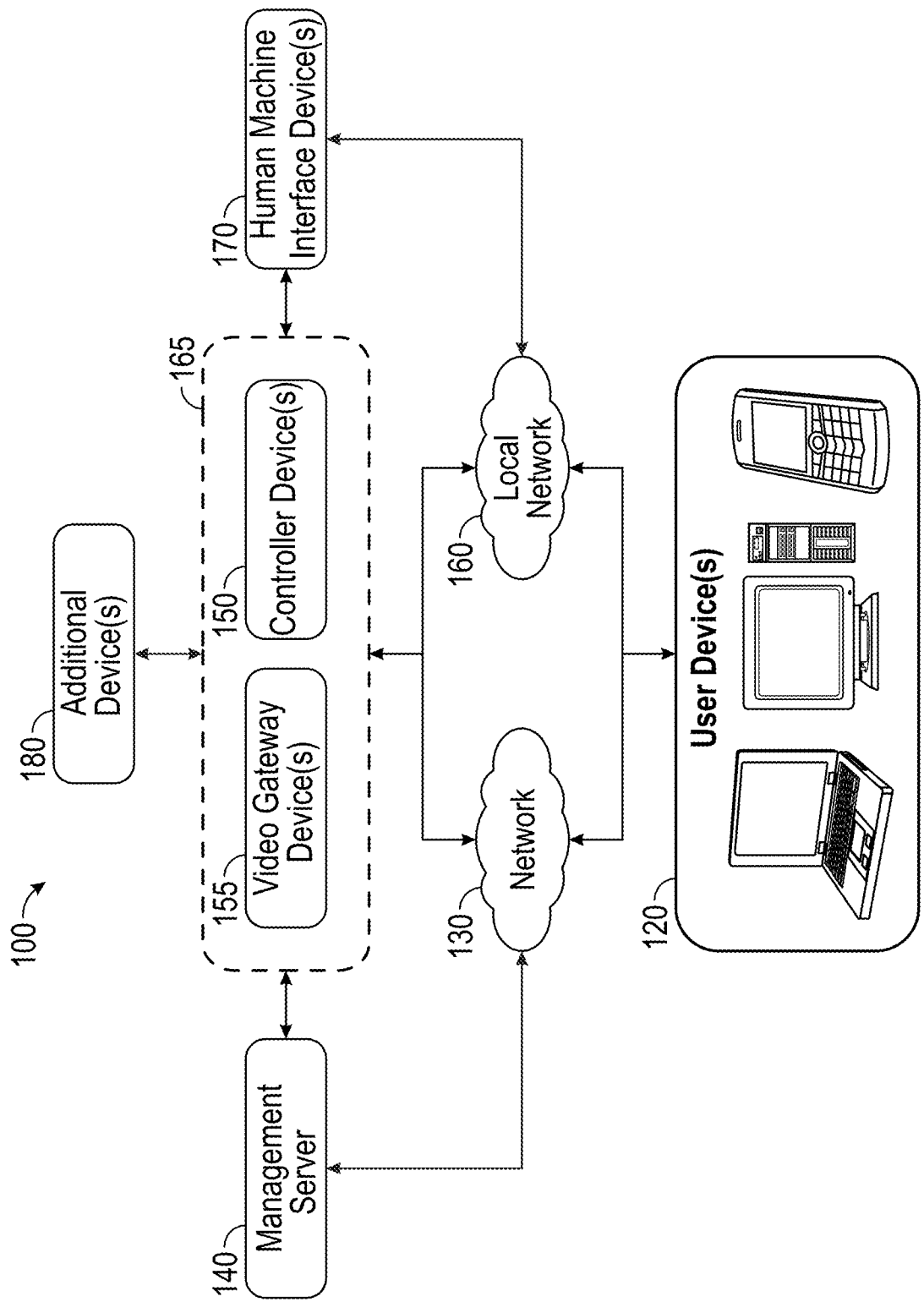
FIG. 1 illustrates a block diagram of an example operating environment in which one or more aspects of the present disclosure may operate, according to various embodiments of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

I. Overview

As mentioned above, according to various embodiments, the present disclosure includes one or more video gateway devices can be configured to monitor areas and machines associated with a manufacturing processes, and generate metadata that can be used for alerts, more efficient searching, and automatic controlling of machines based on certain conditions being satisfied. A local or on-site video gateway can be connected, directly or indirectly, to a plurality of cameras and sensors that are configured to collect video content and sensor data from multiple sources over time. The video gateway can be configured to control machines that can be connected through a programmable logic controller, or similar device (e.g., a controller device). By implementing an AI or machine learning algorithm, the video gateway can process the collected data locally to generate metadata that includes various programmable insights or detections such as motion, dynamics of motion (e.g., speed of motion, direction of motion, range of motion, acceleration, etc.), object detected (e.g., person or machine), object positioning data, object color, protective equipment associated with an object, object dimensions, safety-related detections (e.g., can be determined based on combination of other detections that can be used to indicate a level or safety risk), temperature (e.g., based on data gathered from thermal imaging cameras, sensors, etc.), various behaviors associated with people (e.g., how a person might be operating a machine), ambient information (e.g., outdoor or indoor information), identity (e.g., of persons based on facial analysis, license plate recognition, sensor location or ID data, or the like), or the like. The metadata can track the time ranges that each detection begins and ends for video content associated with each camera such that the metadata is indexed to one or more corresponding video feeds. Such metadata, and other optimized data, can then be transmitted to a cloud service.

In some implementations, using a user interface, a user can program events to take place based on pre-configured criteria or conditions that are based on the collected video content and sensor data. Alert criteria can be programmed to specify video detections or video detection conditions (e.g., conditions based at least in part on one or more video detections) combined with particular sensor events to do one or more of: generating alerts (e.g., email, SMS, push notification associated with an installed application, or API for third party systems), adjusting one or more machines (e.g., by communicating instructions to a controller device from a video gateway), and the like. In a first example, a user can program a machine to automatically turn off if a person detected by one or more cameras is too close to the machine (e.g., for operational safety and/or security). In a second example, a user can program a machine to turn off if no one is nearby to operate the machine (e.g., for operational productivity, efficiency, and/or safety). In some implementations, alerts can be generated as well. For example, if a condition is satisfied (e.g., the two examples described in this paragraph), then a siren or bell located in the facility can be rung indicating that the condition is satisfied. Also, if the same condition is satisfied, instructions for an alert can be transmitted to the cloud service so that the cloud service can send an email or text to a designated device or person.

In some implementations, events can also include the generation of a report upon satisfaction of associated criteria associated with the event. For example, the generated report can include relevant data associated with the event criteria. For example, the relevant data can include one or more video clips as recorded by nearby cameras over a length of time associated with the event criteria, sensor data associated with the event criteria while the event criteria were satisfied, personnel locations or positioning while the event criteria were satisfied, mobile machinery nearby while the event criteria were satisfied (e.g., a forklift, or similar), machine data while the event criteria were satisfied (e.g., indicating operating status or similar metrics), confirmation of any actions taken (e.g., alerts sent out, machines turned off/on, or the like), or other tracked data associated with the event.

Advantageously, aspects of the proposed solution shift the burden of video content review and machine controlling to the local video gateway so that actions and alerts can be automatically generated to maximize or enhance operational safety, security, productivity, and efficiency.

Also, as mentioned above, and according to various embodiments, a user can access recorded or live video content via a user interface that can be accessed remotely or locally, where the user interface can be generated by a remote server. In some implementations, if the user accesses the video content from a remote server or cloud (i.e., not from the local network connected to the video gateway), the user can be presented with a user interface that displays video content that is streamed from the video gateway and routed through the remote server. In some implementations, video content and/or data collected by the video gateway can be processed locally by the video gateway to generate metadata. The generated metadata can then be transmitted to a remote server or cloud to be overlaid on video content that is viewed or streamed by a user. So, when a user accesses the remote server and requests to view particular video content, the remote server can pull the particular video content from the video gateway and combine the video content with metadata that is stored on the cloud in a user interface. In some implementations, metadata can include detections in a video feed, sensor data, and/or machine data. The metadata can also include a time component so that the particular detection can be overlaid on a video at the appropriate times associated with each detection. For example, an interactive seek bar (which may also be referred to as a "timeline" or an "interactive timeline") located on the user interface can allow a user to scroll through selected video content to portions of the video content that are flagged with metadata indicating a particular detection or particular condition is satisfied (e.g., motion detected). In some implementations, the metadata, which is generated by the video gateway and stored on the remote server, can also include video stills that are taken from video content at various intervals so that a user can be presented with video stills while the user is adjusting the video playback location while the video content is being loaded from the video gateway. Also, in some implementations, as the video content is streamed from the video gateway, the remote server can simultaneously download or cache the streamed video content for later viewing by the user or other users accessing the same video content remotely at a later time.

In another implementation, if the user accesses the video content locally (i.e., from the local network connected to the video gateway), the user can be presented with the same user interface as the described with respect to the remote access, where the user interface can be generated by the remote server. However, the video content is transmitted or streamed directly from the video gateway to the user device over the local area network, and not through the cloud. So, when a user accesses the remote server locally on the same network, and requests to view particular video content, the remote server can facilitate the transmission of the video content directly to the user device from the video gateway (e.g., by using WebRTC, or the like), and combine the locally stored video content with remotely stored metadata. The video content and metadata can then be presented at the same time in a user interface displayed on the user device.

Advantageously, aspects of the proposed solution shift the burden of image processing and content or data storage to the on-site video gateway so that internet bandwidth use is optimized for only specific low-file size data, which can also be further influenced by data privacy concerns.

In some implementations, the present disclosure includes one or more video gateway devices that include various configurable input and output ports (which may be configured based on one or more communications specifications and/or configurations of the video gateway devices), e.g., for interacting with and communicating with various additional systems and devices, e.g., associated with a manufacturing line or process. Data may be collected or received by the video gateway devices, and may optionally be processed or analyzed by the video gateway device, based on a configuration of the video gateway device, e.g., to generate insights based on analyzed video, to generate outputs or controls related to various additional systems and devices, e.g., associated with a manufacturing line or process. The video gateway device may provide outputs in response to received data and/or analysis of the received data, e.g., to stop or adjust the manufacturing line or process, take actions, cause sending of alerts, etc. The video gateway device may include on-device memory for storing received data and analyses. The video gateway device may further include additional aspects, including one or more web-servers, for communicating with other devices/systems.

In various embodiments, the video gateway devices may be configured to automatically connect to a remote management server (e.g., a "cloud"-based management server), and may offload received and analyzed data to the remote management server via wired or wireless communications. The video gateway devices may further communicate with the management server, user computing devices, and/or human machine interface devices, e.g., to provide remote access to the gateway device, provide real-time information from the video gateway device, receive configurations/updates, provide interactive graphical user interfaces, and/or the like.

In various embodiments, the management server may aggregate received data and/or analysis data from one or more video gateway devices, and provide statuses, alerts, analyses, etc., including via interactive graphical user interfaces that may be accessed via user computing devices. The management server may provide interactive graphical user interfaces through which a user may configure one or more video gateway devices or one or more controller devices.

In various embodiments, the video gateway devices, controller devices, or backend/remote server/cloud infrastructure may communicate with various additional devices, e.g., various components of a manufacturing line or process, sensors, etc. Such communications may be accomplished via one or more application programming interfaces ("APIs").

Various aspects of the present disclosure may individually and/or collectively provide various technical advantages as described herein, and may overcome various disadvantages of prior art systems and methods. For example, embodiments of the present disclosure may include industrial video gateway devices (also referred to herein as "gateway devices") that may include built-in wireless and/or wired communications capabilities, data storage and offloading capabilities, rapid configuration capabilities, analysis and processing capabilities, automated event execution, and/or additional device control capabilities. The video gateway devices may automatically establish communication with a remote management server. The video gateway devices may be remotely and/or centrally monitored and configured via the management server, e.g., via an interactive graphical user interface accessible from a user computing device. The video gateway devices may include configuration execution capabilities such that they may operate autonomously based on a current configuration. However, the video gateway devices may further include automatic offloading of received data to a remote database (e.g., via the management server). In some embodiments, such received data may be useable by the management server for providing further analyses, insights, alerts, etc. to users via interactive graphical user interfaces. In some embodiments, the video gateway devices can perform some or all of the analysis of received data and provide the results of such analysis to the management server. The video gateway devices may provide remote access to operational data and/or video data through the management server and/or directly to user devices on the same network. Human machine interface devices may communicate with the video gateway devices via wired or wireless, direct or networked communications. The video gateway devices may provide interactive graphical user interfaces to such human machine interface devices, enabling synchronization of video gateway device status at multiple human machine interface devices and/or other user devices. Thus, according to various embodiments of the present disclosure, the video gateway devices and the management server may replace and streamline the multiple layers of technology of prior systems, while also providing added benefits and functionality over prior systems, and maintaining options for interfacing with and working with prior systems (e.g., existing sensors, PLCs, etc.). Furthermore, according to various embodiments of the present disclosure, the video gateway devices and the management server can be configured to transmit limited data between the devices to reduce the bandwidth required.

Advantageously, according to various embodiments, the present disclosure may provide a modern platform that may combine data collection, control, alerts, and analytics in an easy to deploy and easy to use system—from the plant floor to remote sites. Embodiments of the present disclosure may enable management of video gateway devices from a secure cloud dashboard. Embodiments of the present disclosure may provide video gateway devices that combine the local control and data collection and analysis capabilities into a single device designed to meet the harsh demands of various industrial environments, including water/wastewater, oil and gas, and the like.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

II. Terms

In order to facilitate an understanding of the systems and methods discussed herein, a number of terms are defined below. The terms defined below, as well as other terms used herein, should be construed broadly to include the provided definitions, the ordinary and customary meaning of the terms, and/or any other implied meaning for the respective terms. Thus, the definitions below do not limit the meaning of these terms, but only provide example definitions.

User Input (also referred to as "Input"): Any interaction, data, indication, etc., received by a system/device from a user, a representative of a user, an entity associated with a user, and/or any other entity. Inputs may include any interactions that are intended to be received and/or stored by the system/device; to cause the system/device to access and/or store data items; to cause the system to analyze, integrate, and/or otherwise use data items; to cause the system to update to data that is displayed; to cause the system to update a way that data is displayed; to transmit or access data; and/or the like. Non-limiting examples of user inputs include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand or other appendage, a body, a 3D mouse, and/or the like.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments such data may be combined and/or separated in any appropriate way into one or more databases, one or more tables of one or more databases, etc. As used herein, a data source may refer to a table in a relational database, for example.

III. Example Operating Environment

FIG. 1 illustrates a block diagram of an example operating environment 100 in which one or more aspects of the present disclosure may operate, according to various embodiments of the present disclosure. The operating environment 100 may include one or more user devices 120, a management server 140, one or more on-site devices 165 (e.g., a video gateway device 155 and a controller device 150), one or more human machine interface devices 170, and one or more additional devices 180. The various devices may communicate with one another via, e.g., a communications network 130 and/or a local communications network 160, as illustrated.

In various embodiments, communications among the various components of the example operating environment 100 may be accomplished via any suitable means. For example, the on-site devices 165 may communicate with one another, the additional device(s) 180, the human machine interface device(s) 170, the management server 140, and/or the user device(s) 120 via any combination of the network 130, the local network 160, or any other wired or wireless communications means or method (e.g., Bluetooth, WiFi, infrared, cellular, etc.).

Further details and examples regarding the implementations, operation, and functionality, including various interactive graphical user interfaces, of the various components of the example operating environment 100 are described herein in reference to various figures.

a. On-Site Device(s) 165

In some implementations, the on-site devices 165 can include a video gateway device 155 and/or a controller device 150. In some embodiments, functionality of the devices can reside on one device (e.g., the video gateway device 155 or the controller device 150). In some embodiments, functionality can be shared by both devices so that the video gateway device 155 has functionality that is the same, or similar to, functionality of the controller device 150. For example, a controller device 150 can be similar to a gateway device 155 but used for a different, yet similar, purpose such that the controller device 150 is more focused on sensor data and machine controls. In some embodiments, the video gateway device 155 can perform functions unique to the video gateway device 155, and the controller device 150 can perform functions unique to the controller device 150. In some embodiments, a combination of features might be available to both the video gateway device 155 and the controller device 150, some features unique to each device and some features that are shared.

i. Video Gateway Device(s) 155

In general, the video gateway device 155 comprises a housing including processor(s), memory, input/output ports, etc. that may be affixed to, or positioned near, e.g., an industrial process, a manufacturing line, one or more industrial machines, one or more sensors, one or more cameras, and/or the like. The video gateway device 155 provides outputs to, receives inputs from, and otherwise communicates with and/or controls, various additional systems and devices, e.g., associated with an industrial process. In general, the video gateway device 155 receives data from one or more sensors, one or more cameras, and one or more industrial machines (e.g., directly from the machines, or through one or more control devices 150), or the like. The video gateway device 155 may process or analyze data received via the ports of the video gateway device 155, and provide outputs or controls, cause sending of alerts, etc., based on the processing/analyses and based on pre-configured instructions (e.g. default instructions or user-programmed instructions, e.g., as programmed through a graphical user interface through the management server or HID 170). Configurations of the video gateway device 155 may include various analysis algorithms, program instructions, scripts, etc., as described herein. Execution of the configuration may be performed on the video gateway device 155, rather than remotely, to enable rapid responses to the results of analyses of inputs to the video gateway device 155. Received data and analysis results/data may be stored in a memory of the video gateway device 155 (e.g., a computer readable storage medium). The received data and analysis results may also be automatically transmitted from the video gateway device 155, e.g., to management server 140, or to the controller device 150. The management server 140 may thereby receive data and analysis results from multiple video gateway device 155, and may aggregate and perform further analyses on the received data and analysis results from multiple video gateway device 155.

ii. Controller Device(s) 150

In general, the controller device 150 comprises a housing including processor(s), memory, input/output ports, etc. that may be affixed to, or positioned near, e.g., an industrial process, a manufacturing line, one or more industrial machines, and/or the like. The controller device 150 provides outputs to, receives inputs from, and otherwise communicates with and/or controls, various additional systems and devices, e.g., associated with an industrial process. In general, the controller device 150 functions based on a configuration of the controller device 150, which may include various communications specifications (e.g., that indicate functionality of the input and output ports), executable program instructions/code, and/or the like. For example, a controller device 150 can be similar to a gateway device 155 but used for a different, yet similar, purpose such that the controller device 150 is more focused on sensor data and machine controls. Based on the configuration, the controller device 150 may process or analyze data received via the ports of the controller device 150, and provide outputs or controls, cause sending of alerts, etc., based on the processing/analyses. Configurations of the controller device 150 may include various analysis algorithms, program instructions, scripts, etc., as described herein. Execution of the configuration may be performed on the controller device 150, rather than remotely, to enable rapid responses to the results of analyses of inputs to the controller device 150. Received data and analysis results/data may be stored in a memory of the controller device 150 (e.g., a computer readable storage medium). The received data and analysis results may also be automatically transmitted from the controller device 150, e.g., to management server 140, or to the video gateway device 155. The management server 140 may thereby receive data and analysis results from multiple controller devices 150, and may aggregate and perform further analyses on the received data and analysis results from multiple controller devices 150. The management server 140 may communicate with the on-site devices 165 or controller device(s) 150 to enable remote, rapid configuration of the controller device(s) 150. Such configuration may be accomplished via interactive graphical user interfaces provided by the management server 140 and accessible by the user device(s) 120, for example. Via the management server 140, and/or directly by communication with the controller device(s) 150, user device(s) 120 may access substantially real-time views of status, analysis, etc. of the controller device(s) 150. Communications with the controller device(s) 150 may be accomplished via web-servers executing on the controller devices 150 themselves.

a. Management Server 140

In some embodiments, the data and analysis results determined by the video gateway devices 155 can be sent to the management server 140 can be based on pre-configured instructions. In industrial settings, data collected by on-site devices 165 can include gigabytes or terabytes of data. For example, a specific site might include cameras generating up to 7 gigabytes of video data per hour per camera or more (i.e. 7 gb is associated with a single recording with 4 k resolution). Transmitting such large amounts of data in real-time, hourly, daily, or even weekly might be impractical or impossible based on the internet connection available to each specific site. Thus, in some embodiments, the video gateway device 155 processes and analyzes data the video gateway device 155 receives (e.g., from the cameras, sensors, machines, or other equipment) and only transmits a portion of the data to the management server 140. The portion of data transmitted to the management server 140 can include sufficient information so that a user can navigate, search, or otherwise interact with the data from a high level without accessing the remaining data stored on the video gateway device 155. For example, the video gateway device 155 can generate and transmit metadata for each video feed, where the metadata comprises significantly less data than the actual video feed stored on the video gateway device 155 or local storage. The metadata can include detections and insights on each video. For example, a user can program particular detections the user might want to detect and the video gateway device 155 can record a start time and end time associated with the detection, as well as an intensity (e.g., speed, or the like) if applicable. Such programmed detections can be anything relevant to the user such as motion on a particular video feed, motion in a particular location on a particular video feed, distinction of motion of a person or a machine (e.g., a forklift), speed or intensity of detected motion, certain color or colors detected, machine status (e.g., on/off, location/positioning, speed, fuel or battery level, or the like), or a combination of detections. Also, the portion of data transmitted to the management server 140 can include screenshots of video feeds, or reduced resolution or framerate of the video feed, or a combination. For example, the video gateway device 155 can take and transmit screenshots of the associated video data to the management server 140. In some embodiments, while or around the time a detection is occurring, screenshots can be taken in a relatively short time interval (e.g., every 1, 5, 10, or 15 seconds or every 1, 2, 3 minutes, or the like). In some embodiments, while no detections are occurring, screenshots can be taken in a relatively longer time interval (e.g., every 5, 10, 20, or 30 minutes, or the like). Such screenshot data can be presented to a user accessing a user interface via a user device connected to a management server 140 by presenting an appropriate set of screenshots while the user is using an interactive seek bar (which may also be referred to as a "timeline" or an "interactive timeline") associated with a particular video feed, or multiple feeds. For example, a user can navigate through a video by selecting and dragging a point on the seek bar and video the screenshots to navigate to a desired point in time. In some embodiments, a system admin or user can program bandwidth limits, or a default limit can be set (e.g., automatically based on bandwidth capabilities, system configuration, or the like), regarding what data is sent to a management server 140 from the facility (e.g., from the on-site devices 165). In some embodiments, the on-site devices 165 can adjust the quality (e.g., resolution of screenshots) or amount of data (e.g., no screenshots are sent or fewer screenshots are sent so that instead of sending a screenshot for every 30 seconds of video, a screenshot is based on 1 minute intervals) transmitted to the management server 140 based on the programed limits. In some embodiments, data is prioritized so that data that is more likely to be used (e.g., determined automatically by the system based on prior user interactions) will be sent first and less used data will be sent after or during hours of less bandwidth activity.

In some embodiments, the features and services provided by the management server 140 may be implemented as web services consumable via the network 130. In further embodiments, the management server 140 is provided by one or more virtual machines implemented in a hosted computing environment. The hosted computing environment may include one or more rapidly provisioned and released computing resources, which computing resources may include computing, networking and/or storage devices.

b. Human Interface Device(s) 170

In general, the optional human machine interface ("HMI") device(s) 170 may be any computing device such as a desktop, laptop or tablet computer, personal computer, tablet computer, wearable computer, server, personal digital assistant (PDA), hybrid PDA/mobile phone, mobile phone, smartphone, set top box, voice command device, digital media player, and the like. A human machine interface device 170 may execute an application (e.g., a browser, a stand-alone application, etc.) that allows a user to access interactive user interfaces, view analyses or aggregated data, and/or the like as described herein. The human machine interface device(s) 170 may communicate with the on-site devices 165, e.g., via interactive graphical user interfaces provided on the human machine interface device(s) 170. Users may thereby configure and/or monitor status of the on-site devices 165 via the human machine interface device(s) 170. Typically, the human machine interface device(s) 170 may communicate with the on-site devices 165 via a local network (e.g., a network local to, or on-site at, a particular organization).

c. Additional Device(s) 180

The optional additional device(s) 180 may comprise various components of a manufacturing/industrial line or process, cameras, sensors, and/or the like. The on-site devices 165 communicate with the additional device(s) 180 to receive information from the additional device(s) 180, and/or to provide outputs/controls to the additional device(s) 180. Communications with the additional device(s) 180 may be accomplished via one or more application programming interfaces ("APIs"). Communications with the additional device(s) 180 may also be accomplished via intermediate communications with existing or legacy devices, such as specialized PLCs and/or the like. In some embodiments, the additional devices 180 can include one or more communication interfaces that also connect with the management server 140, in addition to, or in place of, communication with the on-site devices 165. Also, in some embodiments, the additional device 180 can include one or more data storage systems that include video or sensor data collected by one or more other systems. For example, a facility may have a legacy system that records video (e.g., a number of cameras around the facility) or tracks various sensors. The collected data can be stored and provided to the video gateway device 155 for integration and analysis (e.g., with AI or machine learning) and to be processed and included with any insights determined, as described herein.

d. User Device(s) 120

Various example user devices 120 are shown in FIG. 1, including a desktop computer, laptop, and a mobile phone, each provided by way of illustration. In general, the user devices 120 can be any computing device such as a desktop, laptop or tablet computer, personal computer, tablet computer, wearable computer, server, personal digital assistant (PDA), hybrid PDA/mobile phone, mobile phone, smartphone, set top box, voice command device, digital media player, and the like. A user device 120 may execute an application (e.g., a browser, a stand-alone application, etc.) that allows a user to access interactive user interfaces, view analyses or aggregated data, and/or the like as described herein. In various embodiments, users may interact with various components of the example operating environment 100 (e.g., the management server 140, the controller device(s) 150, the human machine interface device(s) 170, etc.) via the user device(s) 120. Such interactions may typically be accomplished via interactive graphical user interfaces, however alternatively such interactions may be accomplished via command line, and/or other means.

e. Network 130

The network 130 may include any wired network, wireless network, or combination thereof. For example, the network 130 may be a personal area network, local area network, wide area network, over-the-air broadcast network (e.g., for radio or television), cable network, satellite network, cellular telephone network, or combination thereof. As a further example, the network 130 may be a publicly accessible network of linked networks, possibly operated by various distinct parties, such as the Internet. In some embodiments, the network 130 may be a private or semi-private network, such as a corporate or university intranet. The network 130 may include one or more wireless networks, such as a Global System for Mobile Communications (GSM) network, a Code Division Multiple Access (CDMA) network, a Long Term Evolution (LTE) network, or any other type of wireless network. The network 130 can use protocols and components for communicating via the Internet or any of the other aforementioned types of networks. For example, the protocols used by the network 130 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

a. Local Network 160

The local network 160 may similarly include any wired network, wireless network, or combination thereof. In general, however, the local network 160 illustrated in FIG. 1 represents a network that may be local to a particular organization, e.g., a private or semi-private network, such as a corporate or university intranet. In some implementations, devices may communicate via the local network 160 without traversing an external network 130 such as the Internet. In some implementations, devices connected via the local network 160 may be walled off from accessing the network 130 (e.g., the Internet), e.g., by a gateway device, unless specifically granted access to the network 130. Accordingly, e.g., the human machine interface device(s) 170 (and/or user device(s) 120) may communicate with the controller device 150 directly (via wired or wireless communications) or via the local network 160, without traversing the network 130. Thus, even if the network 130 is down, or is not currently providing connectivity to the management server 140, the controller device(s) 150, the video gateway device(s) 155, and the human machine interface device(s) 170 (and/or the user device(s) 120) may continue to communicate and function via the local network 160 (or via direct communications).

For example, the network 160 may be a personal area network, local area network, wide area network, over-the-air broadcast network (e.g., for radio or television), cable network, satellite network, cellular telephone network, or combination thereof. As a further example, the network 160 may be a publicly accessible network of linked networks, possibly operated by various distinct parties, such as the Internet. In some embodiments, the network 160 may be a private or semi-private network, such as a corporate or university intranet. The network 160 may include one or more wireless networks, such as a Global System for Mobile Communications (GSM) network, a Code Division Multiple Access (CDMA) network, a Long Term Evolution (LTE) network, or any other type of wireless network. The network 160 can use protocols and components for communicating via the Internet or any of the other aforementioned types of networks. For example, the protocols used by the network 160 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

IV. Example Management Device/Server

Figure 2:
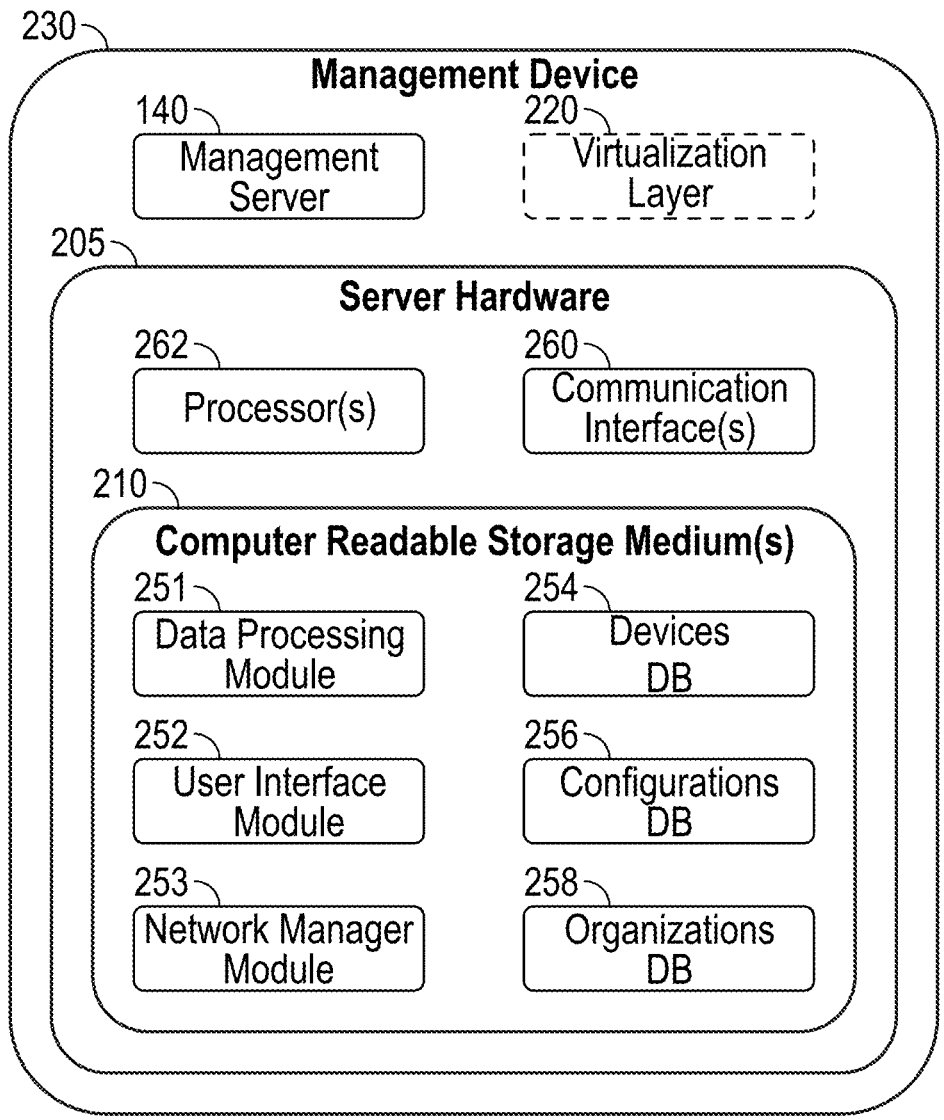
FIG. 2 illustrates a block diagram including an example implementation of a management device, according to various embodiments of the present disclosure.

FIG. 2 illustrates a block diagram including an example implementation of a management device 230, according to various embodiments of the present disclosure. In the example implementation, management device 230 includes management server 140, which management server 140 may be a Web or cloud server, or a cluster of servers, running on one or more sets of server hardware. In an embodiment, the management server 140 works for both single and multi-tenant installations, meaning that multiple organizations with different administrators may have, e.g., multiple controller devices, human machine interface devices, and additional devices managed by the same management server.

In various embodiments, the management server 140, as implemented by the management device 230, may include various other modules, components, engines, etc. to provide the functionality as described herein. It will be appreciated that additional components, not shown, may also be part of the management server 140 and/or the management device 230, and, in certain embodiments, fewer components than that shown in FIG. 2 may also be used in the management server 140 and/or the management device 230.

a. Management Server 140

According to various embodiments, management server 140 may be implemented on management device 230 (or multiple devices similar to management device 230), which includes server hardware 205. Server hardware 205 includes one or more communication interfaces 260, one or more processors 262, and one or more computer readable storage mediums 210, each of which may be in communication with one another. The computer readable storage medium 210 includes data processing module 251, user interface module 252, network manager module 253, devices database 254, configurations database 256, and organizations database 258. In various implementations, the various databases of the management device 230 may be combined or separated/partitioned as appropriate to implement the functionality described herein, and to maintain security and separation of data, e.g., for different organizations. In various implementations, the various databases may or may not be stored separately from the management device 230.

In some embodiments, for example, the management server 140 may include a security module used to manage cryptographic keys, certificates, and/or other data associated with establishing secure communication with various other devices.

b. Server Hardware 205

In various implementations one or more buses, interconnects, wires/cables, etc. may be used to interconnect the various components of the server hardware 205. In various implementations one or more interfaces, APIs, communication layers, buses, interconnects, wires/cables, etc. may be used to interconnect the various components of the management device 230.

In operation, the one or more communication interfaces 260, one or more processors 262, and one or more computer readable storage mediums 210 communicate with one another to, e.g., execute by the processor(s) 262 computer program instructions (e.g., as provided by the user interface module 252); receive, access, and transmit data (e.g., to/from the databases and via the communication interface(s) 260); and/or the like. In general, the server hardware 205 enables the functionality of the management server 140 as described herein. Further implementation details are described below.

i. Communication Interface 260

In operation, the communication interface(s) 260 may provide wired and/or wireless communications with other devices and networks, as described herein. In various embodiments, communications among the various components of the example operating environment 100 may be accomplished via any suitable means. For example, the management server 140 and/or management device 230 may communicate with the video gateway device 155, the controller device 150, the human machine interface device(s) 170, the additional device(s) 180, and/or the user device(s) 120 via any combination of the network 130, the local network 160, or any other communications means or method (e.g., Bluetooth, WiFi, infrared, cellular, etc.). Accordingly, the communications interface(s) 260 may include one or more of wired and wireless transceivers, such as a Joint Test Action Group (JTAG) transceiver, a Bluetooth or Bluetooth Low Energy (LE) transceiver, an IEEE 802.11 transceiver, an Ethernet transceiver, a USB transceiver, a Thunderbolt transceiver, an infrared transceiver, a wireless cellular telephony transceiver (e.g., 2G, 3G, 4G, 5G), or the like.

ii. Data Processing Module 251

In operation, data processing module 251 may provide processing and analysis of data (e.g., data received from the various devices, including the video gateway devices, controller devices, and/or additional devices) as described herein. The data processing/analysis may usefully provide detections, insights, and information that may be provided via various interactive graphical user interfaces, as described herein.

iii. User Interface Module 252

In operation, the user interface module 252 may provide the various interactive graphical user interface functionality described herein. This may include, for example, generating user interface data useable for rendering the various interactive user interfaces described. The user interface data may be used by various computer systems, devices, and/or software programs (for example, a browser program of a user device 120), to render the interactive user interfaces. The interactive user interfaces may be displayed on, for example, electronic displays (including, for example, touch-enabled displays). For example, the user interface module 252 may provide various network accessible interactive graphical user interfaces, e.g., to allow the administrators of the various organizations and devices to create and log into an account associated with an organization to which a set of devices belong (e.g., controller devices and additional devices), and manage, and access data associated with, those devices as described herein.

iv. Network Manager Module 253

In operation, the network manager module 253 may provide communication with and configuration and management of the various devices associated with each organization. This may include, for example, receiving and managing information related to the various devices (e.g., video gateway devices, controller devices, additional devices, and human machine interface devices) at the time of manufacture, associating devices with particular organizations when they are purchased/claimed and implemented by the organizations (e.g., the claiming may be performed at least in part by populating the devices database 254 and the organizations database 258 with appropriate information when the devices are associated with an organization), receiving data from the various devices (e.g., and storing the data in the devices database 254 or other appropriate database), sending data to various devices (e.g., sending and/or syncing configurations stored in the configurations database 256 to/with various devices), and/or the like.

v. Devices Database 254

In operation, the devices database 254 may store information regarding video gateway devices 155, controller devices 150, human machine interface devices 170, and/or additional devices 180, and various relationships and associations among these devices. This information may include identifiers associated with these devices, data received from these devices, analysis data from these devices, etc.

In some embodiments, for example, the devices database 254, as described herein, may include an identifier of each device (e.g., a serial number), a secret to be used to establish a secure communication with the devices of the same organization, and/or a mechanism to authenticate the devices' identity (e.g., the public key of a private public key pair, the private key of which was embedded or stored in the device during the manufacturing, etc.).

vi. Configurations Database 256

In operation, the configurations database 256 may store information regarding configurations of the video gateway devices 155, controller devices 150, human machine interface devices 170, and additional devices 180.

i. Organizations Database 258

In operation, the organizations database 258 may store information regarding the organizations to which video gateway devices 155, controller devices 150, human machine interface devices 170, and additional devices 180 belong.

c. Virtualization Layer 220

While various embodiments do not implement virtualization, alternative embodiments may use different forms of virtualization—represented by a virtualization layer 220 in the management device 230. In these embodiments, the management server 140 and the hardware that executes it form a virtual management server, which is a software instance of the modules and/or databases stored on the computer readable storage medium 210.

For example, in an implementation the management device 230 (or one or more aspects of the management device 230, e.g., the management server 140) may comprise, or be implemented in, a "virtual computing environment". As used herein, the terms "virtual computing environment", "virtualization", "virtual machine", and/or the like should be construed broadly to include, for example, computer readable program instructions executed by one or more processors (e.g., as described below) to implement one or more aspects of the modules and/or functionality described herein. Further, in this implementation, one or more modules/engines/etc. (e.g., user interface module 252) and/or databases of the management device 230 may be understood as comprising one or more rules engines of the virtual computing environment that, in response to inputs received by the virtual computing environment, execute rules and/or other program instructions to modify operation of the virtual computing environment. For example, a request received from the user device(s) 120 may be understood as modifying operation of the virtual computing environment to cause modules to gather data, generate or transmit configurations, generate or transmit user interfaces, etc. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered and/or responses received and analyzed. Initial operation of the virtual computing environment may be understood as an establishment of the virtual computing environment. In some implementations the virtual computing environment may comprise one or more virtual machines, virtualization layers, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the management device 230 as a virtual computing environment may advantageously enable executing different aspects or modules of the system on different computing devices or processors, which may increase the scalability of the system. Implementing one or more aspects of the management device 230 as a virtual computing environment may further advantageously enable sandboxing various aspects, data, or modules of the system from one another, which may increase security of the system by preventing, e.g., malicious intrusion into the system from spreading. Implementing one or more aspects of the management device 230 as a virtual computing environment may further advantageously enable parallel execution of various aspects or modules of the system, which may increase the scalability of the system. Implementing one or more aspects of the management device 230 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

V. Example Controller Device

Figure 3:
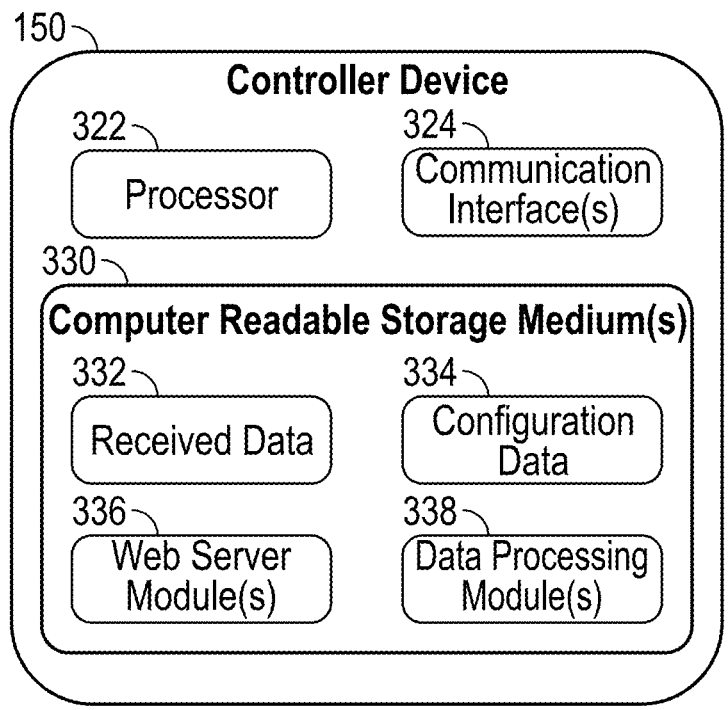
FIG. 3 illustrates a block diagram of an example controller device, according to various embodiments of the present disclosure.

FIG. 3 illustrates a block diagram of an example controller device 150, according to various embodiments of the present disclosure. Controller device 150 may comprise one or more processors 322, one or more communication interfaces 324, and one or more computer readable storage mediums 330, each of which may be in communication with one another. The computer readable storage medium(s) 330 may include received data 332, configuration data 334, web server module(s) 336, and data processing module(s) 338. The received data 332 and the configuration data 334 may be stored in one or more databases of the controller device 150. In various implementations one or more buses, interconnects, wires/cables, etc. may be used to interconnect the various components of the controller device 150, and of the controller device 150 more generally. In some embodiments, the controller device 150 can be in communication with one or more video gateway devices 155. In some embodiments, some or all of the functionality of the controller device 150 can be implemented or included on the video gateway device.

In various embodiments, the controller device 150, may include various other modules from those described below and herein, components, engines, etc. to provide the functionality as described herein. It will be appreciated that additional components, not shown, may also be part of the controller device 150, and, in certain embodiments, fewer components than that shown in FIG. 3 may also be used in the controller device 150.

In various embodiments, firmware of the controller device 150 may be updated such that the controller device 150 may provide additional functionality. Such firmware updating may be accomplished, e.g., via communications with the management server 140, thereby enabling updating of multiple controller devices 150 remotely and centrally. Additional functionality may include, for example, additional communications specifications, additional ways of communicating with additional devices 180 (e.g., additional control languages, etc.), additional configurations or options for configurations, and/or the like.

In operation, the one or more communication interfaces 324, one or more processors 322, and one or more computer readable storage mediums 330 communicate with one another to, e.g., execute by the processor(s) 322 computer program instructions (e.g., as provided by the configuration data 334, the web server module(s) 336, and/or the data processing module(s) 338); receive, access, and transmit data (e.g., to/from the received data 332 and/or configuration data 334, and via the communication interface(s) 324); and/or the like. Further implementation details are described below.

a. Communication Interface(s) 324

In operation, the communication interface(s) 324 may provide wired and/or wireless communications with other devices and networks, as described herein. In various embodiments, communications among the various components of the example operating environment 100 may be accomplished via any suitable means. For example, the controller device(s) 150 may communicate with one another, the additional device(s) 180, the human machine interface device(s) 170, the management server 140, and/or the user device(s) 120 via any combination of the network 130, the local network 160, or any other communications means or method (e.g., Bluetooth, WiFi, infrared, cellular, etc.). Accordingly, the communications interface(s) 324 may include one or more of wired and wireless transceivers, such as a Joint Test Action Group (JTAG) transceiver, a Bluetooth or Bluetooth Low Energy (LE) transceiver, an IEEE 802.11 transceiver, an Ethernet transceiver, a USB transceiver, a Thunderbolt transceiver, an infrared transceiver, a wireless cellular telephony transceiver (e.g., 2G, 3G, 4G, 5G), or the like. The communications interface(s) 324 may further include, for example, serial inputs/outputs, digital inputs/output, analog inputs/outputs, and the like. As noted herein, the communications interface(s) 324 may further include one or more application programming interfaces ("APIs").

As described herein, received data, analysis results, and/or configuration data may be communicated, e.g., via the communications interface(s) 324, to other devices, such as the management server 140 and/or user device(s) 120. For example, the controller device 150 may be configured to reliably and securely offload data and to transmit the data to the management server 140 regardless of whether the connectivity of the controller device 150 (e.g., to the management server 140) is intermittent. For example, data may be stored by the controller device 150 until connectivity is available, and may then transmit the data to the management server 140.

In various implementations, as described above, the controller device(s) 150 may communicate with one or more additional devices 180, which may include, e.g., various components of a manufacturing/industrial line or process, sensors, etc. Communications with additional device(s) 180 may be via direct (e.g., not via a network) wired and/or wireless communications, and/or may be via a network (e.g., a local network) wired and/or wireless communications. Such communications may be accomplished via one or more APIs. Communications with the additional device(s) 180 may also be accomplished via intermediate communications with existing or legacy devices, such as specialized PLCs (e.g., the controller device 150 may include PCL control languages for communicating with PLCs, such as IEC 61131-3), and/or the like.

In various implementations, as described above, the controller device(s) 150 may communicate with one or more human machine interface devices 170. Communications with human machine interface device(s) 170 may be via direct (e.g., not via a network) wired and/or wireless communications, and/or may be via a network (e.g., a local network) wired and/or wireless communications. Via communications with the human machine interface device(s) 170, users may configure and/or monitor status of the controller device 150. As described herein, the controller device(s) 150 may advantageously communicate with the human machine interface device(s) 170 via the web server module(s) 336.

b. Received Data 332

In operation, the received data 332 includes any operational data, analysis data or results, or data received from the various additional devices 180 by the controller device 150, e.g., via the various input/output ports of the controller device 150. Such received data 332 may include data processed by the controller device 150 (e.g., via the data processing module(s) 338).

c. Configuration Data 334

In operation, the configuration data 334 includes one or more configurations that configure operation of the controller device 150, as described herein. For example, such configurations may be received from a user and/or the management device 230 (and/or other devices in communication with the controller device 150), and may include various communications specifications (e.g., that indicate functionality of the input and output ports), executable program instructions/code, algorithms or processes for processing the received data, and/or the like. The controller device 150 may store multiple configurations in the configuration data 334, which may be selectively run or implemented, e.g., via user selection via the management server 140, the human machine interface device(s) 170, and/or the user device(s) 120.

d. Web Server Module 336

In operation, the web server module(s) 336 may include program code executable, e.g., by the processor(s) 322 to provide a web-based access (e.g., interactive graphical user interfaces accessible via web-based communications protocols, rendering of interactive graphical user interfaces written in web-based languages by web-based browsers, etc.) to the controller device 150, e.g., to configure the controller device 150 and/or access data of the controller device 150, as further described herein. Such web-based access may be via one or more communications protocols, e.g., TCP/IP, UDP, WebRTC, etc., and may include one or more secure communications/cryptographic protocols, e.g., TLS, SSL, etc., and may further be provided via communications interface(s) 324. This may include, for example, generating user interface data useable for rendering the various interactive user interfaces described. The user interface data may be used by various computer systems, devices, and/or software programs (for example, a browser program of a user device 120), to render the interactive user interfaces. The interactive user interfaces may be displayed on, for example, electronic displays (including, for example, touch-enabled displays). In various implementations one or more of the management server 140, user device(s) 120, and human machine interface device(s) 170 may communicate with the controller device 150 via one or more of the web server module(s) 336.

e. Data Processing Module 338

In operation, the data processing module(s) 338 may provide processing and analysis of received data, as described herein. The type of processing and analysis may be provided by the configuration data 334, and may result in one or more outputs from the controller device 150 that may be provided via the communications interface(s) 324, as further described herein. In various implementations, the data processing module(s) 338 may be executed by the processor(s) 322, which processor(s) 322 may include various types of processors including special purposes processors, e.g., Graphics Processing Units ("GPUs"), Application Specific Integrated Circuits ("ASICs"), Field-Programmable Gate Arrays ("FPGAs"), and/or the like.

VI. Example Human Machine Interface Device

Referring again to FIG. 1, human machine interface ("HMI") device(s) 170 may comprise computing devices that provide a means for a user to interact with a device. Human machine interfaces may comprise user interfaces or dashboards that connect a user with a machine, system, or device, commonly used in industrial processes. In various implementations, human machine interface device(s) 170 comprise computer devices with a display and a mechanism for user input (e.g., mouse, keyboard, voice recognition, touch screen, and/or the like). In an implementation, the human machine interface device(s) 170 comprise tablet computing devices.

As noted above, the human machine interface device(s) 170 may communicate with the video gateway device 155, the controller device 150, and/or the management server 140 via direct (e.g., not via a network) wired and/or wireless communications, and/or via a network (e.g., a local network) wired and/or wireless communications. In one example, a human machine interface device 170 communicates with a controller device 150 via a local network and a web server module 336 of the controller device 150. In this example, the human machine interface device 170 is directed to connect with the controller device 150 (e.g., via an IP address and, optionally, a particular port of the controller device 150, or a unique identifier or name associated with the controller device 150) of the controller device 150, and the web server module 336 of the controller device 150 provides a browser-renderable webpage including an interactive HMI. The interactive HMI may include a current status or configuration of the controller device 150, options to change configuration of the controller device 150, and/or the like.

Advantageously, according to various embodiments, a user may configure an interactive HMI user interface layout via the management server 140 (and/or the controller device(s) 150 via the management server 140), and may then push the interactive HMI user interface layout configuration to one or more on-site devices 165 (e.g., via the management server 140). In some embodiments, the controller device(s) 150 may then provide the configured interactive HMI via the web server module(s) 336 as described herein. Advantageously, such functionality may enable remote and centralized configuration of interactive HMIs (and possible duplication of HMIs to multiple controller devices 150) without requiring direct programming or interaction with the controller device(s) 150 or human machine interface device(s) 170.

Advantageously, because the HMI is provided by a web server module 336 of the controller device 150, multiple human machine interface devices 170, and/or the management server 140 may simultaneously access and/or communicate with the controller device 150 (e.g., via the HMI provided via the web server module(s) 336, and/or via other communications means), and a current configuration/status of the controller device 150 may be accurately kept synchronized/kept up-to-date from each device.

In various embodiments, configurations may be received by the on-site devices 165 from, e.g., the management server 140, human machine interface device(s) 170, and the user device(s) 120. In various embodiments, the interactive HMIs may comprise relatively streamlined interactive graphical user interfaces. For example, the interactive HMIs may comprise relatively few large buttons by which a user may select to stop a currently running configuration, may select a different configuration from a list (e.g., of configurations stored on the controller device 150 or video gateway device 165), may search for a different configuration, and/or may monitor a current status of inputs/outputs, analyses, and/or the like. Examples of information that may be included in HMIs include real-time current values of machine inputs, e.g., production count, power levels, value, progress bar, status light, on/off light, etc. Examples of additional buttons/functionality that may be included in HMIs include toggling an analog/digital I/O on/off, sending a Modbus signal or analog I/O signal, starting or stopping a production run, etc.

VII. Example Additional Devices

Referring again to FIG. 1, additional device(s) 180 may include, e.g., various components of a manufacturing/industrial line or process, video cameras, sensors, and/or the like. For example, additional device(s) 180 may include detector devices that may include a trigger input to the on-site devices 165, reject devices to which the on-site devices 165 may provide an output to reject articles, machinery inputs to which the on-site devices 165 may provide an output in response to various data analyses (e.g., to speed up or slow down a manufacturing process, to adjust a manufacturing process, to actuate or operate a machine, to execute a process, to activate or deactivate a light or process, to communicate with an automated process or device, to communicate with a software program, etc.), multiple components/devices on a manufacturing line to which the on-site devices 165 may provide configurations, sensors that may provide on-site devices 165 with input information that may be used by the on-site devices 165 and/or provided by the on-site devices 165 to the management server 140, and/or the like. Additional non-limiting examples of additional device(s) 180 include:

Sensors/monitors (e.g., temperature, positioning/location, levels, vibration, power, pressure, etc.)
Video Cameras (e.g., video, audio, position, motion, etc.)
Facility meters (e.g., water, air, gas, energy, steam, etc.)
Machine/systems I/O (e.g., relays, contacts, valves, flow, etc.)
Legacy equipment (e.g., programmable logic controllers ("PLCs"), controllers, etc.)

As described herein, additional device(s) 180 may be communicated with and/or configured via the on-site devices 165. In some embodiments, communications with the additional device(s) 180 may also be accomplished via intermediate communications with existing or legacy devices, such as specialized PLCs and/or the like. Alternatively, additional device(s) 180 may be communicated with and/or configured via communication with human machine interface device(s) 170, management server 140, and/or user device(s) 120. Data and information gathered from the additional device(s) 180 may be provided to the management server 140, e.g., via the on-site devices 165 and/or directly (e.g., via a network).

In various implementations one or more of, or a combination of, the on-site devices 165, the management server 140, and/or the human machine interface device(s) 170 may provide an application programming interface ("API") by which communications may be accomplished with the additional device(s) 180.

VIII. Example Controller Device Physical Implementation

Figure 4:
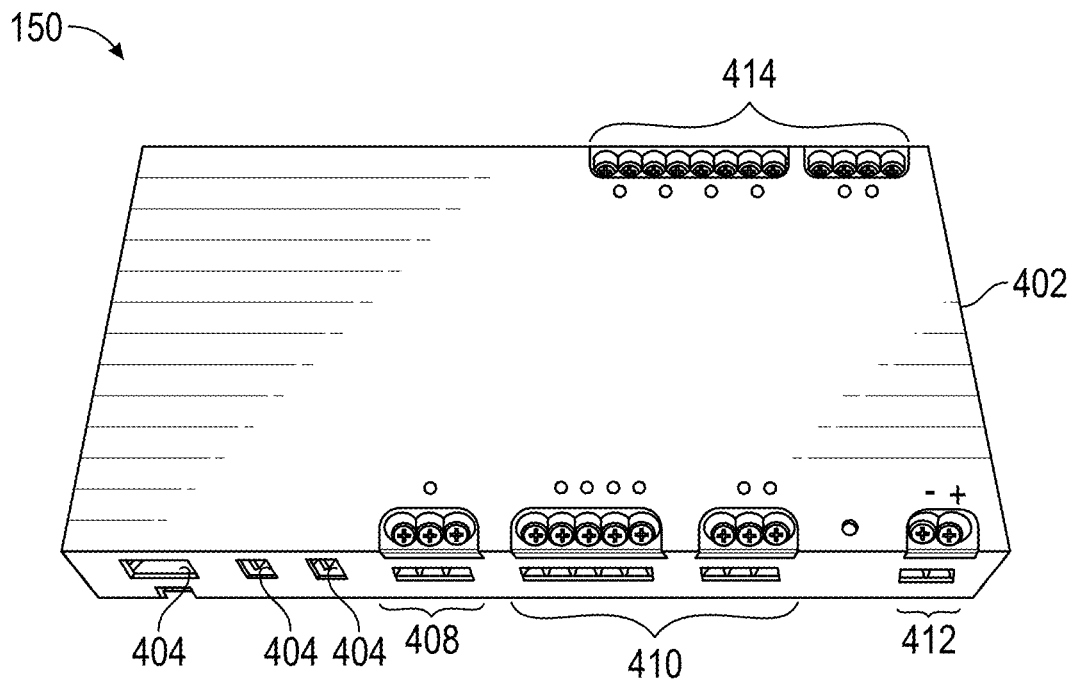
FIG. 4 is a diagram of an example physical implementation of a controller device, according to various embodiments of the present disclosure.

FIG. 4 is a diagram of an example physical implementation of the controller device 150, according to various embodiments of the present disclosure. As described herein, while the embodiment described in reference to FIG. 4 shows one example implementation of the controller device 150, other implementations are contemplated, including implementations that place the various communications interfaces 324 in different locations, or that include more or fewer communications interfaces 324, etc. In various implementations, the controller device 150 may support scalable expansion input/output ("I/O") modules for higher density applications.

FIG. 4 shows a front perspective view of the controller device 150. As shown, the controller device 150 may include a housing 402, which may be made of metal (e.g., aluminum, stainless steel, etc.), plastic (e.g., UV-stabilized polycarbonate, etc.), and/or any other suitable material or combination of materials. The housing 402 may include various ports/connectors (e.g., communications interfaces 324), e.g., for interfacing with additional device(s) 180. For example, the controller device 150 may include an Ethernet port 404, one or more USB ports 406, serial I/O ports 408 (e.g., RS232, RS485, and/or the like), digital I/O ports 410 (which may include counters), and analog I/O ports 414. The controller device 150 may further include power ports 412.

In an implementation, the serial I/O ports 408 are ESD protected, and support RS485 (up to 20 Mbps, 2-wire, half-duplex), RS232 (up to 1 Mbps, 2-wire, full or half-duplex), and various serial protocols (e.g., Modbus slave/master). Various other implementations and specifications of the serial I/O ports 408 are contemplated.

In an implementation, the digital I/O ports 410 may include six pins, each being configurable as input or outputs (open-drain), with ESD/EFT/Surge protection. As inputs, the digital I/O ports 410 may provide dry-contact (internally sourced 3.3V @1 mA) or wet-contact (0-30V). As outputs, the digital I/O ports 410 may provide sinking MOSFET outputs, rated 30V, 0.5 A. In an implementation, the digital I/O ports 410 may include two counter inputs with 0-30V, and up to 10 Hz (dry-contact) or up to 10 kHz (wet-contact). Various other implementations and specifications of the digital I/O ports 410 are contemplated.

In an implementation, the analog inputs may include four isolated channels with 0-12 V or 0-24 mA, with a 14-bit ADC resolution, with an accuracy of 0.1% FSR at 25 C, with ESD/EFT/Surge protection, and with an input resistance at 24 mA of 300 ohm. In an implementation, the analog outputs may include two isolated channels with 0-12 V or 0-24 mA, with a 16-bit resolution, with an accuracy of +/−0.2% FSR at 25 C, with ESD/EFT/Surge protection, with a settling time of 5 μs, and with a load range of 1000 ohm (12V)-600 ohm (20 mA). Various other implementations and specifications of the analog I/O ports 414 are contemplated.

In an implementation, the power ports 412 and the controller device 150 may support 10-28 Vdc, and may have a maximum power draw of 10.8 W @ 12V without analog outputs, and 20 W @ 12V with analog inputs. Various other implementations and specifications of the power ports 412 and power characteristics of the controller device 150 are contemplated. In various embodiments, the controller device 150 may include a power supply internal to the housing 402, or external to the housing 402, which may provide power to the controller device 150.

In an implementation, the controller device 150 has general dimensions of 180 mm×118 mm×32 mm. In alternative implementations the controller device 150 may have different dimensions. In an implementation, the controller device 150 housing is rated IP67 under IEC standard 60529. In an implementation, the controller device 150 may be certified for hazardous locations Class 1, Division 2, Groups A, B, C, and D (as defined by the National Electric Code ("NEC") in Articles 500 to 506). In various implementations the controller device 150 may have other ratings, certifications, or classifications.

As described herein, advantageously the functionality of the various I/O ports of the controller device 150 may be configured to particular applications, and may be re-configured as needed, via centralized communication with the management server 140.

IX. Example Video Gateway Device

Figure 5:
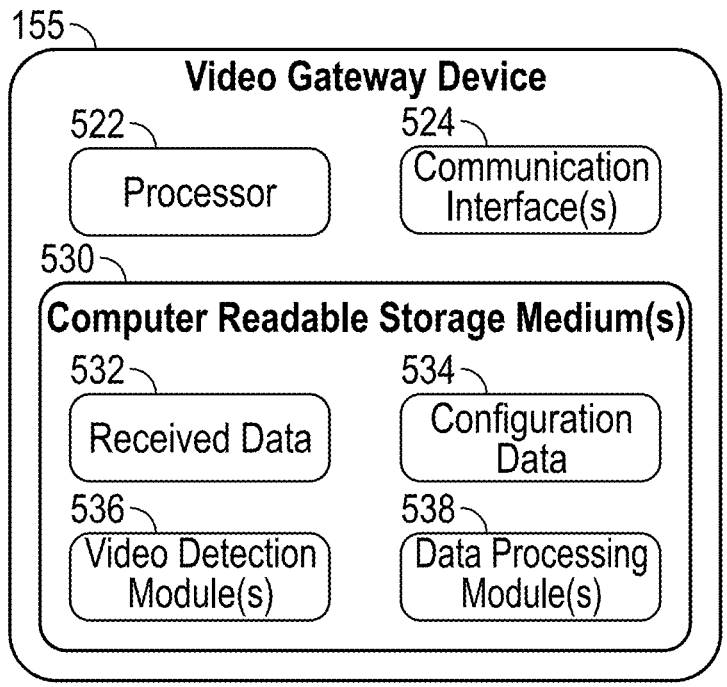
FIG. 5 illustrates a block diagram of an example video gateway device, according to various embodiments of the present disclosure.

FIG. 5 illustrates a block diagram of an example video gateway device 155, according to various embodiments of the present disclosure. Video gateway device 155 may comprise one or more processors 522, one or more communication interfaces 524, and one or more computer readable storage mediums 530, each of which may be in communication with one another. The computer readable storage medium(s) 530 may include received data 532, configuration data 534, video detection module(s) 536, and data processing module(s) 538. The received data 532 and the configuration data 534 may be stored in one or more databases of the video gateway device 155. In various implementations one or more buses, interconnects, wires/cables, etc. may be used to interconnect the various components of the video gateway device 155, and of the video gateway device 155 more generally.

In various embodiments, the video gateway device 155, may include various other modules from those described below and herein, components, engines, etc. to provide the functionality as described herein. It will be appreciated that additional components, not shown, may also be part of the video gateway device 155, and, in certain embodiments, fewer components than that shown in FIG. 5 may also be used in the video gateway device 155.

In various embodiments, firmware of the video gateway device 155 may be updated such that the video gateway device 155 may provide additional functionality. Such firmware updating may be accomplished, e.g., via communications with the management server 140, thereby enabling updating of multiple video gateway device 155 remotely and centrally. Additional functionality may include, for example, additional communications specifications, additional ways of communicating with additional devices 180 (e.g., additional control languages, etc.), additional configurations or options for configurations, and/or the like.

In operation, the one or more communication interfaces 524, one or more processors 522, and one or more computer readable storage mediums 530 communicate with one another to, e.g., execute by the processor(s) 522 computer program instructions (e.g., as provided by the configuration data 534, the video detection module(s) 536, and/or the data processing module(s) 538); receive, access, and transmit data (e.g., to/from the received data 532 and/or configuration data 534, and via the communication interface(s) 524); and/or the like. Further implementation details are described below. In an example, the one or more computer readable storage mediums 530 can be configured to store 16 terabytes of data. In other examples, more or less data can be stored. In some embodiments, the one or more communication interfaces 524 can include a wireless cellular connection, an Ethernet connection, a WiFi connection, other wired or wireless connection. Having multiple options to connect might also be implemented (e.g., as multiple Network Interface Connections or NICs) so that access to stored data won't be blocked or otherwise impacted if one of the networks is down, offline, or slow.

In various embodiments, data analysis and/or decision making performed by video gateway device 155 (e.g., by the data processing module(s) 538) may include execution of deterministic and/or non-deterministic analysis algorithms. In some examples, the video gateway device 155 may use machine learning and/or artificial intelligence algorithms for detection of patterns in the received data. Accordingly, based on the data processing/analysis, the device may provide outputs, e.g., via communications interface(s) 524, that may be provided to any external device, e.g., additional device(s) 180. Examples of such outputs are described herein.

The received data and analysis data (e.g., any and/or all information associated with the analysis/processing, including, e.g., features detected, decisions made, etc.) may be stored and/or logged by the video gateway device 155, e.g., in a memory/computer readable storage medium. In some implementations, the received data and analysis data may be stored indefinitely. In some implementations, the received data and analysis data may be stored for a period of time, e.g., rolling based on an acquisition date/time, and then deleted. In some implementations, the received data and analysis data may be stored or not stored, or stored for a period of time, based on an outcome/decision of the applicable processing/analysis. For example, data associated with positive outcome/events/determinations may be stored for a shorter period of time (or not at all), while data associated with adverse outcome/events/determinations may be stored for a longer period of time. In some implementations, storage of the received data and analysis data may be based on any combination of the above. In general, the analysis, processing, etc. of data may generally and broadly be referred to herein as "evaluation" of data.

Advantageously, the video gateway device 155 may also offload received data and analysis data to the management server 140 (for storage and further analysis by the management server 140) via wired or wireless communications (e.g., via communications interface(s) 524). In some implementations, the received data and analysis data may be offloaded prior to deletion of such data on the video gateway device 155. In some implementations, the received data and analysis data may be offloaded in real-time or substantially real-time, or as long as communication with the management server 140 is available. In some implementations, the received data and analysis data may be offloaded periodically, in batches, and/or on demand. In some implementations, the received data and analysis data may be offloaded or not offloaded based on an outcome/decision of the applicable processing/analysis. In some implementations, the received data and analysis data may be offloaded based on and age of the received data and analysis data. In some implementations, the received data and analysis data may be offloaded or not offloaded based on network bandwidth availability, time of day (e.g., to preserve bandwidth during business hours), a threshold or cap on network bandwidth usage, and/or the like. In some implementations, offloading of the received data and analysis data may be based on any combination of the above.

In an implementation, a livestream of the received and/or analysis data (e.g., live operational data) may be provided to external devices. For example, a livestream may be provided via any suitable communications protocol, and one or more communications interface(s) 524, to user device(s) 120 (e.g., via any combination of network 130, local network 160, or management server 140). Accordingly, a user may access the livestream in an interactive graphical user interface provided on a user device 120. Advantageously, the livestream may be provided via a separate communications path/web server, to avoid the overhead and resulting reduced efficiency that may be incurred if a livestream was obtained further down the processing pipeline.

a. Communication Interface(s) 524

In operation, the communication interface(s) 524 may provide wired and/or wireless communications with other devices and networks, as described herein. In various embodiments, communications among the various components of the example operating environment 100 may be accomplished via any suitable means. For example, the on-site devices 165 may communicate with one another, the additional device(s) 180, the human machine interface device(s) 170, the management server 140, and/or the user device(s) 120 via any combination of the network 130, the local network 160, or any other communications means or method (e.g., Bluetooth, WiFi, infrared, cellular, etc.). Accordingly, the communications interface(s) 524 may include one or more of wired and wireless transceivers, such as a Joint Test Action Group (JTAG) transceiver, a Bluetooth or Bluetooth Low Energy (LE) transceiver, an IEEE 802.11 transceiver, an Ethernet transceiver, a USB transceiver, a Thunderbolt transceiver, an infrared transceiver, a wireless cellular telephony transceiver (e.g., 2G, 3G, 4G, 5G), or the like. The communications interface(s) 524 may further include, for example, serial inputs/outputs, digital inputs/output, analog inputs/outputs, and the like. As noted herein, the communications interface(s) 524 may further include one or more application programming interfaces ("APIs").

As described herein, received data, analysis results, and/or configuration data may be communicated, e.g., via the communications interface(s) 524, to other devices, such as the management server 140, other on-site devices 165, and/or user device(s) 120. For example, the video gateway device 155 may be configured to reliably and securely offload data and to transmit the data to the management server 140 regardless of whether the connectivity of the video gateway device 155 (e.g., to the management server 140) is intermittent. For example, data may be stored by the video gateway device 155 until connectivity is available, and may then transmit the data to the management server 140.

In various implementations, as described above, the video gateway device(s) 155 may communicate with one or more additional devices 180, which may include, e.g., various components of a manufacturing/industrial line or process, sensors, cameras, etc. Communications with additional device(s) 180 may be via direct (e.g., not via a network) wired and/or wireless communications, and/or may be via a network (e.g., a local network) wired and/or wireless communications. Such communications may be accomplished via one or more APIs. Communications with the additional device(s) 180 may also be accomplished via intermediate communications with existing or legacy devices, such as specialized PLCs (e.g., the controller device 150 or video gateway device 155 may include PCL control languages for communicating with PLCs, such as IEC 61131-3), and/or the like.

In various implementations, as described above, the video gateway device(s) 155 may communicate with one or more human machine interface devices 170. Communications with human machine interface device(s) 170 may be via direct (e.g., not via a network) wired and/or wireless communications, and/or may be via a network (e.g., a local network) wired and/or wireless communications. Via communications with the human machine interface device(s) 170, users may configure and/or monitor status of the video gateway device 155.

b. Received Data 532

In operation, the received data 532 includes any operational data, analysis data or results, or data received from the various additional devices 180 by the video gateway device 155, e.g., via the various input/output ports of the video gateway device 155. Such received data 532 may include data processed by the video gateway device 155 (e.g., via the data processing module(s) 538).

c. Configuration Data 534

In operation, the configuration data 534 includes one or more configurations that configure operation of the video gateway device 155, as described herein. For example, such configurations may be received from a user and/or the management device 230 (and/or other devices in communication with the video gateway device 155), and may include various communications specifications (e.g., that indicate functionality of the input and output ports), executable program instructions/code, algorithms or processes for processing the received data, and/or the like. The video gateway device 155 may store multiple configurations in the configuration data 534, which may be selectively run or implemented, e.g., via user selection via the management server 140, the human machine interface device(s) 170, and/or the user device(s) 120.

d. Video Detection Module 536

In operation, the video detection module(s) 536 may include program code executable, e.g., by the processor(s) 522 to review video data or video content received from one or more cameras. In some embodiments, the video data can include corresponding audio data or sensor data (e.g., motion sensors, positioning, etc.) as well.

In some embodiments, the video gateway can process the collected data locally to generate metadata that includes various programmable insights or detections such as motion, dynamics of motion (e.g., speed of motion, direction of motion, range of motion, acceleration, etc.), object detected (e.g., person or machine), object positioning data, object color, protective equipment associated with an object, object dimensions, safety-related detections (e.g., can be determined based on combination of other detections that can be used to indicate a level or safety risk), temperature (e.g., based on data gathered from thermal imaging cameras, sensors, etc.), various behaviors associated with people (e.g., how a person might be operating a machine), ambient information (e.g., outdoor or indoor information), identity (e.g., of persons based on facial analysis, license plate recognition, sensor location or ID data, or the like), or the like. The metadata can be indexed (e.g., to a corresponding video recording or video feed) to track the time ranges that each detection begins and ends for video content associated with each camera. Such metadata, and other optimized data, can then be transmitted to a cloud service (e.g., the management device 230 via the communication interface 524).

In some embodiments, the video detection module can include a machine learning component that can be used to assist the video gateway device 155 in determining various detections based on received data. For example, the machine learning component can implement machine learning algorithms or artificial intelligence (AI) to generate models that are executed by processor 522. In some embodiments, the machine learning component can use one or more machine learning algorithms to generate one or more models or parameter functions for the detections. The machine learning component can be configured to generate a model that understands which types of data indicate which types of detections. One or more of these models may be used to determine an expected value or occurrence based on analysis of received data. In some embodiments, video recording criteria (e.g., pre-configured video recording criteria) can be designated by a user, admin, or automatically. For example, the video recording criteria can indicate which types of detections to monitor, record, or analyze. By designating specific types of detections, resources (e.g., processing power, bandwidth, etc.) can be preserved for only the types of detections desired. Types of detections are described in more detail herein.

A number of different types of algorithms may be used by the machine learning component to generate the models. For example, certain embodiments herein may use a logistical regression model, decision trees, random forests, convolutional neural networks, deep networks, or others. However, other models are possible, such as a linear regression model, a discrete choice model, or a generalized linear model. The machine learning algorithms can be configured to adaptively develop and update the models over time based on new input received by the machine learning component. For example, the models can be regenerated on a periodic basis as new received data is available to help keep the predictions in the model more accurate as the data is collected over time. Also, for example, the models can be regenerated based on configurations received from a user or management device (e.g., 230).

Some non-limiting examples of machine learning algorithms that can be used to generate and update the models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

These machine learning algorithms may include any type of machine learning algorithm including hierarchical clustering algorithms and cluster analysis algorithms, such as a k-means algorithm. In some cases, the performing of the machine learning algorithms may include the use of an artificial neural network. By using machine-learning techniques, large amounts (such as terabytes or petabytes) of received data may be analyzed to generate models without manual analysis or review by one or more people.

e. Data Processing Module 538

Figure 6:
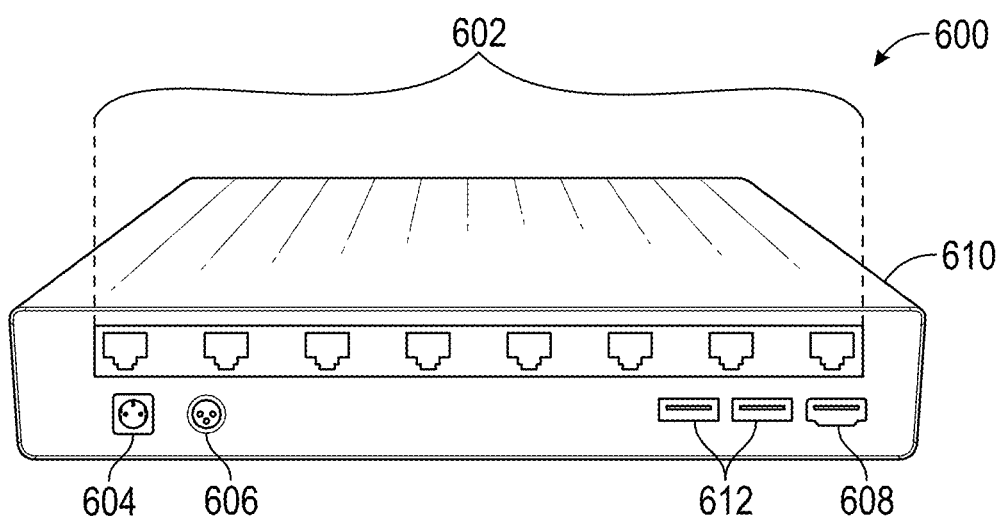
FIG. 6 is a diagram of an example physical implementation of a video gateway device, according to various embodiments of the present disclosure.

In operation, the data processing module(s) 538 may provide processing and analysis of received data, as described herein. The type of processing and analysis may be provided by the configuration data 534, and may result in one or more outputs from the video gateway device 155 that may be provided via the communications interface(s) 524, as further described herein. In various implementations, the data processing module(s) 538 may be executed by the processor(s) 522, which processor(s) 522 may include various types of processors including special purposes processors, e.g., Graphics Processing Units ("GPUs"), Application Specific Integrated Circuits ("ASIC s"), Field-Programmable Gate Arrays ("FPGAs"), and/or the like X. Example Video Gateway Device Physical Implementation FIG. 6 is a diagram of an example physical implementation of the video gateway device 155, according to various embodiments of the present disclosure. As described herein, while the embodiment described in reference to FIG. 6 shows one example implementation of the video gateway device 155, other implementations are contemplated, including implementations that place the various communications interfaces 524 in different locations, or that include more or fewer communications interfaces 524, etc. In various implementations, the video gateway device 155 may support scalable expansion input/output ("I/O") modules for higher density applications.

FIG. 6 shows a rear perspective view of the video gateway device 155. As shown, the video gateway device 155 may include a housing 610, which may be made of metal (e.g., aluminum, stainless steel, etc.), plastic (e.g., UV-stabilized polycarbonate, etc.), and/or any other suitable material or combination of materials. The housing 610 may include various ports/connectors (e.g., communications interfaces 524), e.g., for interfacing with additional device(s) 180. For example, the video gateway device 155 may include one or more Ethernet ports 602, one or more USB ports 612, one or more video I/O ports 608, audio I/O ports 606, serial I/O ports (e.g., RS232, RS485, and/or the like), digital I/O ports (which may include counters), and analog I/O ports. The controller device 150 may further include a power port 604.

In an implementation, the Ethernet ports 602 are can be configured to receive data from one or more cameras or sensors. In some embodiments, the Ethernet ports 602 can include Power over Ethernet (PoE) to devices connected to the video gateway device 155. For example, the Ethernet ports 602 can be based on the IEEE 802.3af-2003 specification providing up to 15.4 W of DC power (minimum 44 V DC and 350 mA) on each port. Various other implementations and specifications of the Ethernet ports 602 are contemplated.

In an implementation, the video I/O port 608 can be configured to output video, for example, to a local monitor or another device for processing or storage. For example, the video I/O port 608 can be based on the HDMI 2.0 or 2.1 specifications. Various other implementations and specifications of the video I/O port 608 are contemplated.

In an implementation, the power port 604 can be configured to accept a wired connection to supply sufficient power to the video gateway device 155. In various embodiments, the video gateway device 155 may include a power supply internal to the housing 610, or external to the housing 610, which may provide power to the video gateway device 155. For example, the power supply provide AC power ranging between 100-240V and at 250 W (e.g., AC100-240V 250 W ATX DC-in 19V~24V). In some embodiments, the power draw is estimated to be about 0.3696 kWh per day. Various other implementations and specifications of the power port 604 are contemplated.

In an implementation, the video gateway device 155 has general dimensions of 300 mm×250 mm×57 mm. In alternative implementations the video gateway device 155 may have different dimensions. In an implementation, the video gateway device 155 provides storage for internal hard drives (e.g., one or more 3.5" HDD bays, one or more SSD drives, one or more M.2 memory slots, etc.). In an implementation, the video gateway device 155 provides storage for additional internal or external hard drives (e.g., one or more 3.5" HDD bays, one or more SSD drives, one or more M.2 memory slots, etc.). In various implementations, the video gateway device 155 may other components or bays included for expanded functionality.

As described herein, advantageously the functionality of the various I/O ports of the controller device 150 may be configured to particular applications, and may be re-configured as needed, via centralized communication with the management server 140.

XI. Alerts

Figure 7A:
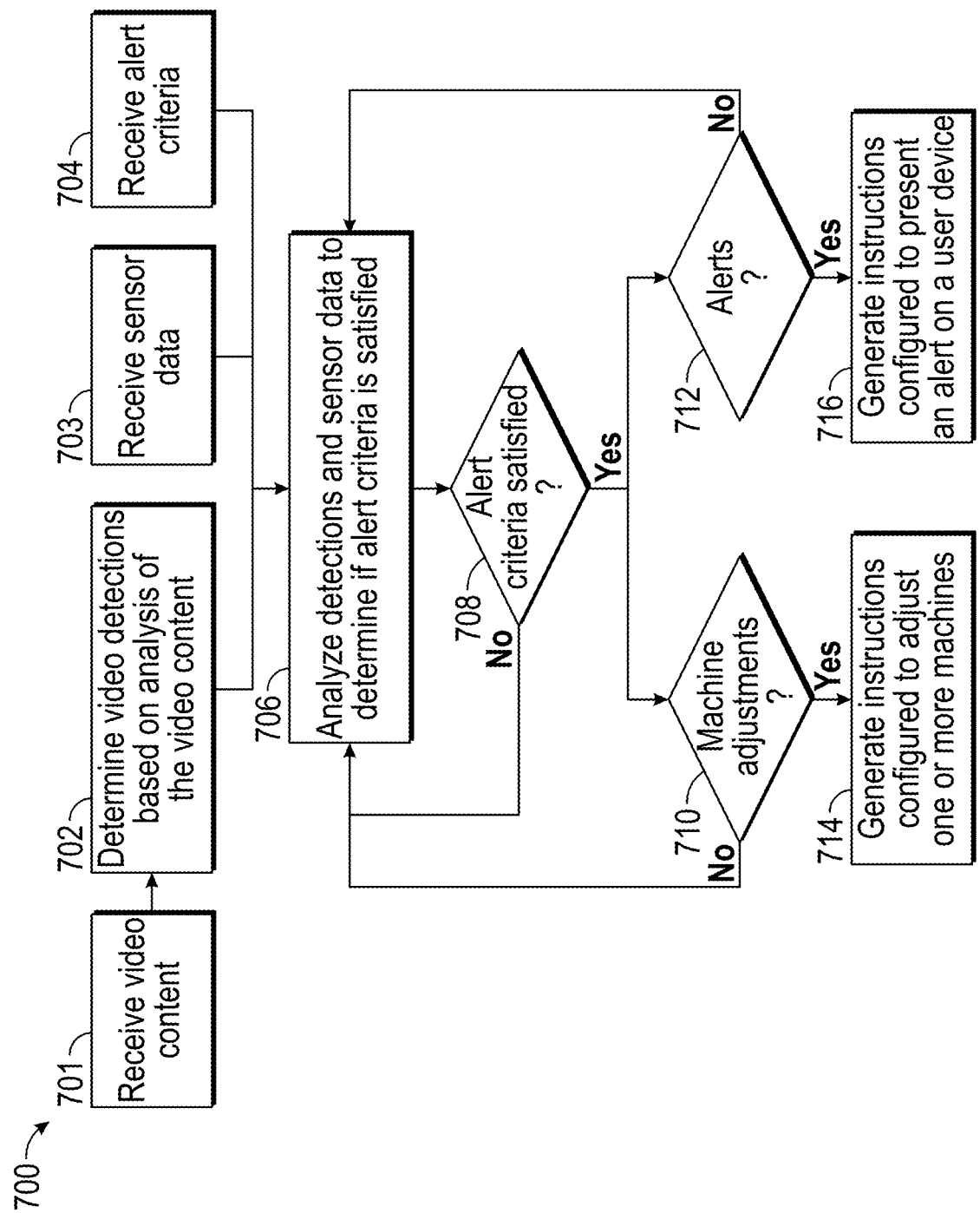
FIGS. 7A-7B are flowcharts illustrating example methods and functionality of a video gateway device processing and implementing alert criteria, according to various embodiments of the present disclosure.
Figure 7B:
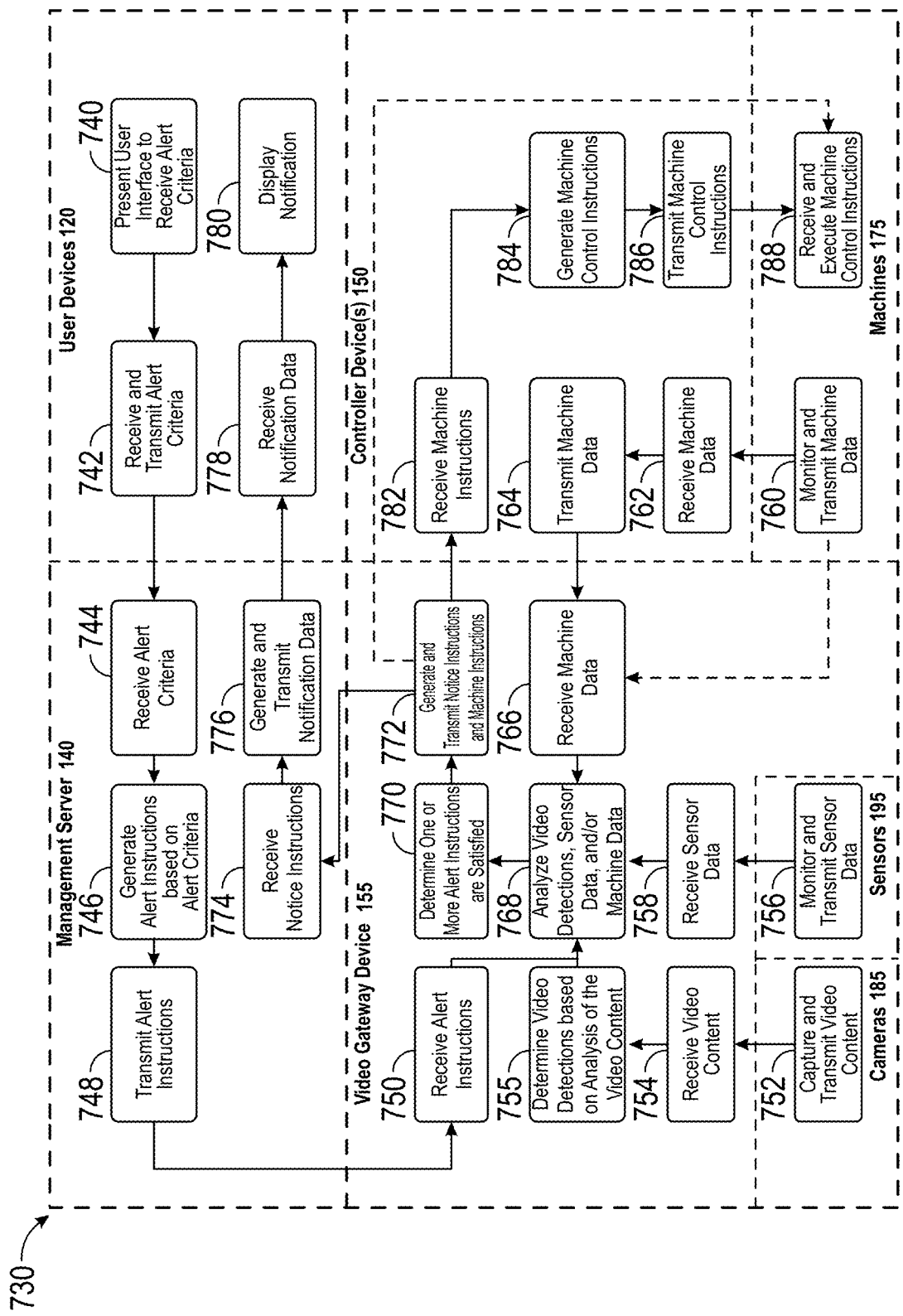

FIGS. 7A-7B are flowcharts illustrating example methods and functionality of a video gateway device processing and implementing alert criteria, according to various embodiments of the present disclosure. FIG. 7A illustrates example functionality 700 provided by, for example, the video gateway device 155. The terms and concepts described in FIG. 7A are similar to those described in related to FIG. 7B and herein and should be used to provide additional clarification and understanding to FIG. 7A. Although the term "alert" is used, functionality can relate to alerts but also causing an action (e.g., turning off/on a machine, or the like) with or without any generated alert being sent out. Further description related to setting/implementing alerts, and interactive graphical user interfaces related thereto, are described, e.g., in reference to FIGS. 8A-8F.

At block 701, a system (e.g., a video gateway device 155) receives video content or video data from one or more cameras. In some embodiments, the video data can be stored on the video gateway device 155 or on local storage connected to the video gateway device 155. In some embodiments, the video data can be received via wired or wireless connection, or both.

At block 702, the video gateway device 155 determines video detections based on analysis of the video content received at block 701. In some embodiments, the video gateway device 155 can review video content to determine basic detections based solely on the video content. For example, the video gateway device 155 can detect motion of objects, object detections (e.g., identify whether a detected object is a person or thing, and/or what type of person or thing, etc.), object location (e.g., based on position in captured video), or the like.

At block 703, the video gateway device 155 receives sensor data. For example, the sensor data can be data collected by the additional devices 180 or any other sensor programmed to collect data that is in electronic communication with the video gateway device 155, directly or indirectly. For example, sensors can be used to detect positioning and motion of equipment and people. Some of the sensors might use cameras, cellular connections, beacons, or other stationary objects in the area to calibrate or track relevant data.

At block 704, the video gateway device 155 receives alert criteria. The alert criteria can be a combination of programmed criteria and default criteria. In some embodiments, the video gateway device 155 or management server 140 can determine alert criteria based on available data or detections detected by the video gateway device 155. The alert criteria can be programmed directly into the video gateway device 155 via a HMI device 170 or from a user device 120. The alert criteria can also be programmed remotely via a management server 140, for example, by a user device 120.

In some embodiments, alert criteria can be programmed to specify video detections or video detection conditions (e.g., conditions based at least in part on one or more video detections), and in some embodiments, combined with particular sensor events to do one or more of: generating alerts (e.g., email, SMS, push notification associated with an installed application, or API for third party systems), adjusting one or more machines (e.g., by communicating instructions to a controller device from a video gateway), and the like. In a first example, a user can program a machine to automatically turn off if a person detected by one or more cameras is too close to the machine (e.g., for operational safety and/or security). In a second example, a user can program a machine to turn off if no one is nearby to operate the machine (e.g., for operational productivity, efficiency, or safety). For example, if a fuel tanker, via a sensor, is reporting depleting levels of fuel and a camera is showing no person or vehicle near the fuel tanker, then an alert can be generated and sent to an operations manager to investigate. In some implementations, alerts can be generated as well. For example, if a condition is satisfied (e.g., the two examples described in this paragraph), then a siren or bell located in the facility can be rung indicating that the condition is satisfied. Also, if the same condition is satisfied, instructions for an alert can be transmitted to the cloud service so that the cloud service can send an email or text to a designated device or person.

At block 706, the video gateway device 155 analyzes detections from the video content and sensor data to determine if alert criteria is satisfied. In some embodiments, a user can configure an alert to be similar to one or more "if-this-then-that" statements. The user can include threshold criteria (i.e., the "if") and resulting actions (i.e., the "that"). The threshold criteria, when satisfied, would trigger one or more corresponding resulting actions or alerts. The threshold criteria can be the presence of something (e.g., a person in a particular location, a machine moving faster than a specified speed, or the like) or the absence of something (e.g., no person by a moving conveyor belt, fuel gauge on a fuel tank is dropping but not vehicle is nearby), or a combination of multiple thresholds. The resulting actions can include the generation and transmission of alerts to user devices 120 (e.g., via text message, email, push notification, an API call, or the like) and/or facilitate adjustments to machines in a corresponding facility or site (e.g., turning a machine on/off, speeding up or slowing down a machine, turning on an audible alarm, or the like). In some embodiments, sensor data (e.g., received in block 703) may not be part of the alert criteria (e.g., received in block 704) and thus any sensor data would not be analyzed in block 706. Also, in some embodiments, video data might not be received by the system and such video data would not be analyzed in block 706. For example, alert criteria might be set up in block 704 pertaining to a fuel tank sensor (e.g., data of which is received in block 703) reporting quickly depleting levels of fuel beyond a threshold speed. Thus, no video data would be required for block 706, nor block 708, to determine whether the alert criteria is satisfied and to present an alert (e.g., block 712 and 716) and/or adjust one or more machines (e.g., block 710 and 714) based on the determination in block 708.

At block 708, the video gateway device 155 determines if one or more alert criteria are satisfied based on the analysis and determinations from block 706. For example, one alert criteria can be programmed to shut a machine off if the machine is on and a person is not detected next to the machine for more than 5 minutes. In this example, if the video content and/or sensor data indicate that the machine is on and a person is not next to the machine so that the alert criteria's threshold criteria is satisfied, then the process would continue to either blocks 710 or 712 depending on how the alert criteria is programmed (i.e., what the resulting actions corresponding to the alert criteria are).

In some embodiments, alerts can be used to monitor or enhance security, safety, and productivity. With respect to security, for example, a camera or sensor can detect whether a person is in a location that should not be there and generate an alert. With respect to safety, for example, a sensor (e.g., through a controller device 150) can detect if a machine is on and if a person is nearby the machine for a certain amount of time (e.g., with a sensor or via a camera feed), then an alert can be generated if alert criteria is met. Also, for example, if a person is detected without protective gear in an area or zone that requires it, then an alert can be generated messaging the person, the person's supervisor, or generating an audible alert nearby the person via a speaker system or similar device. With respect to productivity, for example, a sensor or camera can detect whether a machine (e.g., a conveyor belt) is on and whether a person is next to the conveyor belt (e.g., where the person can be reviewing products, assembling products, etc.), then an alert can be generated if a person is not present. Also, for example, the system (e.g., by using AI or machine learning) can be used to determine whether defects exist on an assembly line, and an alert can be generated if there is a defect and/or the video gateway device 155 can generate machine instructions to resolve the defect. Also, for example, equipment up-time or use, as well as employee up-time or work time, can be monitored by the system, in addition to any sensor data available. Also, for example, the system can monitor how many items are on an assembly line or data analytics associated with any process. Also, for example, the system can monitor if a fuel pump is depleting (e.g., via a sensor) and whether a truck or machine is nearby (e.g., via analysis or a camera feed) to determine if there is a fuel leak. Also, for example, the system can determine if a receptionist is at the front of an office during working hours. Any detection can result in no alert, one or more alert, and/or adjustments to one or more machines, for example.

At block 710, assuming that the resulting condition indicates that a machine should be adjusted based on the satisfaction of a threshold criteria, then the process continues to block 714. Otherwise, if no machine should be adjusted, then the process returns to block 706 to continue analysis of detections.

At block 714, the video gateway device 155 generates instructions configured to adjust one or more machines based on the resulting action associated with the alert criteria. In the example described above with respect to block 708, assuming that in block 706 a detection indicating that the machine is on and a person is not detected next to the machine for more than 5 minutes, then here in block 714, the instructions would be generated and transmitted to the respective machine (e.g., directly to the machine, to a controller device 150 that controls the machine, to a user as a message to shut the machine off or return to the machine, or the like) to adjust the machine based on the programmed resulting actions. In some embodiments, the instructions to adjust a machine can be used to turn on a siren or audio clip as a form of an alert.

At block 712, assuming that the resulting condition indicates that an alert should be sent out based on the satisfaction of a threshold criteria, then the process continues to block 716. Otherwise, if no alert should be sent out, then the process returns to block 706 to continue analysis of detections. In some embodiments, blocks 710 and 712 can be run in tandem or consecutively in any order.

At block 716, the video gateway device 155 generates instructions configured to present an alert on a user device. In some embodiments, the alert can be transmitted locally to the device. In some embodiments, the alert can be transmitted to a management server 140 so that the management server 140 can transmit the alert in the form of an alert message to a user device 120. For example, the alert message can be an email, a text message, a push notice (e.g., to an installed application), a browser popup, a web hook or API for one or more third party systems. In some embodiments, the alert message includes information related to the alert criteria so a person can know what alert criteria was triggered. In some embodiments, the alert message includes information related to the time of the threshold criteria being satisfied, and if any resulting action took place (e.g., shutting on/off a machine, or the like), then, in some embodiments, information regarding the resulting action (e.g., what action took place, when the action took place, whether the action was successful, etc.) can be included in the alert message as well. In some embodiments, the alert message includes screenshots or video clips related to the video data showing the satisfaction of the threshold criteria and/or implementation of the resulting action. In some embodiments, the alert message includes a link to view corresponding video data that can be accessed/viewed by the activation of the link.

As described herein, in various embodiments alerts may be sent to users based on, e.g., data analysis results. The management server 140 may provide such alerts to user device(s) 120. In some embodiments, the alert and/or notification is automatically transmitted to a device operated by the user and/or organization associated with a corresponding trigger. The alert and/or notification can be transmitted at the time that the alert and/or notification is generated or at some determined time after generation of the alert and/or notification. When received by the device, the alert and/or notification can cause the device to display the alert and/or notification via the activation of an application on the device (e.g., a browser, a mobile application, etc.). For example, receipt of the alert and/or notification may automatically activate an application on the device, such as a messaging application (e.g., SMS or MMS messaging application), a standalone application (e.g., productions line monitoring application), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page generated by the system so that the user can log in to the system and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet.

In various implementations, various aspects of the functionality described in reference to FIG. 7A may be accomplished in substantially real-time, e.g., received data may be processed as it is received. Alternatively, various aspects of the functionality described in reference to FIG. 7A may be accomplished in batches and/or in parallel.

In some embodiments, the system can also generate automatic incident logging. For example, the system can generate a report or form (e.g., accident report forms, event report forms, or the like) based on one or more triggered alerts or alert criteria/instructions. In some embodiments, the generated report can be partially or wholly pre-filled in with information about people nearby, people affected, people hurt, machines nearby, machines affected, or anything else. In some embodiments, the generated report can also include one or more screenshots, or a link to a video clip, of the event that triggered the alert. For example, screenshots or a video clip can include information about the time leading up to the triggering event and time after. In some embodiments, sensors (e.g., Bluetooth, NFC, etc.) can be analyzed and plotted on a map of the facility that is included in the report so that a person reviewing the report can see where every person and/or machine was at the time of the triggering event taking place. In some embodiments, data, metadata, video, etc. can be transmitted to the management server 140 automatically. For example, the information transmitted can include data that would be different than the normal transmission of data. There may be additional data sent to the management server 140 because the likelihood of the information being viewed is very high and so the data is prioritized compared to other tracked or recorded data.

FIG. 7B illustrates example functionality 730 provided by, for example, the video gateway device 155, the management server 140, the controller device 170, and other systems. The terms and concepts described in FIG. 7B are similar to those described in related to FIG. 7A and herein and should be used to provide additional clarification and understanding to FIG. 7B. Although the term "alert" is used, functionality can relate to alerts but also causing an action (e.g., turning off/on a machine, or the like) with or without any generated alert being sent out.

At block 740, one or more user devices 120 present a user interface to a user configured to receive alert criteria. The alert criteria is similar to the alert criteria described herein and with reference to FIG. 7A as well. At block 742, the alter criteria is received and transmitted to the management server 140, which received the alert criteria at block 744.

At block 746, the management server 140 generates alert instructions based on the alert criteria received at block 744. The configuration instructions are instructions that are sent to one or more gateway devices 155 at block 750. In some embodiments, alert criteria can reside in the management server 140 as well as being pushed to the video gateway device 155. For example, with respect to some types of alerts, the management server 140 can receive relevant information from the video gateway device 155 so that the management server 140 can make a decision on whether alert criteria is met. Also, for example, alert criteria can be sent to, and reside in, the video gateway device 155 so that the video gateway device 155 can make a decision on whether alert criteria is met.

At block 750, the video gateway device 155 received the alert instructions. In some embodiments, the alert criteria can itself be transmitted at block 748 and received at block 750. However, in some embodiments, the alert criteria can be adjusted by the management server 140 prior to transmitting in block 748. For example, there might be multiple gateway devices 155 used at a facility and a first portion of the alert criteria can be transmitted to one video gateway device, and a second portion of the alert criteria can be transmitted to another video gateway device, wherein the first portion and second portions are different. In another example, the video gateway devices 155 might be configured to receive data in a particular format, so the alert criteria might need to be processed into alert instructions that are of the correct or required format.

At block 752, one or more cameras 185 capture, process, and transmit video content or video data to the video gateway device 155. For example, the cameras may process the captured video into a specific file format (e.g., mp4, mpeg, or the like) prior to transmitting the data. At block 754, the video gateway device 155 receives the video content.

At block 756, one or more sensors 195 monitor, process, and transmit sensor data to the video gateway device 155. In some embodiments, the sensors may process the monitored sensor data into a specific format prior to transmitting the data. For example, sensors might be located in the cameras 185, or provide data to the cameras 185, or other device, that then combine captured or monitored data prior to transmitting to a video gateway device 155. In some embodiments, sensors 195 can transmit data directly to the video gateway device 155. At block 754, the video gateway device 155 receives the sensor data.

At block 760, one or more machines 175 monitor, process, and transmit machine data to the video gateway device 155. In some embodiments, the machine data can include information indicating the status of a particular machine (e.g., forklift, conveyor belt, fuel pump, charging station, computer, or the like). In the embodiments, the machine data can be transmitted directly to the video gateway device 155 so that the video gateway device 155 receives the machine data at block 766. In some embodiments, the machine data is transmitted indirectly to the video gateway device 155. For example, at block 762, the machine data is transmitted to one or more controller devices 170, and at block 764, the controller devices 170 then transmit the machine data to the video gateway device 155 that receives the machine data at block 766.

At block 755, the video gateway device 155 determines video detections based on analysis of the video content received at block 754. In some embodiments, the video gateway device 155 can review video content to determine basic detections based solely on the video content. For example, the video gateway device 155 can detect motion of objects, object detections (e.g., identify whether a detected object is a person or thing, and/or what type of person or thing, etc.), object location (e.g., based on position in captured video), or the like.

At block 768, the video gateway device 155 analyzes the video detections in the context of any sensor data and/or machine data received by the video gateway device 155. For example, analyzed video detections can result in measurable or calculable metric or status determined based video data, sensor data, and/or machine data. For example, by implementing an AI or machine learning algorithm, the video gateway device 155 can process collected data (e.g., video data, sensor data, machine data, or the like) locally to determine insights or detections such as motion, dynamics of motion (e.g., speed of motion, direction of motion, range of motion, acceleration, etc.), object detected (e.g., person or machine), object positioning data, object color, protective equipment associated with an object, object dimensions, safety-related detections (e.g., can be determined based on combination of other detections that can be used to indicate a level or safety risk), temperature (e.g., based on data gathered from thermal imaging cameras, sensors, etc.), various behaviors associated with people (e.g., how a person might be operating a machine), ambient information (e.g., outdoor or indoor information), identity (e.g., of persons based on facial analysis, license plate recognition, sensor location or ID data, or the like), or the like. In some embodiments, the analysis and determination at blocks 755 and 768 can be shared or performed in a single step or block. In some embodiments, blocks 755 and 768 can perform overlapping functions.

At block 770, the video gateway device 155 compares the video detections determined and analyzed at block 768 to determine whether one or more alert instructions are met or satisfied (e.g., video detection conditions met or satisfied based at least in part on one or more video detections). In some embodiments, analysis can be performed on one or multiple sources of data (e.g., machine data, video data, sensor data, etc.) to determine detections. In one example, alert instructions (or alert criteria) that are programmed by a user at block 742 to detect that if an employee is within 3 feet of a saw machine, that the machine should be shut off. In such an example, the video gateway device 155 can use video data received at block 754 to determine distance between employees and the machine, and to determine whether the machine is off/on or being operated. Also, the video gateway device 155 can use sensor data received at block 758 to determine employee location or positioning based on a sensor located on each employee as compared to sensor data located on the saw machine. In the same example, the video gateway device 155 can use machine data received at block 766 associated with the saw machine to determine whether the machine is turned off/on, and possibly even the speed or additional settings associated with the saw. Thus, detections can be determined based on some or multiple sources of data. Also, in some embodiments, there may only be data collected from one source where detections are to be inferred based on a specific threshold of confidence, or a confidence score. For example, in a location where there are no cameras capturing video data, there would still be a need to monitor worker safety. So, sensor data associated with an employee or worker can be collected continuously, even outside of a camera's field of view, and the sensor data can measure a large acceleration (e.g., over 1 g, over 2 g, etc.) within a short time frame. The video gateway device 155, by using AI or machine learning, can distinguish whether the acceleration is indicative of a fall or that the sensor (e.g., phone or helmet with an accelerometer) was dropped. For example, if the sensor was dropped it might bounce several times registering a different acceleration than if the employee fell. Also, temperature sensor on an employee's helmet might stop reading data at the time as an acceleration is detected, indicating a dropped helmet as opposed to a fall or accident.

At block 772, the video gateway device 155 generates and transmits notice instructions to the management server 140 and machine instructions to the controller device 170. At block 774, the management server 140 receives the notice instructions. The notice instructions are configured so that the management server 140 can determine what type of notification to generate so that the notification is in the proper format, associated with the designated triggered alert, and then, at block 776, deliver notification data based on the notice instructions to one or more user devices 120 (e.g., which might or might not include the user device 120 that originally programmed the alert criteria at block 742). As discussed in more detail herein, the alert message can be an email, a text message, a push notice (e.g., to an installed application), a browser popup, a web hook or API for one or more third party systems. In some embodiments, alerts may be programmed to be displayed or transmitted to user devices 120 based on a preconfigured schedule. For example, a particular user or user device 120 may choose to receive triggered alerts in batches at a particular time/day. In another example, a particular user or user device 120 may choose to receive triggered alerts immediately.

At block 778, the user device(s) 120 receives the notification data configured for presentation on the user device(s) 120. At block 780, the user device(s) 120 display a notification. In some embodiments, the notification can provide data associated with a triggered alert (e.g., as determined at block 770). Such data can include an image, gif, or video clip, a description of who or what triggered the alert, when the alert was triggered, sensor data or machine data associated with the triggered alert, actions taken based on the triggered alert (e.g., shutting off/on a machine, a list of some or all of the people receiving the alert, or the like). In some embodiments, user devices around a triggered alert may be notified of a triggered alert. For example, if there is an accident or emergency, nearby people can be notified or updated.

At block 782, the controller device 170 receives machine instructions generated at block 772. Then, at block 784, the controller device generates machine control instructions that it transmits to one or more machines at blocks 786 and 788. In some embodiments, the machine control instructions are configured to control or adjust one or more machines connected to the controller device 170. In some embodiments, the machine instructions can also be transmitted directly from block 772 to block 788 such that the machines 175 receive the machine instructions directly from the video gateway device 155. In either case, the machines 175 can be configured to execute the machine control instructions to adjust a configuration or status accordingly. However, it should be appreciated that in some embodiments the machine instructions sent to the controller device 150 and the machine instructions sent to the machines can be different so that the machine instructions are in an appropriate format for the designated receiving device(s). For example, the machine 175 receiving the machine control instructions can be programmed to turn on/off, turn on/off for a set amount of time (e.g., 1 minute, 5 minutes, or the like) or as long as a condition is met/not met (e.g., stay off for 1 minute after a person leaves the area, or stay on until a person leaves the area, or the like), speed up or slow down, or the like. The machine instructions are dependent on the resulting actions programmed with the alert criteria as well as the specific machines' capabilities. For example, each machine operates differently and may provide more or fewer adjustment capabilities. Simply, the machine control instructions can only adjust capabilities of each machine that the machine is capable of.

In various implementations, various aspects of the functionality described in reference to FIG. 7B may be accomplished in substantially real-time, e.g., received data may be processed as it is received. Alternatively, various aspects of the functionality described in reference to FIG. 7B may be accomplished in batches and/or in parallel.

XII. Example Graphical User Interfaces for Alerts

FIGS. 8A-8F illustrate example interactive graphical user interfaces related to processing and implementing alert criteria, according to various embodiments of the present disclosure. Although certain disclosures below and herein might be described as pertaining to a particular figure or embodiment, the concepts described should be understood to be capable of being applied to any embodiment described herein.

Figure 8A:
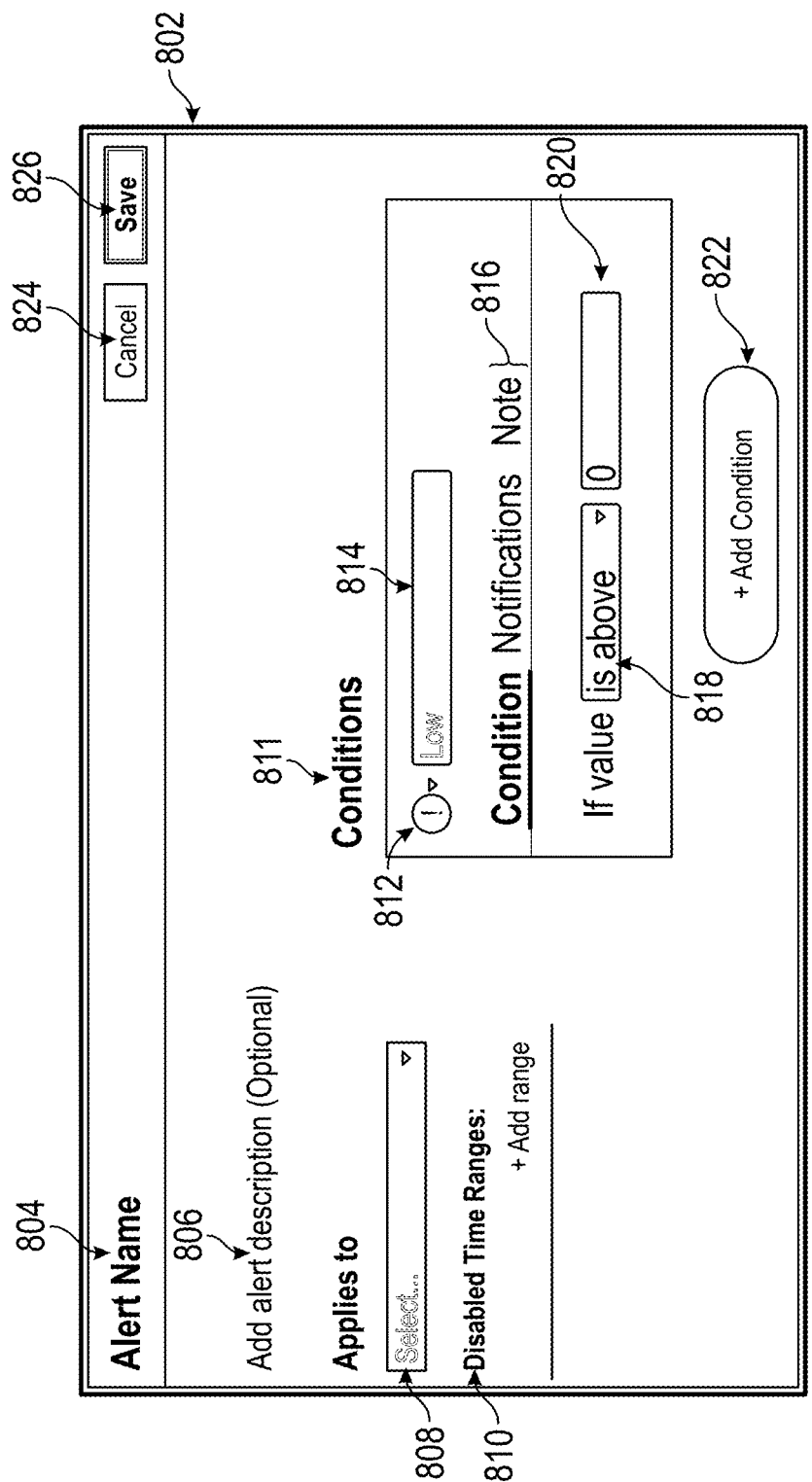
FIGS. 8A-8F illustrate example interactive graphical user interfaces related to processing and implementing alert criteria, according to various embodiments of the present disclosure.

FIG. 8A illustrates an example interactive graphical user interface 802 that allows a user to set up an alert. The user can set an alert name 804, an alert description 806, an application setting 808, time ranges 810, and conditions 811. The user can also save 826 the alert or cancel 824 the alert. The application setting 808 can allow a user to specify which machine, person, location, devices the alert pertains to. The user can select one or multiple options, in some embodiments. The time ranges 810 can be in the form a positive or negative range, such that the user can select which time ranges the alert should be actively monitoring during. For example, a user can be provided with an option to select a disabled time range so that the alert is inactive during the selected time range. Also, the user can be provided with an option to select a time range so that the alert is only active during the selected time range. In some embodiments, a user can select one or both of the disabled time ranges and active time ranges. A user can also specify one or more conditions 811 to monitor for the alert. For example, the user can optionally select the add condition button 822 to add another condition. Each condition can include various settings. For example, the user can select the notification option 812 to specify how a triggered alert is communicated to the user. The user can indicate a priority 814 (e.g., low, medium, high, etc.). The priority 814 can be related to productivity, efficiency, safety, or information gathering for potential site changes and planning. Each condition can also include a configuration tab 816. The configuration tab 816 can include settings for each condition that a user can configure. For example, a user can configure a condition (e.g., in the configuration tabs 816) related to a detection as well as conditions related to sensor data, machine data, and/or video data. For instance, in 802, the user can adjust a drop-down menu 818 to indicate whether a value is above, equal to, or below a value 820. Also, for example, a user can configure notifications. In some embodiments, the alert itself can include one notification setting such that if one or more conditions are met, satisfied, or triggered, one or more notifications can be sent out for the entire alert. Also, if one condition of many conditions is triggered, the notification would not be sent out. However, in some embodiments, each condition of the alert can have its own notification setting (e.g., in the configuration tabs 816), so that if one condition of many conditions is triggered, the associated notification would be sent out. Each condition can also include a note section (e.g., in the configuration tabs 816) that allows a user to make a note of the purpose of the entry, as desired.

Figure 8B:
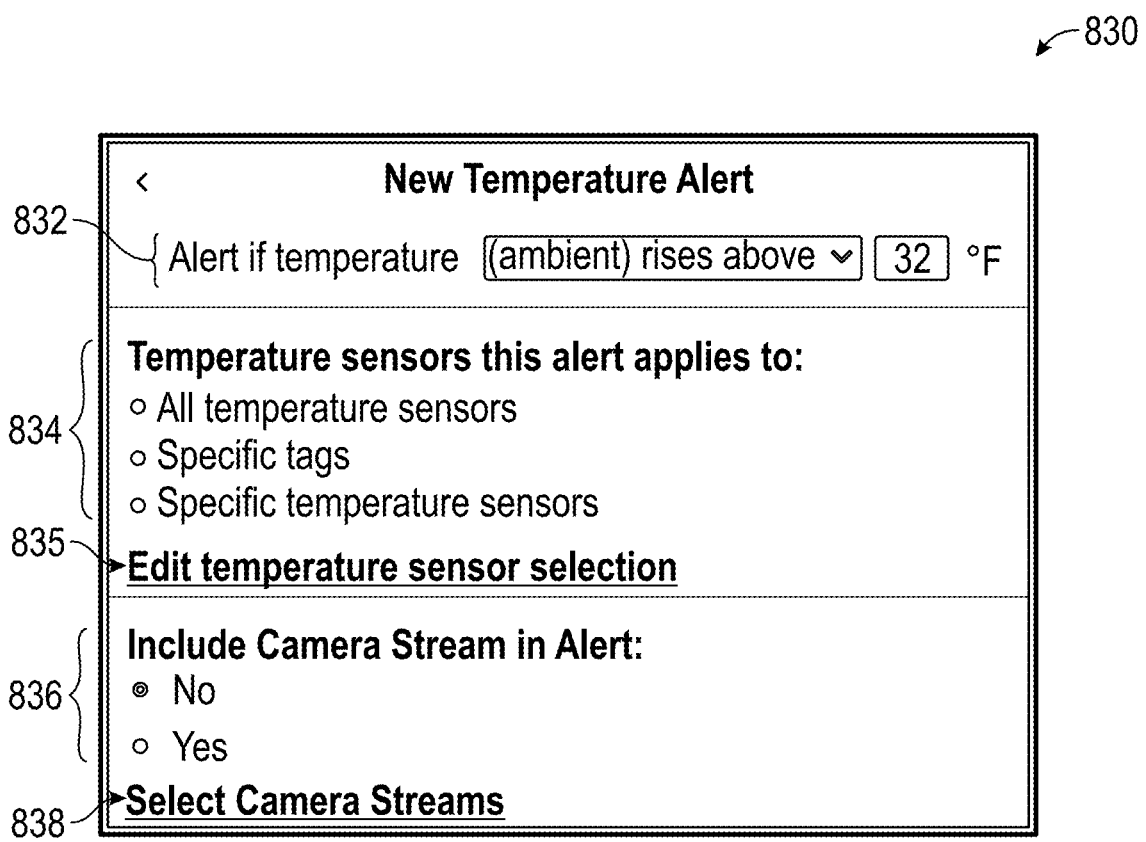

FIG. 8B illustrates an example interactive graphical user interface 830 that allows a user to set up a temperature alert. The user can include in 832 a location and degree associated with a specific temperature. The user can include in 834, which sensors or groupings of sensors (e.g., tags) are monitored for the alert. The user can also select 835 to pick a specific set of sensors to monitor for the alert. In some embodiments, the user can include an associated camera recording, screenshot, or link to a stream of the live video in the alert. In some embodiments, if a user selects 10 temperature sensors around a facility to monitor and only one is triggered, video data associated with one or more cameras associated with that particular sensor can be included in the alert. In some embodiments, if a user selects 10 temperature sensors around a facility to monitor and only one is triggered, video data associated with one or more cameras associated with that all sensors, or a previously designated set of cameras, can be included in the alert.

Figure 8C:
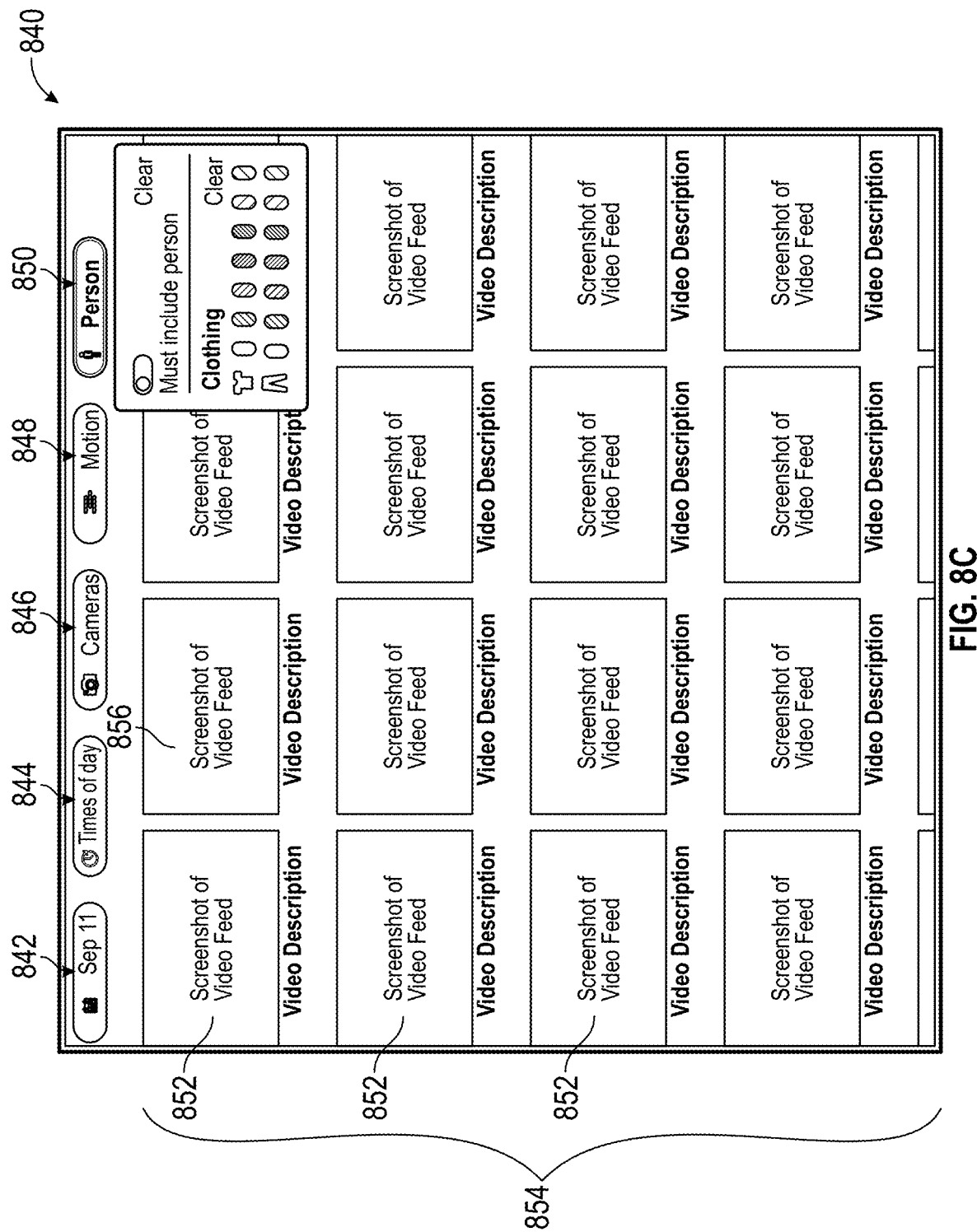

FIG. 8C illustrates an example interactive graphical user interface 840 that allows a user to search previously recorded video (and sensor/machine data) for determined detections and insights. For example, and as described herein, the video gateway device 155 can receive data from cameras, sensors, and/or machines and determine detections based on the received data. In some embodiments, the video gateway device 155 can also generate detection data associated with each detection. For example, the video gateway device 155, once it determines a detection, the video gateway device 155 can prepare detection data that tracks the following data associated with the detection: start time and end time (e.g., duration), intensity (if applicable, this can include speed, direction of motion, range of motion, or any other inference from the data), associated sensors, associated machines, associated cameras, and any other inference or determination made based on any data received by the video gateway device 155. The detection data can be transmitted to a management server 140 which hosts the example interactive graphical user interface 840 so that a user device can run searches based on the detection data located on the management server 140. With respect to interface 840, the user can include search criteria filters, such as but not limited to: a date 842, or range of dates; a time 844, or range of times; one or more cameras 846, one or more sensors, one or more machines (e.g., stationary or mobile), vehicle (e.g., detection of a vehicle, color, make, model, person operating or in charge of the vehicle, etc.), motion 848 (e.g., motion of a person or object, range of motions, area of motion, speed of motion, etc.), person 850 (e.g., whether there must be a person detected, a particular ID associated with a device carried by a person, a particular ID associated with a device generally, color of clothing worn by the person), or additional criteria that might be relevant to a user. Also, once the search filters are input, or while the search filters are being input, the result area 854 can be populated with search results 852. In some embodiments, the search results 852 can include a description of associated video data and a screenshot or gif of the video data, wherein the video data pertains to the particular time, day, etc. that satisfy the search filter. In some embodiments, a user can select a particular search result 856 and then view a snippet of the corresponding video data that satisfies the search. In some embodiments, the snippet of the corresponding video data that satisfies the search can be streamed from a video gateway device 155 that stores the video data. In some embodiments, the snippet of the corresponding video data that satisfies the search can be stored and streamed from the management server 140 itself. For example, by default video data can be stored on the video gateway device 155. However, once the video is streamed, it can be routed to the management server 140 first, then transmitted to one or more user devices. At the same time, the management server 140 can store the video data for later streaming, without accessing the video data stored on the video gateway device 155, which is described in more detail herein with respect to FIGS. 9A-9B.

Figure 8D:
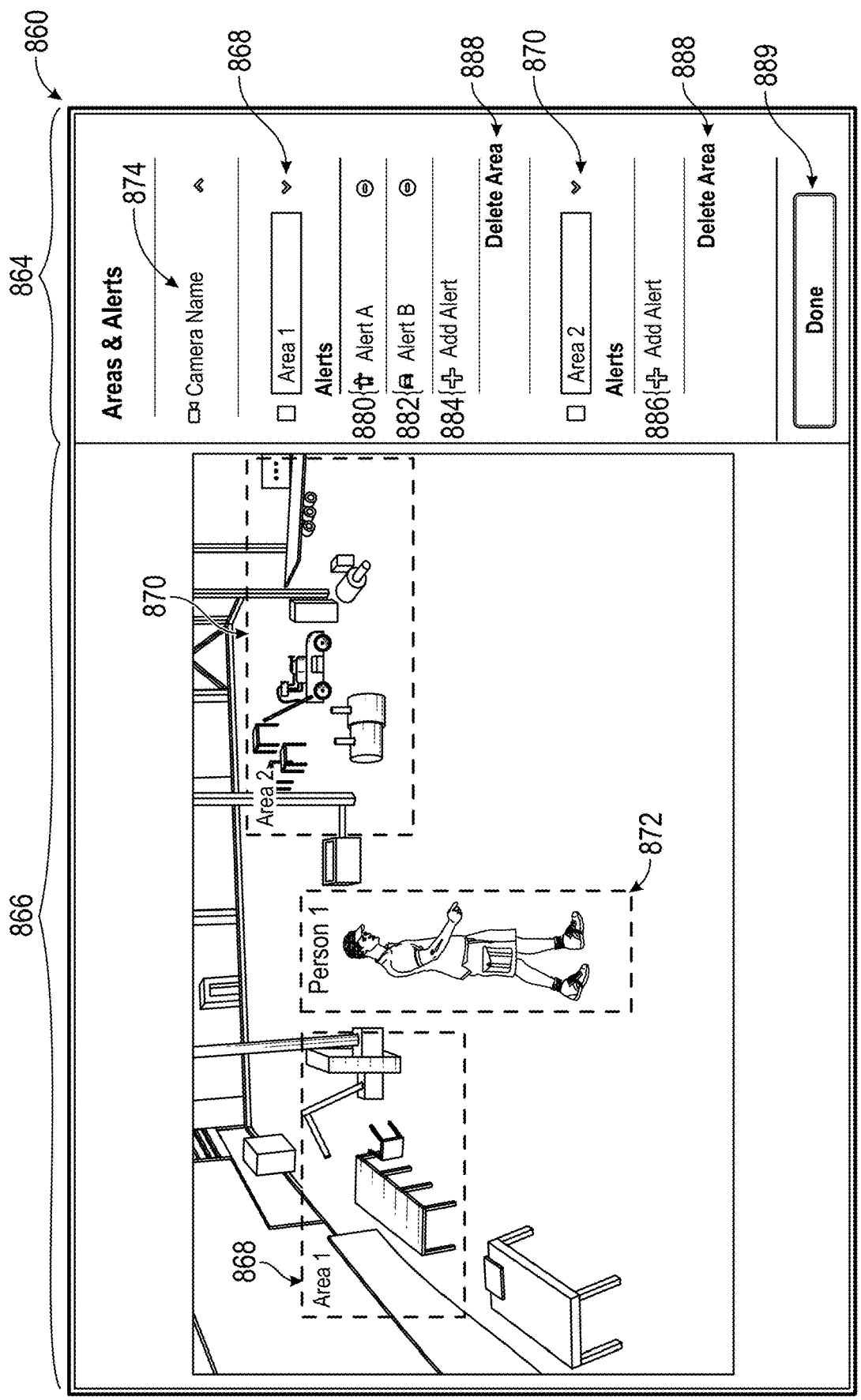

FIG. 8D illustrates an example interactive graphical user interface 860 that allows a user to view a particular camera feed from a camera and configure various areas and alerts within the camera view. For example, the interface 860 includes a panel 864 and a video window 866 that can display recorded or live video from a selected camera. In the panel 864, a user can select a camera 874 to view and to configure areas and alerts associated with the camera. Once a camera 874 is selected, the user can view previously configured areas (e.g., 868 and 870) and corresponding alerts (e.g., 880, 882, 884, 886) and change settings associated with the areas and alerts (e.g., changing alert configurations, adding/removing alerts or areas, changing area size/orientation, changing names of alerts or areas, or the like). In some embodiments, alerts can be associated with the entire camera view or one and/or more specific areas in the camera view. For example, area 1 876 includes two alerts (i.e., 880 and 882). Alert A 880 includes an image of a person and can be triggered if a person enters and/or exits area 1 868. Alert B 882 includes an image of a vehicle or machine and can be triggered if a vehicle or machine enters and/or exits area 1 876. Option 884 allows a user to add additional alerts pertaining to area 1 868. Option 886 allows a user to add an alert pertaining to area 2 870. Also, users have the option to remove previously configured alerts or any previously configured areas (including any associated alerts) by selecting 888. When a user is finished updating the areas and alerts panel 864, the user can select the button 889 to save and apply the changes.

In the video window 866, an example video feed from the selected camera 874 is displayed. Also, area 1 868 corresponds to the same area 1 868 in the panel 864. In some embodiments, a user can manually create and manipulate a shape (e.g., a square, rectangle, circle, oval, or custom shape) designating an area in the video window 866. In some embodiments, AI or machine learning can automatically set areas and/or corresponding alerts based on analysis of recorded video, sensor data, machine data, and/or other user configurable settings and information. Users can then update the automatically set areas and/or alerts as needed. In some embodiments, the video window 866 can highlight objects in the video feed such as the areas (e.g., area 1 868 and area 2 870), people (e.g., 872), machines, status of machines, motion of people, devices, or anything else that may be useful or related to an alert.

Figure 8E:
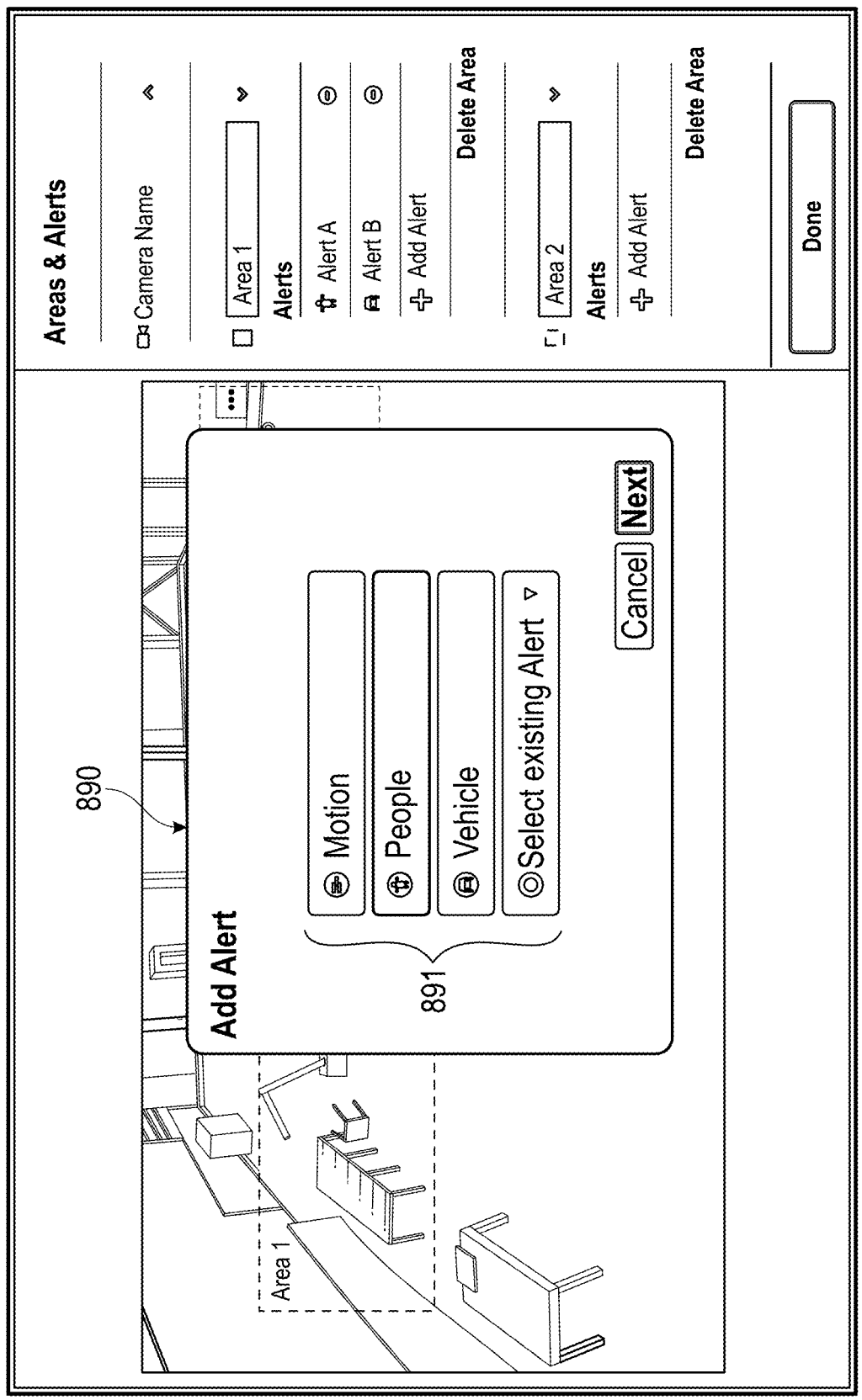

FIG. 8E illustrates an example interactive graphical user interface 890 that allows a user to add an alert. For example, if a user selects option 884 or option 886 in FIG. 8D, then a new interface can appear allowing a user to configure an alert. For example, a user can select a type of alert 891 and then continue configuring who or what to detect and who or what to do if a detection occurs (e.g., how to adjust a machine and/or who to alert and how to alert the people).

Figure 8F:
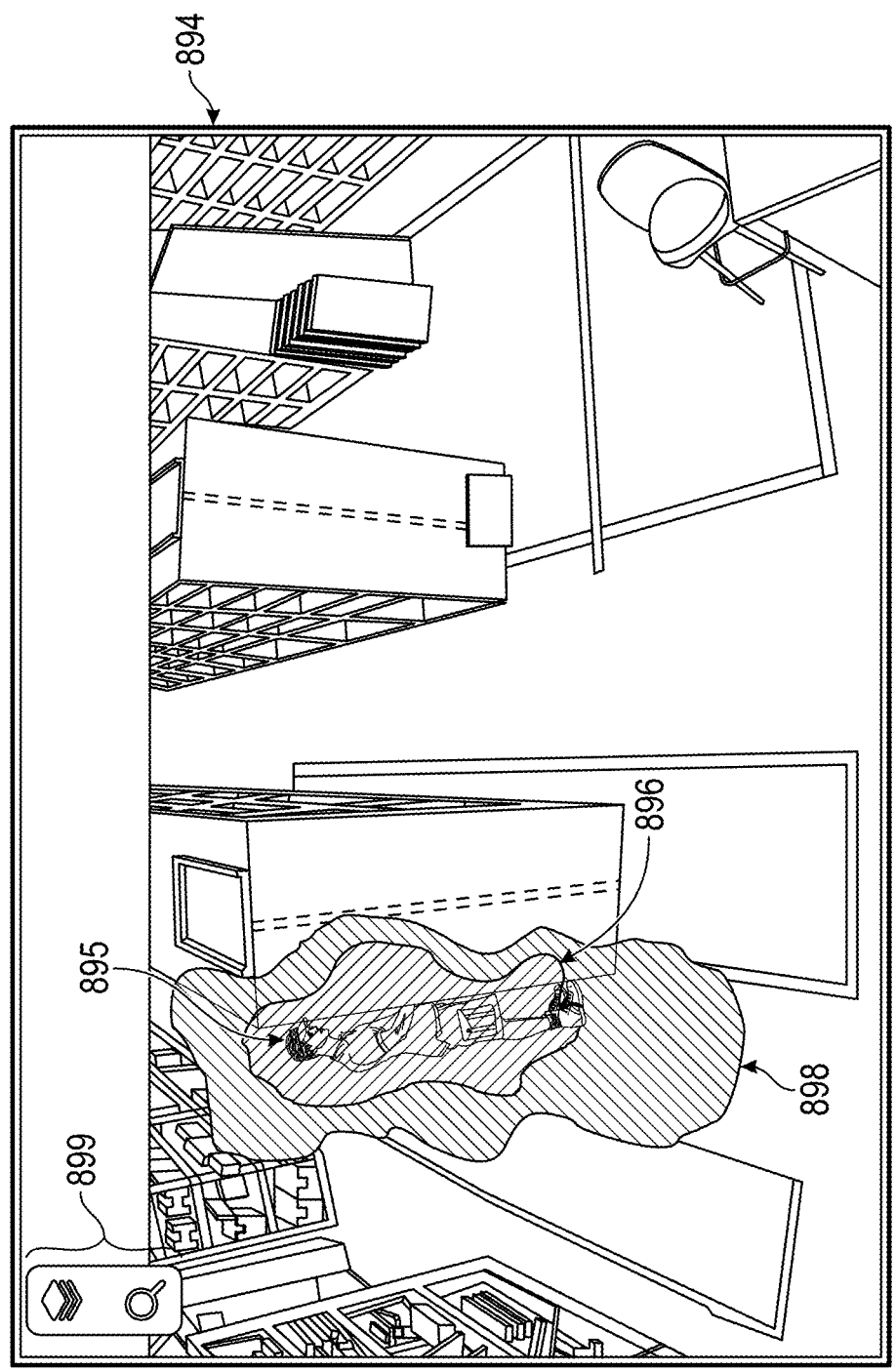

FIG. 8F illustrates an example interactive graphical user interface 894 that shows a motion cloud. For example, a person 895 is shown in a video feed. The person 895 may be walking or running around the facility, as recorded by a camera associated with the video feed. The video gateway device 155 can calculate direction and speed of motion, as well as range of motion based on a specific time range (e.g., motion in the last 30 seconds, 1 minute, etc., and/or predicted motion in the next 10 seconds, 30 seconds, etc.) and then update the interface 894 to show such calculated data (e.g., as a motion cloud, or with textures, or the like). For example, a cloud can be shown with varying colors or layers (e.g., layers 898 and 896) such as yellow indicating slow movement (e.g., standing still), orange as medium movement (e.g., walking), and red as fast movement (e.g., running). In some embodiments, the interface 894 can also include the option 899 to search the video or other videos as well as turning on or off layers (e.g., the user can turn on/off or adjust the motion cloud to only display certain types of movement such as running or walking).

XIII. Video Streaming Interfaces

Figure 9A:
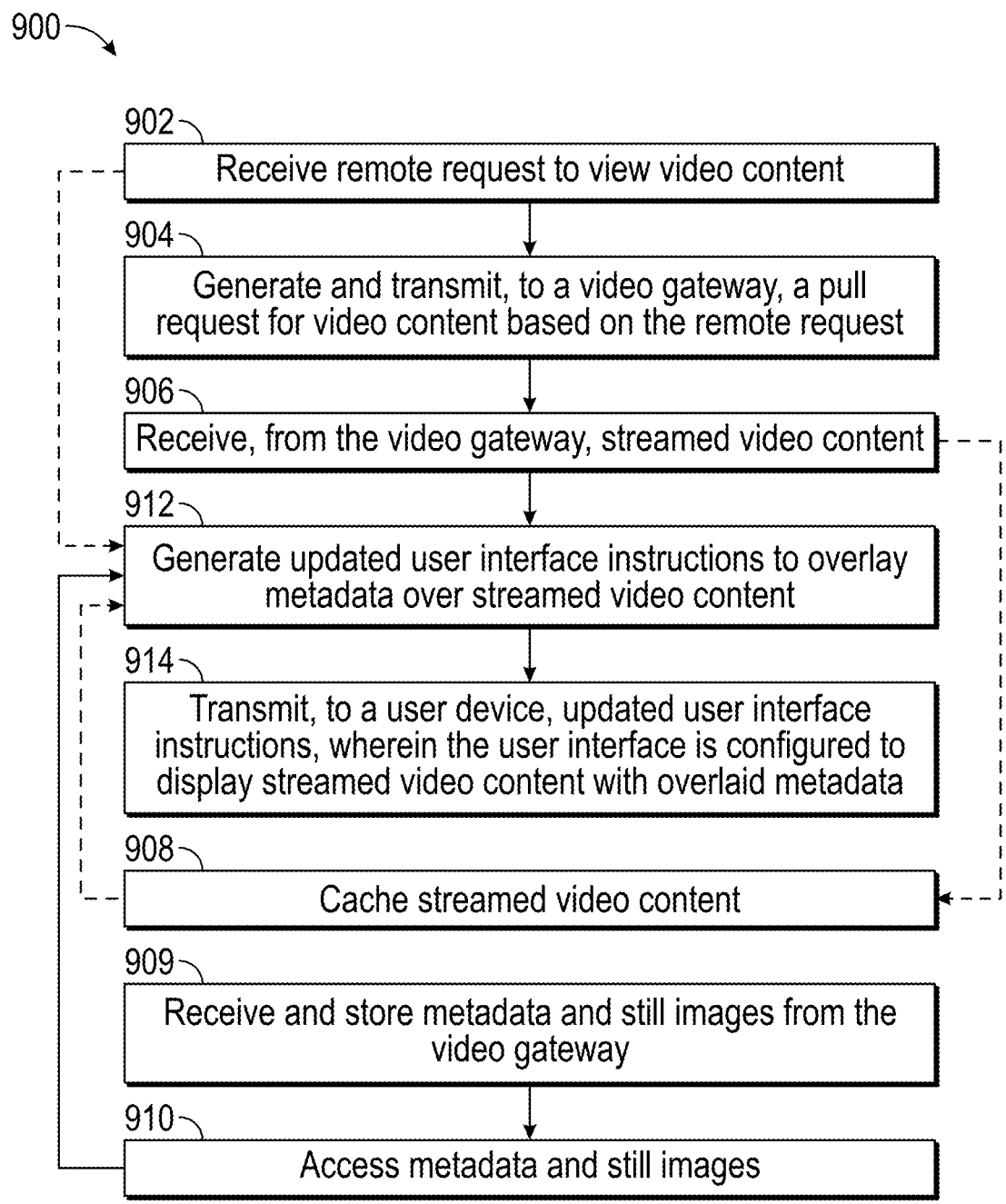
FIGS. 9A-9B are flowcharts illustrating example methods and functionality of a video gateway device in electronic communication with a management server, according to various embodiments of the present disclosure.
Figure 9B:
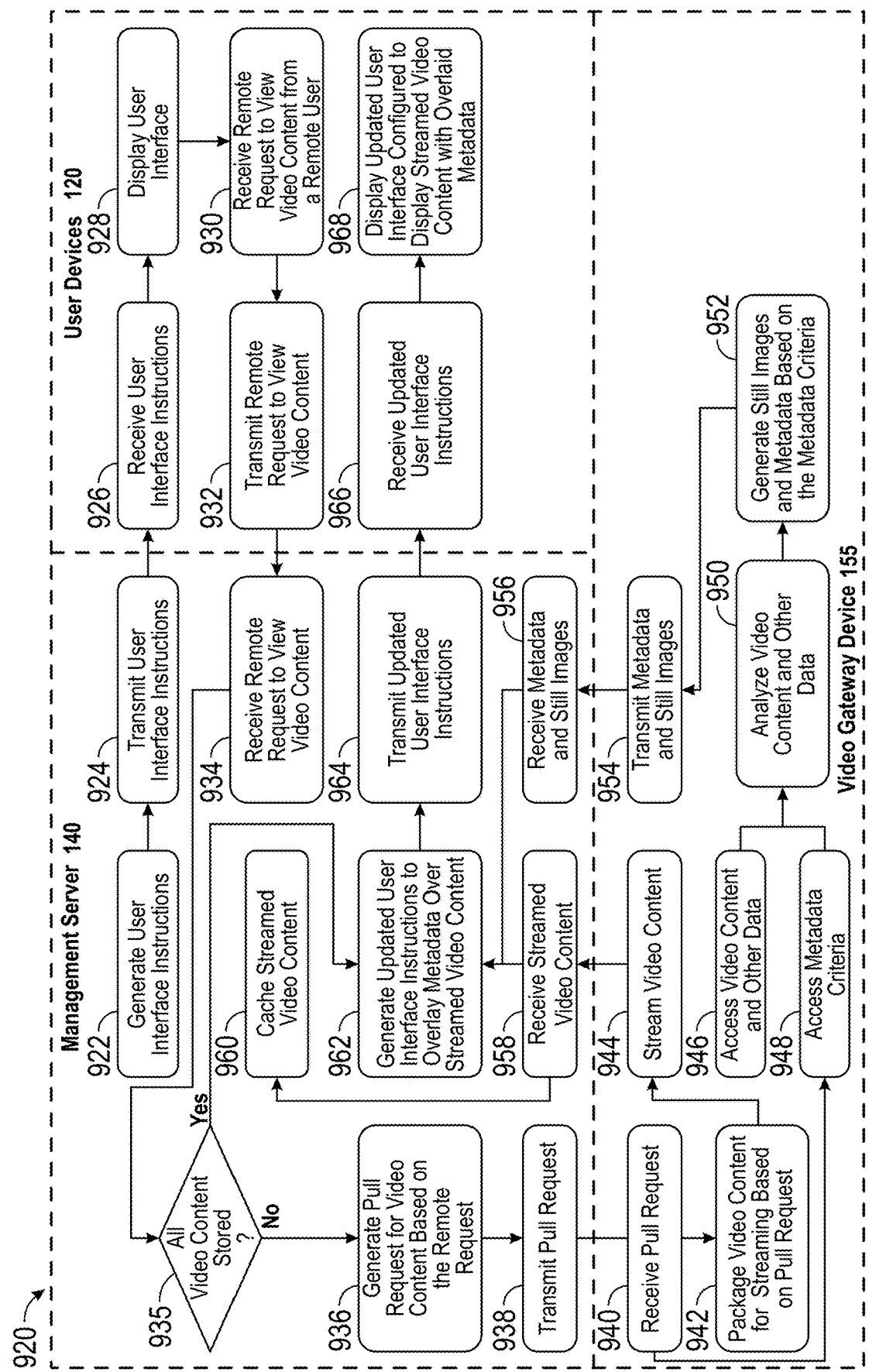

FIGS. 9A-9B are flowcharts illustrating example methods and functionality of a management server in electronic communication with a video gateway device, according to various embodiments of the present disclosure. FIG. 9A illustrates example functionality 900 provided by, for example, the management server 140. The terms and concepts described in FIG. 9A are similar to those described in related to FIG. 9B and herein and should be used to provide additional clarification and understanding to FIG. 9A. Further description related to streaming video content, and interactive graphical user interfaces related thereto, are described, e.g., in reference to FIGS. 11A-11E.

At block 902, a system (e.g., a management server 140) receives a remote request to view video content, for example, from a user device 120. The user device 120 is located on a network that is remote, or not local, to a video gateway device 155 that stores the desired video content. If all the desired video content is already stored at the management server 140, then the process would skip blocks 904, 906, and 908, and proceed directly to block 962. If only a portion of the video content is stored at the management server 140, then the process would split to block 904 for any video content not stored by the management server 140 and also to block 912 for any video content that is stored by the management server 140 so that only needed video content is requested from the video gateway device 155 via a pull request generated at block 904. If none of the desired video content is stored at the management server 140, then the process would proceed to block 904. In some embodiments, the remote request includes information indicating one or more of: a desired video data associated with one or more cameras, a start time of the video, criteria to view (e.g., people, motion, machines, etc.), or any other factor. In some embodiments, if a user indicates criteria to view, the video presented to the user can include a layer or metadata that includes information related to the criteria. For example, if a user wants to see motion of objects, the metadata can include a start time, end time, object type, etc. in the seek bar corresponding to the video and/or overlaid on, or rendered with, the video itself.

At block 904, the management server 140 generates and transmits, to a video gateway device 155, for example, a pull request for video content based on the remote request.

At block 906, the management server 140 receives from the video gateway device 155 the desired video content for streaming to the user device 120. In some embodiments, at block 908, the management server 140 can cache or store the video content received from the video gateway device 155.

At block 909, the management server 140 receives and stores data and/or metadata associated with recorded video content from the video gateway device 155. In some embodiments, the video gateway device 155 analyzes video content, sensor data, machine data, etc. to determine detections and insights as described herein. The video gateway device 155 then packages the detections and insights and transmits those to the management server 140. Also, in some embodiments, the video gateway device 155 also captures still images or screenshots of recorded video and transmits such screenshots to the management server 140. Advantageously, the video gateway device can transmit the reduced data (e.g., metadata and screenshots) as opposed to the entire video content library so that bandwidth associated with the video gateway device 155 is used sparingly. This allows the video gateway device 155 to conserve its bandwidth for other purposes, as needed. Such data received at block 909 can include various detections (e.g., machine on/off, location of one or more persons, movement of people, movement of machinery, temperature of an area, temperature of a machine, or the like) and screenshots of captured video data. For example, during periods of low activity, or no activity (e.g., no motion detected, no people are detected, machinery is off, outside of operating/working hours, etc.) monitored in a video feed, screenshots can be generated and transmitted to the management server 140 based on a pre-configured time interval (e.g., every 1, 5, 10, 20 minute mark, or the like). In another example, during periods of high activity (e.g., threshold motion detected, machinery is on, people are detected, during operating/working hours, etc.) monitored in a video, screenshots can be generated and transmitted to the management server based on the same or a different pre-configured time interval (e.g., every 5, 10, 20 second mark, or the like).

At block 910, the management server 140 accesses the stored data and/or metadata and still images. In some embodiments, the management server 140 can continuously receive data and/or metadata from a video gateway device. For example, a connected gateway device might transmit data continuously so that prior to block 902, the management server 140 has sufficiently stored relevant data, metadata, and/or still images associated with the remote request received in block 902.

At block 912, the management server 140 generates updated user interface instructions to overlay the data and/or metadata accessed at block 910 over the video content to be streamed to the user device 120. For example, the management server 140 can overlay detections of people or machines or motion onto the video content that is streamed. Also, for example, the management server 140 can overlay related information on an interactive video seek bar (which may also be referred to as a "timeline" or an "interactive timeline") indicating a start time, end time, object, and/or motion-related information.

At block 914, the management server 140 transmits, to the user device 120, updated user interface instructions, wherein the corresponding user interface is configured to display the video content pulled from the video gateway device 155 overlaid with the data and/or metadata information in the video and the seek bar. Also, in some embodiments, the still images are provided to the user device 120 so that when a user drags a slider on the seek bar the user can see the still images to guide the user.

In various implementations, various aspects of the functionality described in reference to FIG. 9A may be accomplished in substantially real-time, e.g., received data may be processed as it is received. Alternatively, various aspects of the functionality described in reference to FIG. 9A may be accomplished in batches and/or in parallel.

FIG. 9B illustrates example functionality 920 provided by, for example, a management server 140, user devices 120, and a video gateway device 155. The terms and concepts described in FIG. 9B are similar to those described in related to FIG. 9A and herein and should be used to provide additional clarification and understanding to FIG. 9B.

At block 922, a management server 140 generates user interface instructions, and at block 924, transmits the user interface instructions to one or more user devices 120. In some embodiments, and for some user devices 120 (e.g., with respect to a mobile application, or the like), the user interface instructions can be cached or stored locally on the user device 120 and would not be generated by, or received from, a management server 140. Thus, in such examples, the diagram may begin at block 928 instead of block 922.

At block 926, a user device 120 receives the user interface instructions from the management server 140, and at block 928, the user device 120 generates and displays the user interface corresponding to the received user interface instructions.

At block 930, the user device 120 receives a remote request to view video content from a user, and at block 932, the user device 120 transmits the remote request to view video content to the management server 140. As described with reference to FIG. 9A, the user device 120 is located on a network that is remote, or not local, to a video gateway device 155 that stores the desired video content. In some embodiments, the remote request includes information indicating one or more of: a desired video data associated with one or more cameras, a start time of the video, criteria to view (e.g., people, motion, machines, etc.), or any other factor. In some embodiments, if a user indicates criteria to view, the video presented to the user can include a layer or metadata that includes information related to the criteria. For example, if a user wants to see motion of objects, the metadata can include a start time, end time, object type, etc.

in the seek bar corresponding to the video and/or overlaid on, or rendered with, the video itself.

At block 934, the management server 140 receives the remote request to view video content. Then, at block 935, the management server 140 checks to see if all the desired video content is already stored at the management server 140. If all the desired video content is already stored at the management server 140, then the process would skip blocks 963, 938, 940, 942, 944, 958, and 960, and proceed directly to block 962. If only a portion of the video content is stored at the management server 140, then the process would split to block 936 for any video content not stored by the management server 140 and also to block 962 for any video content that is stored by the management server 140 so that only needed video content is requested from the video gateway device 155 via a pull request generated at block 936. If none of the desired video content is stored at the management server 140, then the process would proceed to block 936.

At block 936, the management server 140 generates the pull request for the requested video content based at least in part on the remote request and any video content that might already be stored at the management server 140. For example, the management server 140 might only include, in the pull request, a request for video content that is not currently stored at the management server 140 but that is requested by the user via the remote request. At block 938, the management server 140 transmits, to a video gateway device 155, for example, the generated pull request. In some embodiments, the request can be for video content that occurs contemporaneously with the recording (e.g., a live transmission of a recording). In some embodiments, the request can be for video content that occurred in the past or at an earlier point in time from the present. For example, the request can include a beginning a time and an end or ending time that designates a snippet or snapshot of data a user associated with the request desires to view. The ending time can also be a contemporaneous time (e.g., the present or live transmission) so that the user can view time from the beginning time until the present.

At block 940, the video gateway device 155 receives the pull request from the management server 140. Then, at block 942, the video gateway device 155 retrieves from one or more databases video content associated with the pull request and packages the video content for streaming. Then, at block 944, the packaged video content is transmitted or streamed to the management server 140, which at block 958, receives the streamed video content from the video gateway device 155. In some embodiments, at block 960, the management server 140 can cache or store the some or all of the streamed video content received from the video gateway device 155 in step 958.

At block 946, the video gateway device 155 captures, receives, or accesses video content and other data. For example, the video content and other data can be collected from one or more cameras, one or more sensors, and/or one or more machines (e.g., directly or through one or more controller devices 150). Such data received at block 946 can include various detections (e.g., machine on/off, location of one or more persons, movement of people, movement of machinery, temperature of an area, temperature of a machine, or the like).

At block 948, the video gateway device 155 receives, accesses, or determines metadata criteria. In some embodiments, the metadata criteria can be preconfigured by a user, via a user device 120 as communicated through a management server 140. In some embodiments, the metadata criteria is based at least in part on the pull request received in block 940. In some embodiments, the metadata criteria can include information indicating what the video gateway device 155 should be monitoring and/or analyzing. For example, the metadata criteria can indicate that motion of people anywhere is important to analyze. Thus, the video gateway device 155 can limit its analysis to motion of people detected and exclude other detections (e.g., machine status, positioning, etc.) from analysis. In some embodiments, the metadata criteria can indicate what data or metadata to include with some or any streamed video. In some embodiments, the metadata criteria is preconfigured prior to receiving a pull request. In some embodiments, the metadata criteria is configured during and/or prior to receiving a pull request. In some embodiments, the metadata criteria can be a set of default criteria. In some embodiments, the metadata criteria can be determined using AI or machine learning by analyzing data passing to or through the video gateway device 155.

At block 950, the video gateway device 155 analyzes the video content and other data, and at block 952, the video gateway device 155 determine detections or insights, for example by using AI or machine learning. In some embodiments, the video gateway device analyzes video content, sensor data, machine data, etc. to determine detections and insights as described herein. Also, in some embodiments, the video gateway device 155 also captures still images or screenshots of recorded video. For example, during periods of low activity, or no activity (e.g., no motion detected, no people are detected, machinery is off, outside of operating/working hours, etc.) monitored in a video feed, screenshots can be generated and transmitted to the management server 140 based on a pre-configured time interval (e.g., every 1, 5, 10, 20 minute mark, or the like). In another example, during periods of high activity (e.g., threshold motion detected, machinery is on, people are detected, during operating/working hours, etc.) monitored in a video, screenshots can be generated and transmitted to the management server based on the same or a different pre-configured time interval (e.g., every 5, 10, 20 second mark, or the like). Advantageously, the video gateway device can transmit the reduced data (e.g., metadata and screenshots) as opposed to the entire video content library so that bandwidth associated with the video gateway device 155 is used sparingly. This allows the video gateway device 155 to conserve its bandwidth for other purposes, as needed. At block 954, the video gateway device 155 then packages the data and/or metadata (e.g., detections and insights), and any still images, and transmits those to the management server 140.

At block 956, the management server 140 receives the packaged data and/or metadata and any still images from the video gateway device 155. At block 962, the management server 140 accesses the stored data and/or metadata, still images, and/or any previously cached or stored video content and generates updated user interface instructions to overlay the data and/or metadata received at block 956 over the video content (e.g., received at block 958 and/or accessed from one or more databases housing the previously stored video content) to be streamed to the user device 120. For example, the management server 140 can overlay detections of people or machines or motion onto the video content that is streamed. Also, for example, the management server 140 can overlay related information on an interactive video seek bar (which may also be referred to as a "timeline" or an "interactive timeline") indicating a start time, end time, object, and/or motion-related information. At block 964, the management server 140 transmits, to the user device 120, updated user interface instructions.

At block 966, the user device 120 receives the updated user interface instructions, and at block 968, the user device 120 displays the updated user interface, wherein the corresponding user interface is configured to display the video content pulled from the video gateway device 155 overlaid with the data and/or metadata information in the video and the seek bar. Also, in some embodiments, the still images are provided to the user device 120 so that when a user drags a slider on the seek bar the user can see the still images to guide the user.

In various implementations, various aspects of the functionality described in reference to FIG. 9B may be accomplished in substantially real-time, e.g., received data may be processed as it is received. Alternatively, various aspects of the functionality described in reference to FIG. 9B may be accomplished in batches and/or in parallel.

Figure 10A:
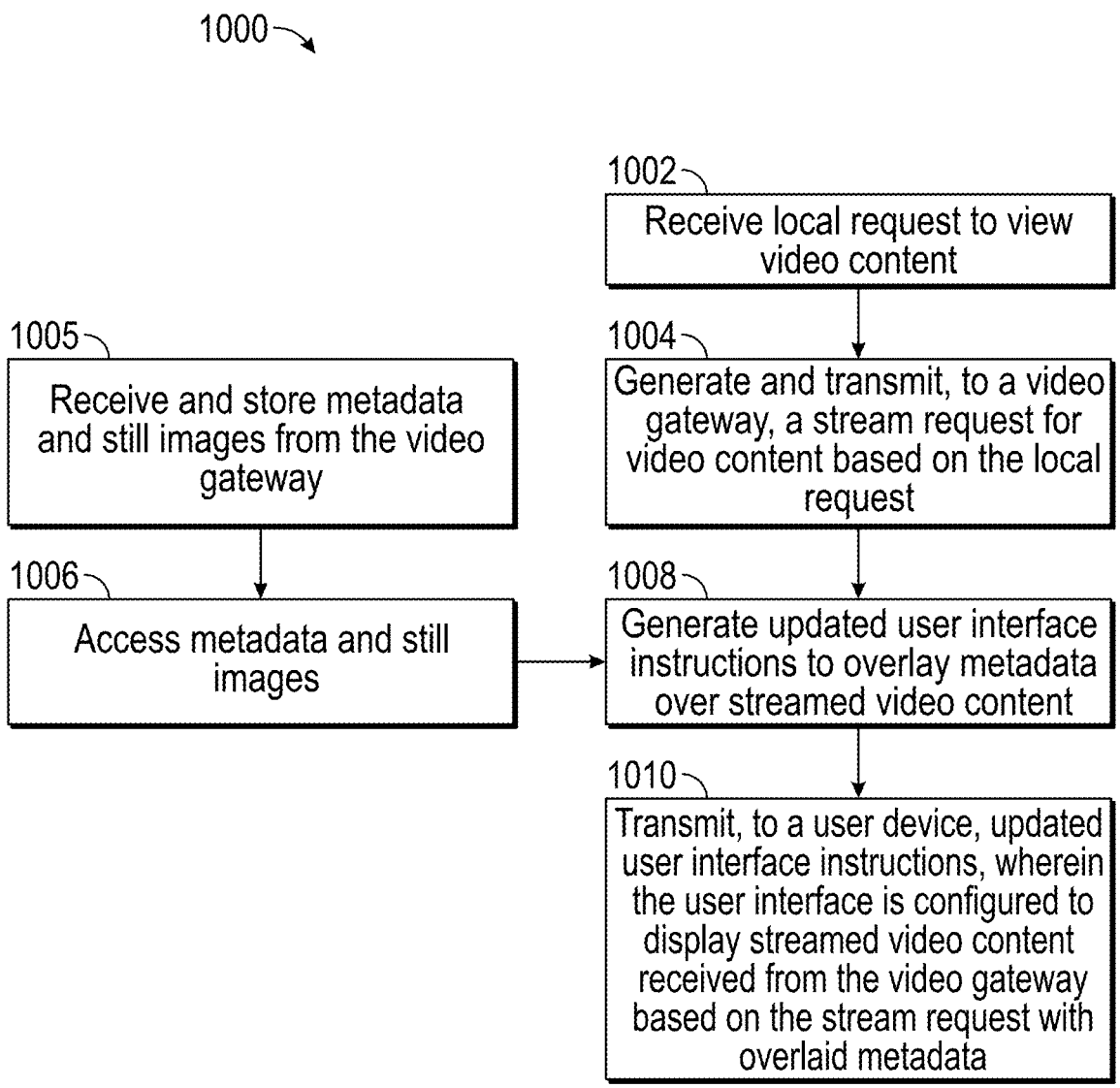
FIGS. 10A-10B are flowcharts illustrating example methods and functionality of a video gateway device in electronic communication with a management server, according to various embodiments of the present disclosure.
Figure 10B:
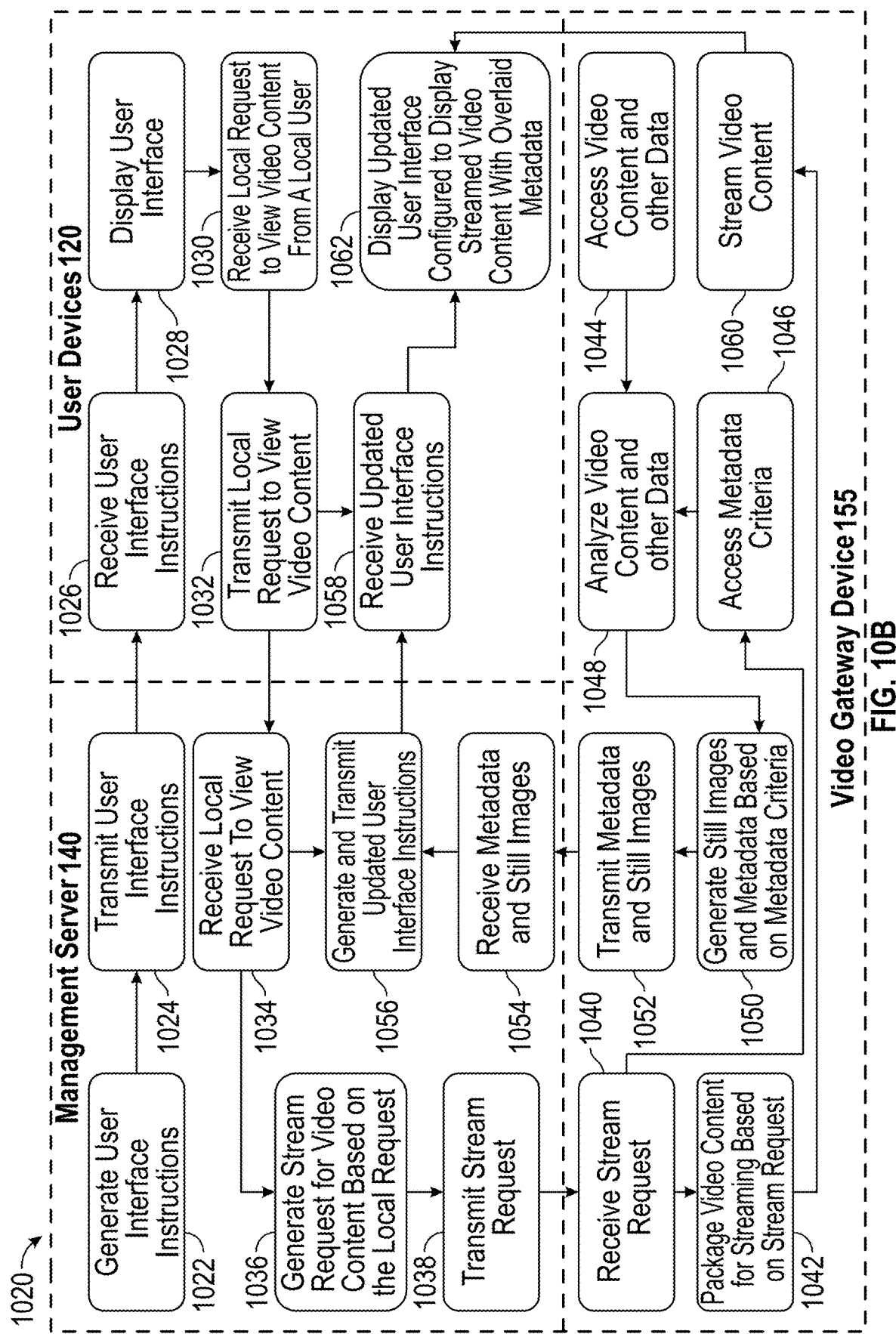

FIGS. 10A-10B are flowcharts illustrating example methods and functionality of a management server in electronic communication with a video gateway device, according to various embodiments of the present disclosure. FIG. 10A illustrates example functionality 1000 provided by, for example, the management server 140. The terms and concepts described in FIG. 10A are similar to those described in related to FIG. 10B and herein and should be used to provide additional clarification and understanding to FIG. 10A. Further description related to streaming video content, and interactive graphical user interfaces related thereto, are described, e.g., in reference to FIGS. 11A-11E.

At block 1002, a system (e.g., a management server 140) receives a local request to view video content, for example, from a user device 120. The user device 120 is located on a network that is local, or not remote, to a video gateway device 155 that stores the desired video content. In some embodiments, the local request includes information indicating one or more of: a desired video data associated with one or more cameras, a start time of the video, criteria to view (e.g., people, motion, machines, etc.), or any other factor. In some embodiments, if a user indicates criteria to view, the video presented to the user can include a layer or metadata that includes information related to the criteria. For example, if a user wants to see motion of objects, the metadata can include a start time, end time, object type, etc. in the seek bar corresponding to the video and/or overlaid on, or rendered with, the video itself.

At block 1004, the management server 140 generates and transmits, to a video gateway device 155, for example, a stream request for video content based on the local request.

At block 1005, the management server 140 receives and stores data and/or metadata associated with recorded video content from the video gateway device 155. In some embodiments, the video gateway device 155 analyzes video content, sensor data, machine data, etc. to determine detections and insights as described herein. The video gateway device 155 then packages the detections and insights and transmits those to the management server 140. Also, in some embodiments, the video gateway device 155 also captures still images or screenshots of recorded video and transmits such screenshots to the management server 140. Advantageously, the video gateway device can transmit the reduced data (e.g., metadata and screenshots) as opposed to the entire video content library so that bandwidth associated with the video gateway device 155 is used sparingly. This allows the video gateway device 155 to conserve its bandwidth for other purposes, as needed. Such data received at block 909 can include various detections (e.g., machine on/off, location of one or more persons, movement of people, movement of machinery, temperature of an area, temperature of a machine, or the like) and screenshots of captured video data. For example, during periods of low activity, or no activity (e.g., no motion detected, no people are detected, machinery is off, outside of operating/working hours, etc.) monitored in a video feed, screenshots can be generated and transmitted to the management server 140 based on a pre-configured time interval (e.g., every 1, 5, 10, 20 minute mark, or the like). In another example, during periods of high activity (e.g., threshold motion detected, machinery is on, people are detected, during operating/working hours, etc.) monitored in a video, screenshots can be generated and transmitted to the management server based on the same or a different pre-configured time interval (e.g., every 5, 10, 20 second mark, or the like).

At block 1006, the management server 140 accesses the stored data and/or metadata and still images. At block 1008, the management server 140 generates updated user interface instructions to overlay the data and/or metadata accessed at block 1006 over the video content to be streamed to the user device 120. For example, the management server 140 can overlay detections of people or machines or motion onto the video content that is streamed. Also, for example, the management server 140 can overlay related information on a video seek bar indicating a start time, end time, object, and/or motion-related information.

At block 1010, the management server 140 transmits, to the user device 120, updated user interface instructions, wherein the corresponding user interface is configured to display the video content streamed from the video gateway device 155 overlaid with the data and/or metadata information in the video content and the seek bar. Also, in some embodiments, the still images are provided to the user device 120 so that when a user drags a slider on the seek bar the user can see the still images to guide the user. In some embodiments, the video content is streamed directly from the video gateway device 155 (e.g., by using WebRTC, or the like) and the video content is overlaid with the data and/or metadata information in the video and the seek bar received from the management server 140. In some embodiments, the video content is streamed directly from the video gateway device 155 (e.g., by using WebRTC, or the like) and the video content is overlaid with the data and/or metadata information in the video and the seek bar received from the management server 140, the video gateway device 155, or both.

FIG. 10B illustrates example functionality 1020 provided by, for example, a management server 140, user devices 120, and a video gateway device 155. The terms and concepts described in FIG. 10B are similar to those described in related to FIG. 10A and herein and should be used to provide additional clarification and understanding to FIG. 10B. Further description related to streaming video content, and interactive graphical user interfaces related thereto, are described, e.g., in reference to FIGS. 11A-11E.

At block 1022, a management server 140 generates user interface instructions, and at block 1024, transmits the user interface instructions to one or more user devices 120.

At block 1026, a user device 120 receives the user interface instructions from the management server 140, and at block 1028, the user device 120 generates and displays the user interface corresponding to the received user interface instructions.

At block 1030, the user device 120 receives a remote request to view video content from a user, and at block 1032, the user device 120 transmits the remote request to view video content to the management server 140. As described with reference to FIG. 10A, the user device 120 is located on a network that is local, or not remote, to a video gateway device 155 that stores the desired video content. In some embodiments, the local request includes information indicating one or more of: a desired video data associated with one or more cameras, a start time of the video, criteria to view (e.g., people, motion, machines, etc.), or any other factor. In some embodiments, if a user indicates criteria to view, the video presented to the user can include a layer or metadata that includes information related to the criteria. For example, if a user wants to see motion of objects, the metadata can include a start time, end time, object type, etc. in the seek bar corresponding to the video and/or overlaid on, or rendered with, the video itself.

At block 1034, the management server 140 receives the local request to view video content. Then, at block 1036, the management server 140 generates a stream request for the requested video content based at least in part on the local request. At block 1038, the management server 140 transmits, to a video gateway device 155, for example, the generated stream request.

At block 1040, the video gateway device 155 receives the stream request from the management server 140. Then, at block 1042, the video gateway device 155 retrieves from one or more databases video content associated with the stream request and packages the video content for streaming. Then, at block 1060, the packaged video content is transmitted or streamed to the user device 120.

At block 1044, the video gateway device 155 captures, receives, or accesses video content and other data. For example, the video content and other data can be collected from one or more cameras, one or more sensors, and/or one or more machines (e.g., directly or through one or more controller devices 150). Such data received at block 1044 can include various detections (e.g., machine on/off, location of one or more persons, movement of people, movement of machinery, temperature of an area, temperature of a machine, or the like).

At block 1046, the video gateway device 155 receives, accesses, or determines metadata criteria. In some embodiments, the metadata criteria can be preconfigured by a user, via a user device 120 as communicated through a management server 140. In some embodiments, the metadata criteria is based at least in part on the pull request received in block 940. In some embodiments, the metadata criteria can include information indicating what the video gateway device 155 should be monitoring and/or analyzing. For example, the metadata criteria can indicate that motion of people anywhere is important to analyze. Thus, the video gateway device 155 can limit its analysis to motion of people detected and exclude other detections (e.g., machine status, positioning, etc.) from analysis. In some embodiments, the metadata criteria can indicate what data or metadata to include with some or any streamed video. In some embodiments, the metadata criteria is preconfigured prior to receiving a pull request. In some embodiments, the metadata criteria is configured during and/or prior to receiving a pull request. In some embodiments, the metadata criteria can be a set of default criteria. In some embodiments, the metadata criteria can be determined using AI or machine learning by analyzing data passing to or through the video gateway device 155.

At block 1048, the video gateway device 155 analyzes the video content and other data, and at block 1050, the video gateway device 155 determine detections or insights, for example by using AI or machine learning. In some embodiments, the video gateway device analyzes video content, sensor data, machine data, etc. to determine detections and insights as described herein. Also, in some embodiments, the video gateway device 155 also captures still images or screenshots of recorded video. For example, during periods of low activity, or no activity (e.g., no motion detected, no people are detected, machinery is off, outside of operating/working hours, etc.) monitored in a video feed, screenshots can be generated and transmitted to the management server 140 based on a pre-configured time interval (e.g., every 1, 5, 10, 20 minute mark, or the like). In another example, during periods of high activity (e.g., threshold motion detected, machinery is on, people are detected, during operating/working hours, etc.) monitored in a video, screenshots can be generated and transmitted to the management server based on the same or a different pre-configured time interval (e.g., every 5, 10, 20 second mark, or the like). Advantageously, the video gateway device can transmit the reduced data (e.g., metadata and screenshots) as opposed to the entire video content library so that bandwidth associated with the video gateway device 155 is used sparingly. This allows the video gateway device 155 to conserve its bandwidth for other purposes, as needed. At block 1052, the video gateway device 155 then packages the data and/or metadata (e.g., detections and insights), and any still images, and transmits those to the management server 140.

At block 1054, the management server 140 receives the packaged data and/or metadata and any still images from the video gateway device 155.

At block 1056, the management server 140 accesses the stored data and/or metadata, still images and generates updated user interface instructions to overlay the data and/or metadata received at block 1054 over the video content that is to be streamed from the video gateway device 155 at block 1060 to the user device 120 at block 1062. For example, the management server 140 can generate user interface instructions configured to overlay detections of people or machines or motion onto the video content that is streamed from the video gateway device 155. Also, for example, the user interface instructions can be configured to overlay related information on a video seek bar indicating a start time, end time, object, and/or motion-related information. Also, at block 1056, the management server 140 transmits, to the user device 120, the updated user interface instructions.

At block 1058, the user device 120 receives the updated user interface instructions, and at block 1062, the user device 120 displays the updated user interface, wherein the corresponding user interface is configured to display the video content streamed from the video gateway device 155 at block 1060 and overlaid with the data and/or metadata information received at block 1058 in the video and the seek bar. Also, in some embodiments, the still images are provided to the user device 120 so that when a user drags a slider on the seek bar the user can see the still images to guide the user. In some embodiments, at least a portion of the metadata and/or data and still images can be transmitted at block 1052 to the user device 120 as well based at least in part on the stream request. For example, the streamed video content at block 1060 can also include associated metadata, data, still images, and/or user interface instructions for presenting the streamed video with the overlaid information.

XIV. Example Graphical User Interfaces for Video Streaming

FIGS. 11A-11E illustrate example interactive graphical user interfaces related to combining visualized data with streamed video in a user interface, according to various embodiments of the present disclosure. Although certain disclosures below and herein might be described as pertaining to a particular figure or embodiment, the concepts described should be understood to be capable of being applied to any embodiment described herein.

Figure 11A:
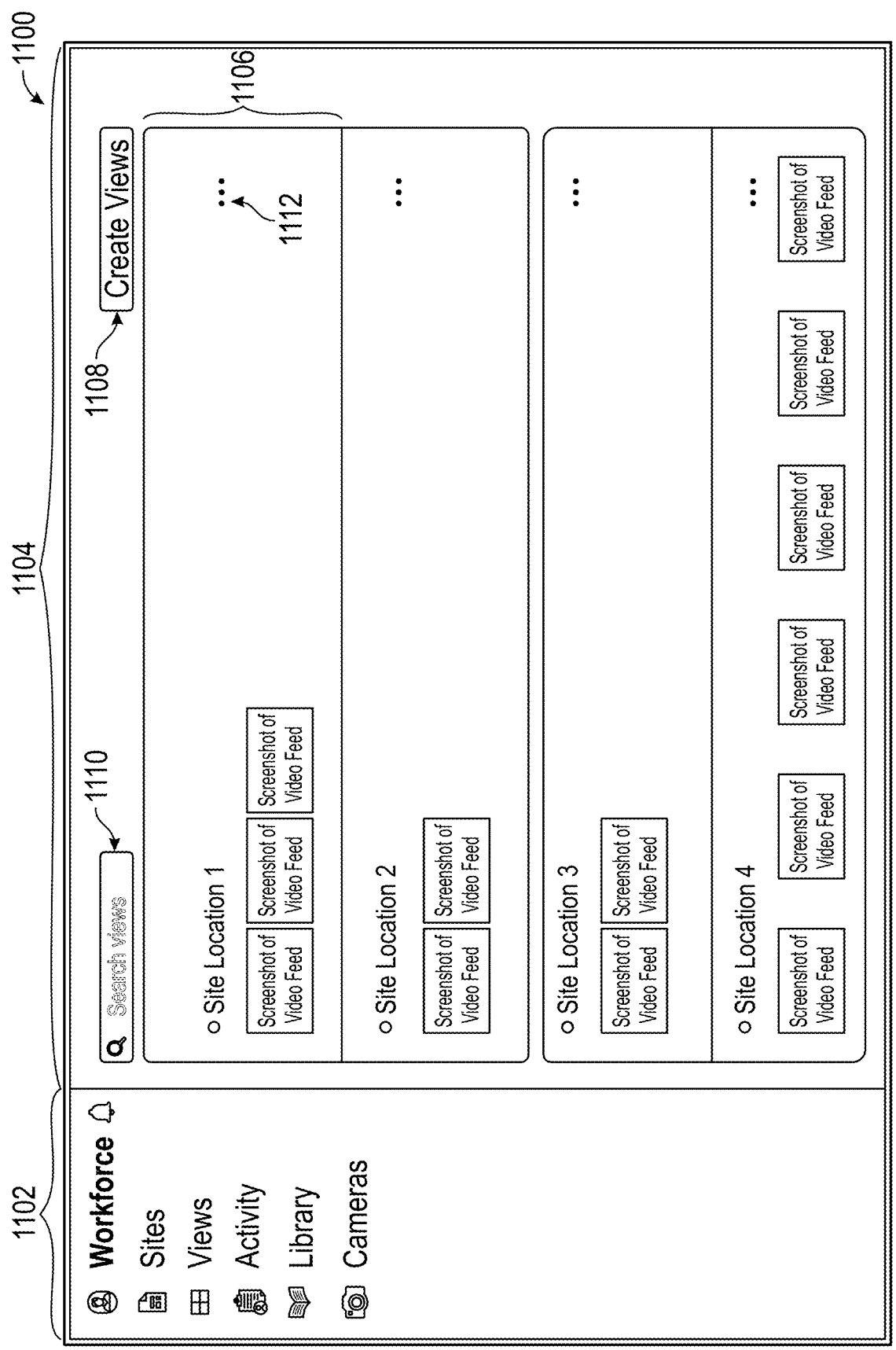
FIGS. 11A-11E illustrate example interactive graphical user interfaces related to combining visualized data with streamed video in a user interface, according to various embodiments of the present disclosure.

FIG. 11A illustrates an example interactive graphical user interface 1100 that allows a user to view and configure cameras and site locations. In panel 1102, a user has options to view various sites, views, activity, a library, and cameras. The user can select "Sites" in panel 1102 to update section 1104 to show various pre-configured sites or locations so that a user can view one interface that displays multiple camera feeds for one site (e.g., see FIG. 11D for an example) or so that a user can view all multiple camera feeds for the one site. For example, sites are often geographical representations of camera and sensor deployments, to be paired with a physical space and additional metadata (e.g. a floorplan) while views (described below) are more generic groupings of or video feeds for user playback. In some embodiments, the particular groupings of cameras for a particular site or location can be generated based on AI or machine learning (e.g., based on GPS coordinates, names of the cameras, or any combination of available data). The user can also select "Views" in panel 1102 to show what is in section 1104 so that the user can view various site locations (e.g., site location 1106) and corresponding video feeds associated with each site location. For example, such views can correspond to a specific user's work site or circumstances so that a user or system administrator can customize the views, or the system can generate automatic views based on data (e.g., location data of the cameras/sensors, etc.). A user can select a displayed screenshot to view the particular camera feed or select the site location to view a plurality of video feeds associated with the site location. A user can also select the settings 1112 button to configure additional settings for each site location. For example, the user can add or remove cameras associated with the site location, change the site location name, and any other related settings. The user can also select "Activity" in panel 1102 to update section 1104 to show any detections and/or insights (e.g., as detected by the video gateway device 155 as described herein). In some embodiments, changes made by the user, or other users, to the system can be included as well. The user can also select "Library" in panel 1102 to update section 1104 to show any recorded, flagged, or tagged video clips, and/or any notes made regarding particular video clips. The user can also select "Cameras" in panel 1102 to update section 1104 to show a listing of cameras available to one or more sites. In some embodiments, a user can select the create views button 1108 to create new site locations (e.g., that might include one or more cameras, sensors, designated areas within a camera feed, or a combination) or adjust views of a previously configured site location. In some embodiments, the user can search 1110 views that have been previously configured.

Figure 11B:
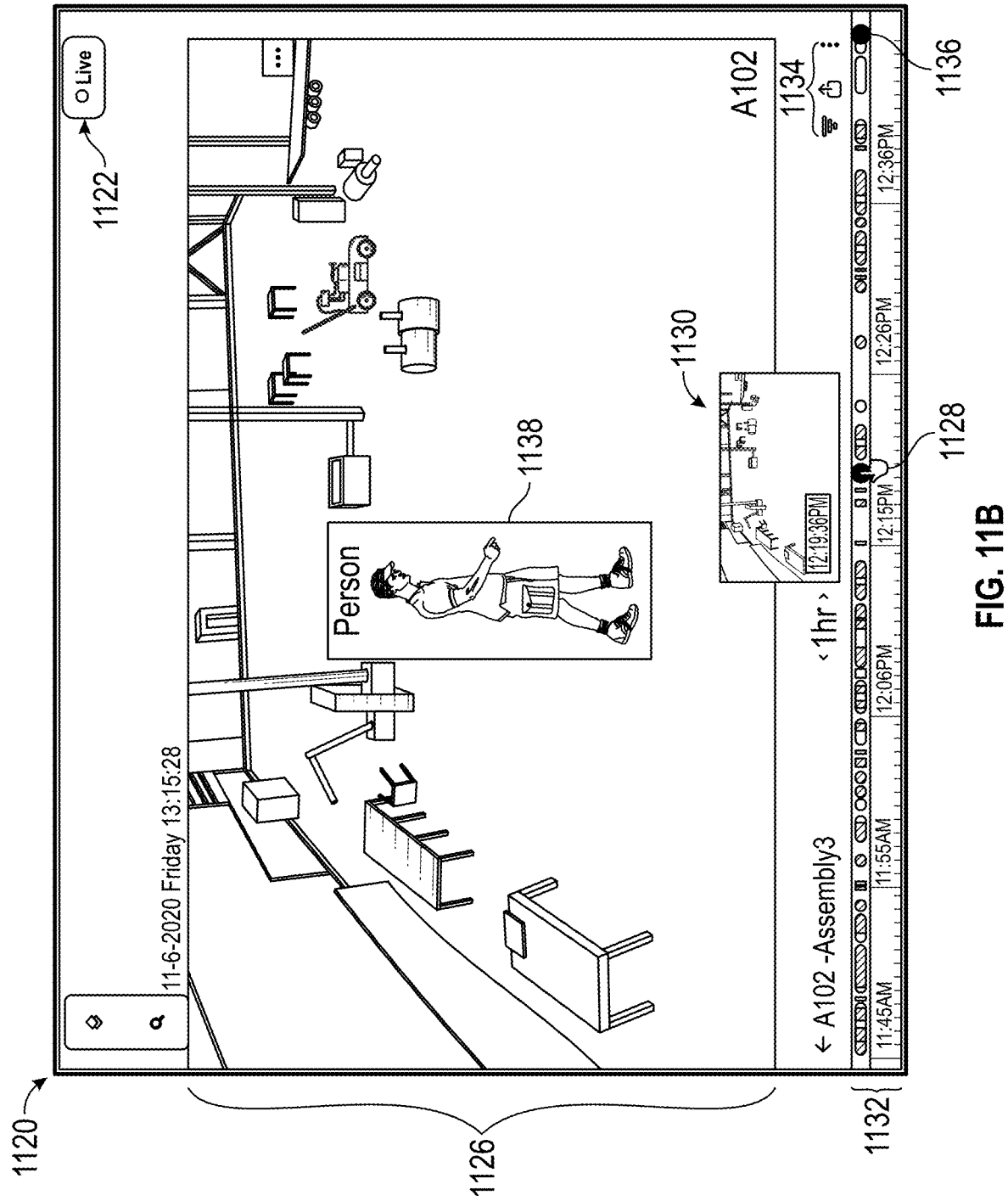

FIG. 11B illustrates an example interactive graphical user interface 1120 that allows a user to view a particular camera feed. In this example, a user is shown watching a live video feed 1126 (e.g., as indicated with the live button 1122) that includes a seek bar 1132. The live video is playing at the marker 1136, Also, the interface 1120 shows that the user is selecting and dragging the marker 1136 to marker 1128. Also, in some embodiments, a user can select a location on the seek bar 1132 to move the marker 1136 to marker 1128, as opposed to dragging the marker. In some embodiments, the location of marker 1136 on the right side also indicates that live content is being viewed. When a user selects a position for the marker 1128 or drags the marker, the user can view a plurality of screenshots (e.g., screenshot 1130 is shown and is associated with the position of marker 1128) pertaining to the video as the user moves the marker 1128 over various portions of the video. For example, as a user drags the marker (e.g., marker 1128), the screenshot 1130 will change position to be next to (e.g., centered and above) the marker 1128 and also update to correspond with the location of the marker as it is moved. Also, for example, there may only be one marker displayed on the seek bar at a time. FIG. 11B displays marker 1136 and marker 1128 concurrently for illustrative purposes. As discussed in more detail herein, the video feed 1126 can be streamed to the a user device 120 displaying the interface 1120. For example, the live or recorded video can be streamed through a management server 140 as described in relation to FIGS. 9A-9B. Also, for example, the live or recorded video can be streamed through a video gateway device 155 directly as described in relation to FIGS. 10A-10B. In some embodiments, and as described in more detail herein, screenshots can be stored on the management server 140 (e.g., as accessed or received from the corresponding video gateway device 155). For example, the management server 140 can download live or recorded video data, combine the video data with stored metadata and screenshots into a user interface, and send the user interface instructions to a user device 120 for display and interaction. Also, for example, the management server 140 can transmit relevant stored metadata and screenshots to a user device 120 for display and interaction with a video streamed directly from the video gateway device 155 (e.g., if the user device 120 is on the same network as the video gateway device 155). The management sever 140 can transmit instructions on how to stream the video to the user device 120, and the user device 120 can automatically access the appropriate video data and present it with matching metadata received from the management server 140. The seek bar 1132 can also include visual representations of data received from, and stored on, the management server 140. For example, the management server 140 can store detections determined and received by a corresponding video gateway device 155. The management server 140 can transmit at least a portion of the detections (e.g., data or metadata) to the user device 120 so that the user device 120 displays at least a portion of the received detections on the seek bar 1132 and/or video feed 1126 (e.g., a person indicator 1138 can be shown in some embodiments). There can also be settings and options 1134 available for a user to share a clip or recording of video (e.g., with or without metadata or adjustments shown), and/or adjust what data or detections are overlaid on the video feed as well as what data or detections are shown in the seek bar 1132. Additional description with respect to the search bar is included with respect to FIG. 11C.

Figure 11C:
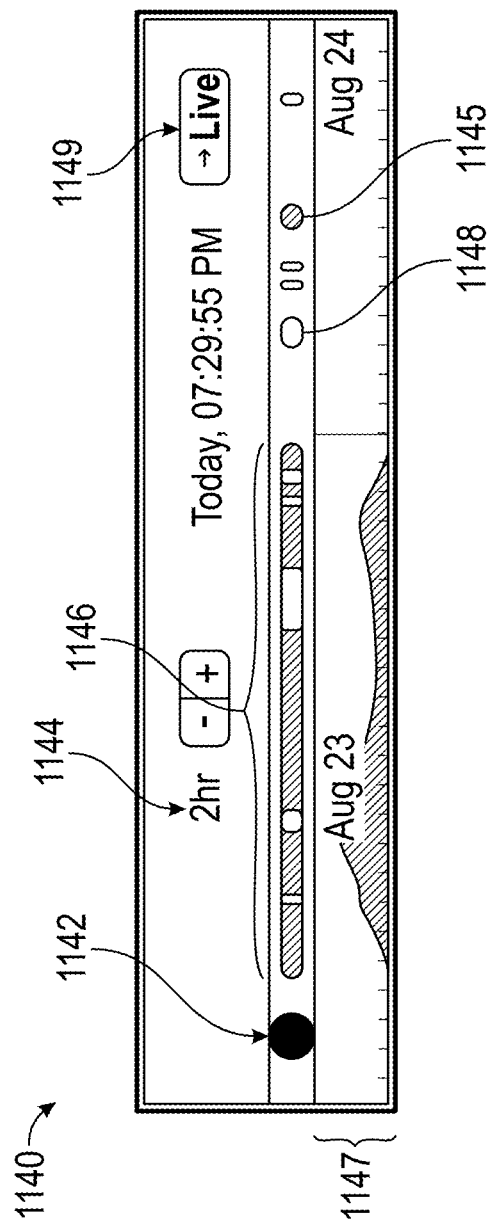

FIG. 11C illustrates an example seek bar 1140 (e.g., similar to seek bar 1132 shown in FIG. 11B). In this example, marker 1142 is shown on the left side of the FIG. 11C indicating that recorded content is being shown on a corresponding video. Also, live button 1149, which is different from live button 1122 in FIG. 11B, indicates that the corresponding video is not live. In some embodiments, a user can select live button 1149 to view live video corresponding to the camera associated with the viewed video feed. Also, in some embodiments, a user can drag marker 1142 to the right side of the seek bar 1140 to view live video. In some embodiments, a user can also adjust the time scale 1144 to various time increments. For example, when adjusted, the seek bar 1140 will adjust accordingly based on the updated scale. In some embodiments, additional data, metadata, or detections can be shown on the seek bar 1140. For example, detections 1145, 1146, and 1148 can be shown on the seek bar indicating a range of times that the detections took place. Also, for example, the detections can include different visual effects (e.g., colors, textures, or the like) to indicate different types of detections. For example, a solid color/texture as shown in detection 1148 can indicate that a person was detected. Also, for example, a different color/texture as shown in detection 1145 can indicate a different detection (e.g., a vehicle was detected). In some embodiments, detections can overlap or be combined such as in detection 1146. In some embodiments, the colors/textures can be shown in a gradient form to indicate an intensity of a detection (e.g., a speed of motion, a number of detections, a number of people, a number of machines, or the like). For example, the gradient can be applied to colors or textures such that the color or texture gets adjusts (e.g., duller and/or brighter, lines more or less spaced out, bigger or small on the seek bar, or any other similar visual indication) depending on intensity of the corresponding or underlying data. In some embodiments, data can be shown in area 1147 to show intensity or measurement of a particular detection. In some embodiments, a user can take action or control of sensors/devices shown in or around a viewed video stream, for example from within a video stream (e.g. unlock a door associated with the stream or load a truck from an asphalt silo shown on a video stream).

Figure 11D:
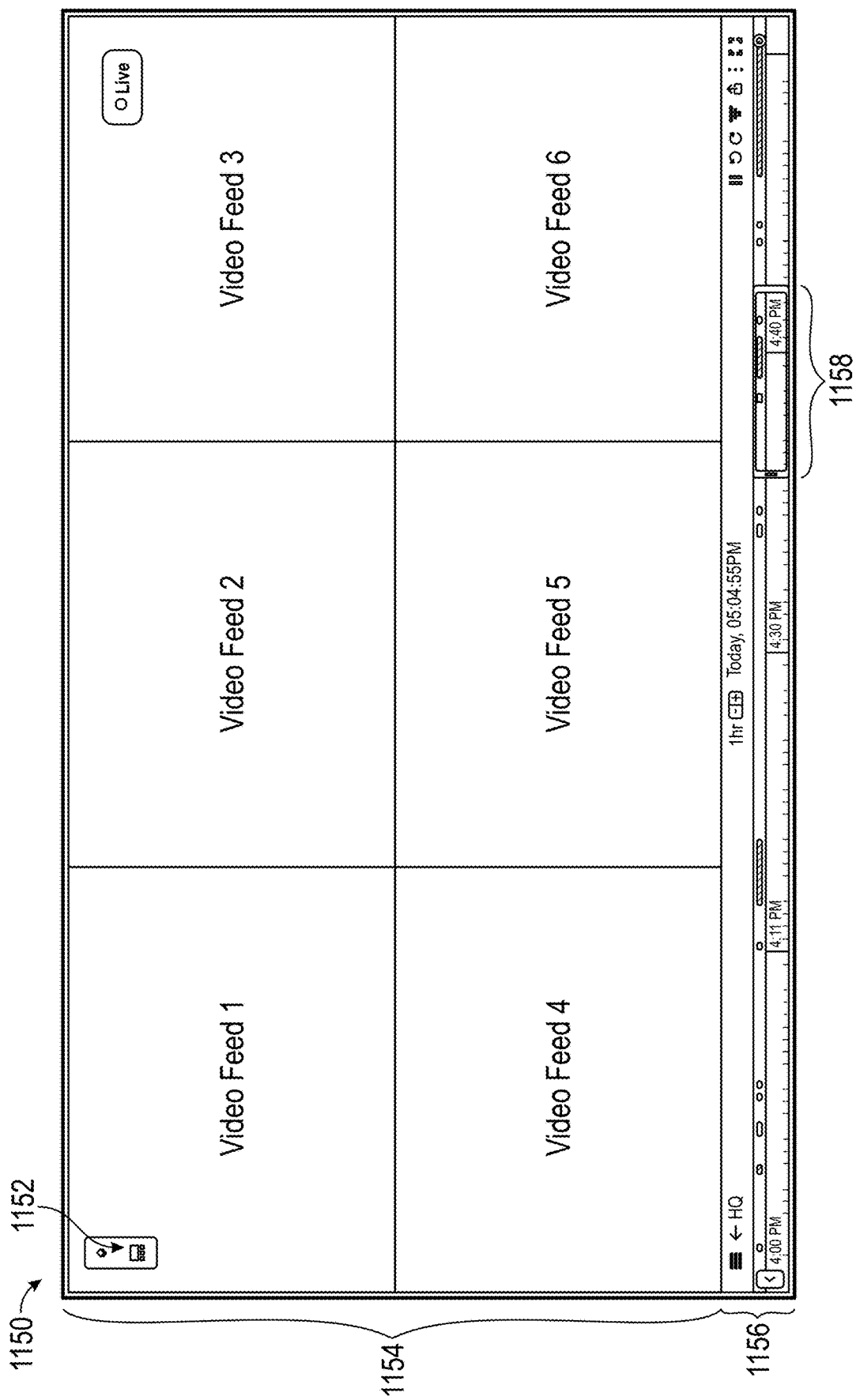

FIG. 11D illustrates an example interactive graphical user interface 1150 that allows a user to view multiple camera feeds. For example, the multiple camera feeds might be associated with a particular site (e.g., similar to site location 1106 in FIG. 11A). A user can use button 1152 to adjust the orientation or views shown in area 1154 of the user interface 1120, or to adjust which camera feeds to include in area 1154. In the seek bar 1156, a user can also select a time range 1158 by clicking and dragging a cursor over a desired time range. By doing so, the seek bar 1156 can be adjusted to show the selected time range only, as well as area 1154 to show recorded video and associated data or metadata pertaining to the selected time range. In some embodiments, the seek bar 1156 can overlay metadata associated with one or more cameras so that a detection in one of the displayed camera feeds can be shown in the seek bar 1156 at the appropriate time associated with the detection. For example, if one video includes a detection of motion, the seek bar 1156 can indicate that information so that a user can navigate to that time in the video feed. Then, the user interface 1120 can be adjusted to update all videos to the time selected in the seek bar 1156.

Figure 11E:
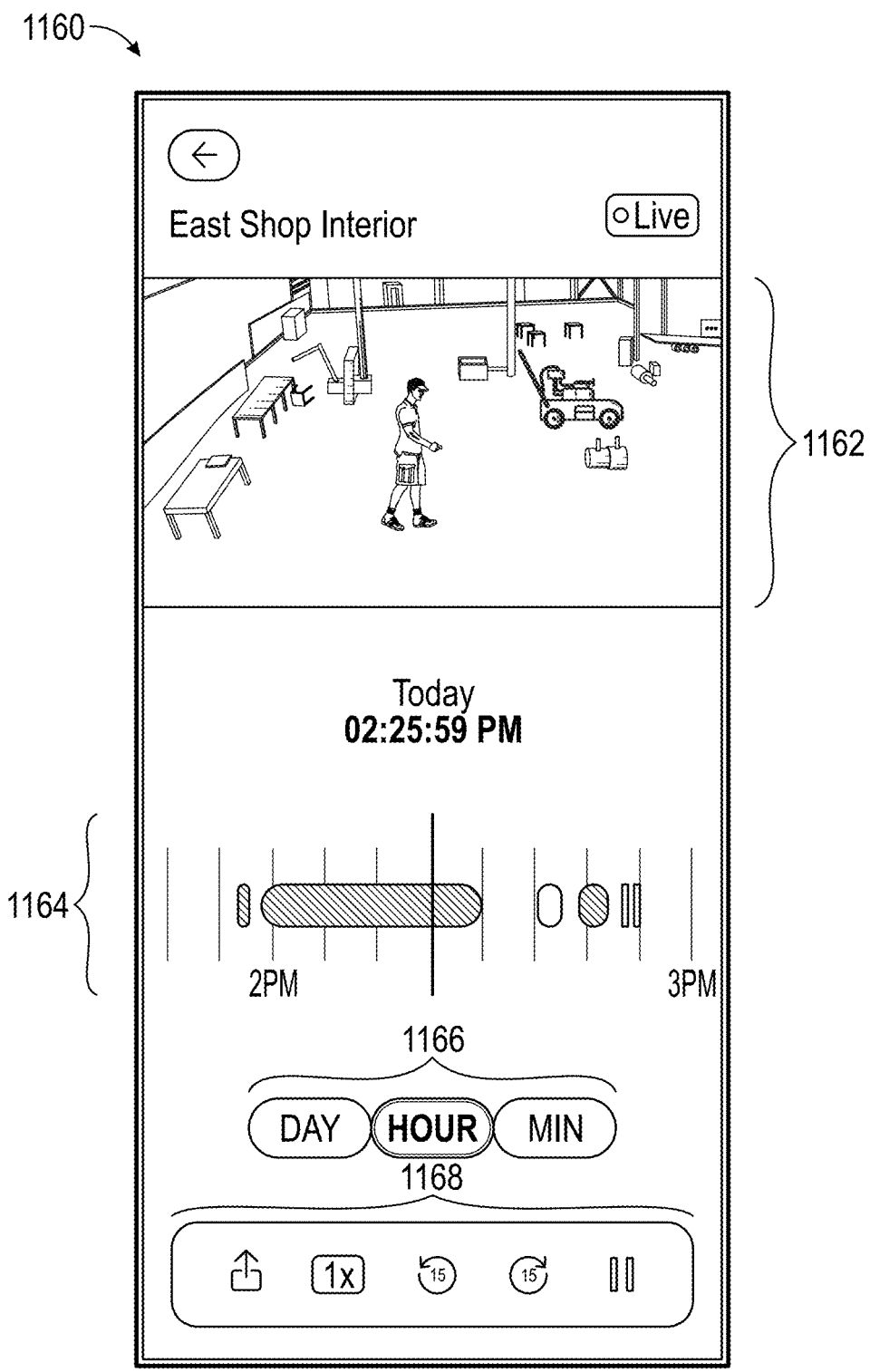

FIG. 11E illustrates an example interactive graphical user interface 1160 that allows a user to view a particular camera feed or video 1162. FIG. 11E is similar to FIG. 11B, however, FIG. 11E is optimized for a mobile device. Similar features described in relation to FIG. 11B and herein can also be implemented in FIG. 11E. For example, the seek bar 1164 has similar functionality and information as to seek bars 1132, 1140, and 1156. In FIG. 11E, the seek bar can be animated so that the data and time move in relation to the center point of the seek bar, so that a user can move the seek bar as opposed to moving a marker. A user can also select a time scale 1166 similar to time scale 1144 as described in FIG. 11C. Also, the user has access to a controls bar 1168 to adjust the video 1162, share the video 1162, or load the video 1162 on another display for viewing (e.g., via DLNA, or Chromecast, or the like). The user can also adjust the speed of the playback and skip forward or backwards with the selection of a button in the controls bar 1168. In some embodiments, the interface 1160 can also show still images (e.g., similar to the still images described here) such that a user can select the still images to skip to the associated time in the video shown in 1162. Also, in some embodiments the video 1162 can be scrubbable so that a user can drag the video itself from side to side to move seek forward or backwards through the video in an interactive way.

XV. Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method comprising:
   receiving, from a computing device, a request to view video content;
   determining, from a video gateway device, a stream of video content corresponding to the request, wherein the video content is stored on the video gateway device;
   accessing, from one or more databases, previously stored metadata associated with the video content, wherein the previously stored metadata includes a plurality of detections, and wherein the previously stored metadata includes, for each detection, a classification of the detection; and
   generating instructions to cause display of a user interface on the computing device, wherein the user interface includes:
      the determined stream,
      an interactive seek bar, and
      the previously stored metadata overlaid on the interactive seek bar and providing indications of detection types from a plurality of detection types.

2. The computer-implemented method of claim 1, wherein the video content is captured by cameras configured to capture video of areas of a facility.

3. The computer-implemented method of claim 1, wherein the previously stored metadata was generated based on an analysis of the video content.

4. The computer-implemented method of claim 3, wherein the analysis of the video content can be performed on one or more of: the video gateway device, the computing device, and one or more servers.

5. The computer-implemented method of claim 1, wherein the previously stored metadata includes one or more screenshots associated with the stream of the video content.

6. The computer-implemented method of claim 1, wherein the interactive seek bar is configured to be manipulated by a user.

7. The computer-implemented method of claim 6, further comprising:
receiving input data indicating a manipulation of the interactive seek bar by a user associated with the computing device; and
based on the received input data, generating instructions to cause display of one or more screenshots associated with the determined stream while the interactive seek bar is being manipulated by the user.

8. The computer-implemented method of claim 1, wherein the plurality of detections are further overlaid on the interactive seek bar at locations on the interactive seek bar corresponding to when the plurality of detections were detected.

9. The computer-implemented method of claim 1, further comprising:
storing, in the one or more databases, the determined stream.

10. The computer-implemented method of claim 1, further comprising:
accessing video recording criteria configured to be used to determine types of detections to monitor.

11. The computer-implemented method of claim 10, wherein the video recording criteria includes information designating at least a portion of a camera feed, a particular machine, type of motion detected, or a combination.

12. A management server system comprising:
a computer readable storage medium comprising program instructions; and
one or more processors configured to execute the program instructions to cause the management server system to:
receive, from a computing device, a request to view video content;
determine, from a video gateway device, a stream of video content corresponding to the request, wherein the video content is stored on the video gateway device;
access, from one or more databases, previously stored metadata associated with the video content, wherein the previously stored metadata includes a plurality of detections, and wherein the previously stored metadata includes, for each detection, a classification of the detection; and
generate instructions to cause display of a user interface on the computing device, wherein the user interface includes:
the determined stream,
an interactive seek bar, and
the previously stored metadata overlaid on the interactive seek bar and providing indications of detection types from a plurality of detection types.

13. The management server system of claim 12, wherein the video content is captured by cameras configured to capture video of areas of a facility.

14. The management server system of claim 12, wherein the previously stored metadata was generated based on an analysis of the video content.

15. The management server system of claim 14, wherein the analysis of the video content can be performed on one or more of: the video gateway device, the computing device, and one or more servers.

16. The management server system of claim 12, wherein the previously stored metadata includes one or more screenshots associated with the stream of the video content.

17. The management server system of claim 12, wherein the interactive seek bar is configured to be manipulated by a user.

18. The management server system of claim 17, wherein the one or more processors are configured to execute the program instructions to further cause the management server system to:
receiving input data indicating a manipulation of the interactive seek bar by a user associated with the computing device; and
based on the received input data, generating instructions to cause display of one or more screenshots associated with the determined stream while the interactive seek bar is being manipulated by the user.

19. The management server system of claim 12, wherein the plurality of detections are further overlaid on the interactive seek bar at locations on the interactive seek bar corresponding to when the plurality of detections were detected.

20. The management server system of claim 12, wherein the one or more processors are configured to execute the program instructions to further cause the management server system to:
accessing video recording criteria configured to be used to determine types of detections to monitor, wherein the video recording criteria includes information designating at least a portion of a camera feed, a particular machine, type of motion detected, or a combination.

\* \* \* \* \*